US011467727B2

(12) United States Patent
Lee et al.

(10) Patent No.: US 11,467,727 B2
(45) Date of Patent: Oct. 11, 2022

(54) CHARACTER INPUT DEVICE

(71) Applicants: Gyu Hong Lee, Seoul (KR); DAESAN BIOTECH, Gimpo-si (KR); Gang Seon Yu, Gimpo-si (KR)

(72) Inventors: Gyu Hong Lee, Seoul (KR); Gang Seon Yu, Gimpo-si (KR)

(73) Assignees: Gyu Hong Lee, Seoul (KR); Daesan Biotech, Gyeonggi-Do (KR); Gang Seon Yu, Gyeonggi-Do (KR)

( * ) Notice: Subject to any disclaimer, the term of this patent is extended or adjusted under 35 U.S.C. 154(b) by 0 days.

(21) Appl. No.: 16/332,344

(22) PCT Filed: Sep. 21, 2017

(86) PCT No.: PCT/KR2017/010423
§ 371 (c)(1),
(2) Date: Mar. 11, 2019

(87) PCT Pub. No.: WO2018/056729
PCT Pub. Date: Mar. 29, 2018

(65) Prior Publication Data

US 2019/0339859 A1 Nov. 7, 2019

(30) Foreign Application Priority Data

Sep. 23, 2016 (KR) ........................ 10-2016-0121856

(51) Int. Cl.
*G06F 3/0488* (2013.01)
*G06F 3/0489* (2013.01)
(Continued)

(52) U.S. Cl.
CPC ...... *G06F 3/04886* (2013.01); *G06F 3/04897* (2013.01); *G06F 40/47* (2020.01)

(58) Field of Classification Search
CPC ....... G06F 3/0233–0237; G06F 3/0237; G06F 3/0488–04886; G06F 3/048
See application file for complete search history.

(56) References Cited

U.S. PATENT DOCUMENTS 5,748,512 A 5/1998 Vargas
6,182,099 B1 1/2001 Nakasato
(Continued)

FOREIGN PATENT DOCUMENTS

CN 101424977 A 5/2009
CN 102298479 A 12/2011
(Continued)

OTHER PUBLICATIONS

Examination Report dated Apr. 23, 2019 for Australian Patent Application No. 2017330125; 4 pgs.
(Continued)

*Primary Examiner* — Liang Y Li
(74) *Attorney, Agent, or Firm* — Umberg Zipser LLP; Ryan Dean

(57) ABSTRACT

Disclosed is a character input device. The character input device includes a character input unit 10 for inputting a character or a symbol, a display unit 20 for displaying on a display the character or symbol input via the character input unit, a storage unit 40 for storing data input via the character input unit and information or data related to character input, and a control unit 30 for controlling the character input unit, the display unit, and the storage unit, in which the character input unit is divided into one or more character group region 200 to form a language input unit 11, a miscellaneous input unit 12, and an auxiliary input unit 13, the character group regions are divided into one or more individual character regions 210 in which the character or the symbol is arranged
(Continued)

to input characters for each language displayed in the language input unit by pressing a key once as it is.

11 Claims, 52 Drawing Sheets

(51) Int. Cl.
*G06F 40/47* (2020.01)
*G06F 3/04886* (2022.01)

(56) References Cited

U.S. PATENT DOCUMENTS 6,286,064 B1 * 9/2001 King .................... G06F 3/0238 341/22
6,597,345 B2 * 7/2003 Hirshberg ............ G06F 3/0234 341/22
7,057,607 B2 * 6/2006 Mayoraz .............. G06F 3/0481 178/18.01
7,403,888 B1 7/2008 Wang et al.
8,949,731 B1 * 2/2015 Shi ...................... G06F 3/04886 715/773
2004/0056844 A1 * 3/2004 Gutowitz ............. G06F 3/0236 345/168
2005/0190970 A1 * 9/2005 Griffin ................ G06F 3/04886 382/229
2006/0144211 A1 * 7/2006 Yoshimoto .......... H01H 25/041 84/615
2006/0256139 A1 11/2006 Gikandi
2009/0160761 A1 * 6/2009 Moosavi ................ G06F 3/023 345/156
2009/0267901 A1 * 10/2009 Park .................... G06F 3/04883 345/173
2010/0245252 A1 * 9/2010 Ghassabian ......... G06F 3/04886 345/169
2011/0007004 A1 * 1/2011 Huang .................. G06F 3/0237 345/173
2011/0202839 A1 8/2011 AlKazi et al.
2012/0029902 A1 2/2012 Lu et al.
2012/0213446 A1 * 8/2012 Curelet-Balan .......... G06F 3/02 382/229
2012/0310622 A1 * 12/2012 Zivkovic ................ G06F 40/58 704/3
2012/0313858 A1 12/2012 Park et al.
2012/0326984 A1 * 12/2012 Ghassabian ........... G06F 3/0236 345/168
2012/0326996 A1 * 12/2012 Cho ...................... G06F 3/0237 345/173
2013/0009881 A1 * 1/2013 Paul .................... G06F 3/04886 345/173
2013/0016042 A1 * 1/2013 Makinen ................ G06F 3/016 345/168
2013/0124187 A1 5/2013 Qin
2013/0339895 A1 * 12/2013 Hirshberg ............ G06F 3/0237 715/773
2014/0122057 A1 * 5/2014 Chelba .................. G06F 3/0418 704/9
2014/0201680 A1 * 7/2014 Lee ..................... G06F 3/04886 715/835
2015/0100537 A1 * 4/2015 Grieves .................. G06N 5/048 706/52
2015/0100913 A1 4/2015 Park
2016/0070441 A1 * 3/2016 Paek ..................... G06F 3/0483 715/773
2016/0358505 A1 * 12/2016 Isted ................... G06F 3/04886

FOREIGN PATENT DOCUMENTS

| | | | | |
|---|---|---|---|---|
| CN | 102375648 | A | 3/2012 | |
| CN | 104765528 | A | 7/2015 | |
| EP | 2381348 | A1 | 10/2011 | |
| JP | H0850524 | A | 2/1996 | |
| JP | 2001175375 | A | 6/2001 | |
| JP | 2003015808 | A | 1/2003 | |
| KR | 1020040008164 | A | 1/2004 | |
| KR | 20050019633 | A | 3/2005 | |
| KR | 20060122208 | A | 11/2006 | |
| KR | 20120073548 | A | 7/2012 | |
| KR | 20120136796 | A | 12/2012 | |
| KR | 1020130010052 | A | 1/2013 | |
| KR | 2020130006861 | A | 11/2013 | |
| KR | 1020140112279 | A | 9/2014 | |
| KR | 1020150019905 | A | 2/2015 | |
| SU | 1839245 | A2 | 7/1990 | |
| WO | 2012101636 | A2 | 8/2012 | |
| WO | WO-2012101636 | A2 * | 8/2012 | .......... G06F 3/0237 |

OTHER PUBLICATIONS

Office Action for Australian Patent Application No. 2017330795 dated Jan. 31, 2020; 5 pgs.
Office Action for Russian Patent Application No. 2019110054/08(019275) dated Dec. 11, 2019; 8 pgs.
Office Action for Chilean Patent Application No. 201900656 dated Apr. 6, 2020; 12 pgs.
Office Action for Canadian Patent Office Action No. 2,036,940 dated Oct. 2, 2019; 4 pgs.
Office Action for Chinese Patent Application No. 201780056995.5 dated Jan. 9, 2020; 8 pgs.
Office Action for Japanese Patent Application No. 2019-517282 dated Oct. 29, 2019; 5 pgs.
Office Action for Chilean Patent Application No. 201900656 dated Jan. 6, 2021; 13 pgs.

* cited by examiner

【FIG. 1】
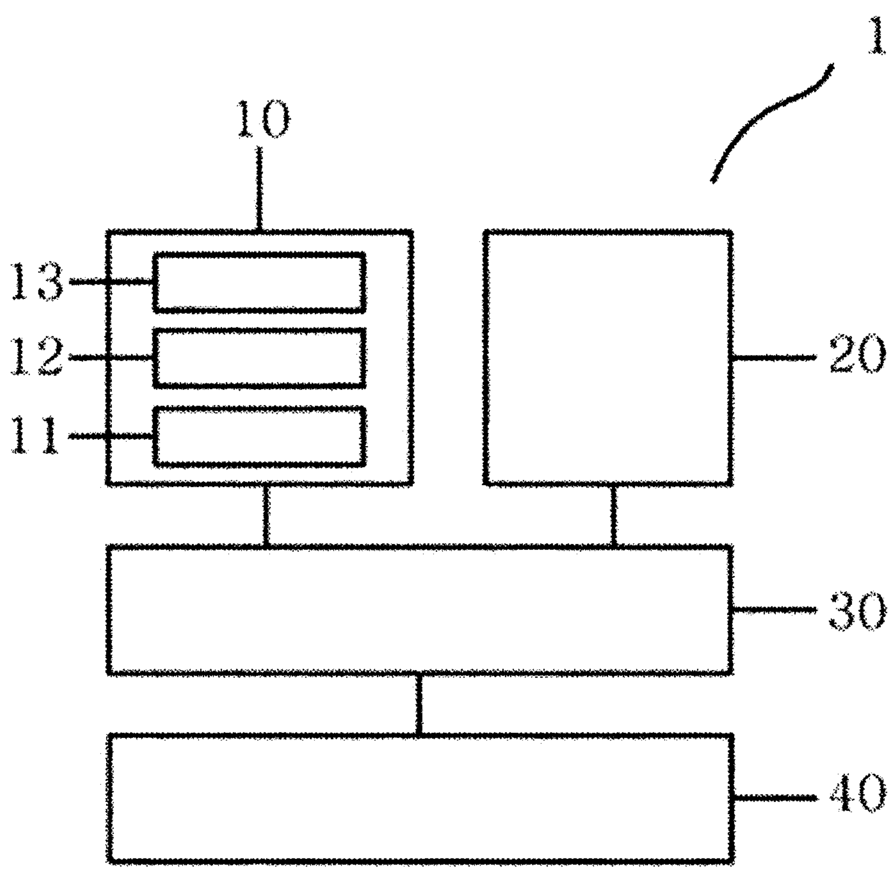

【FIG. 2A】
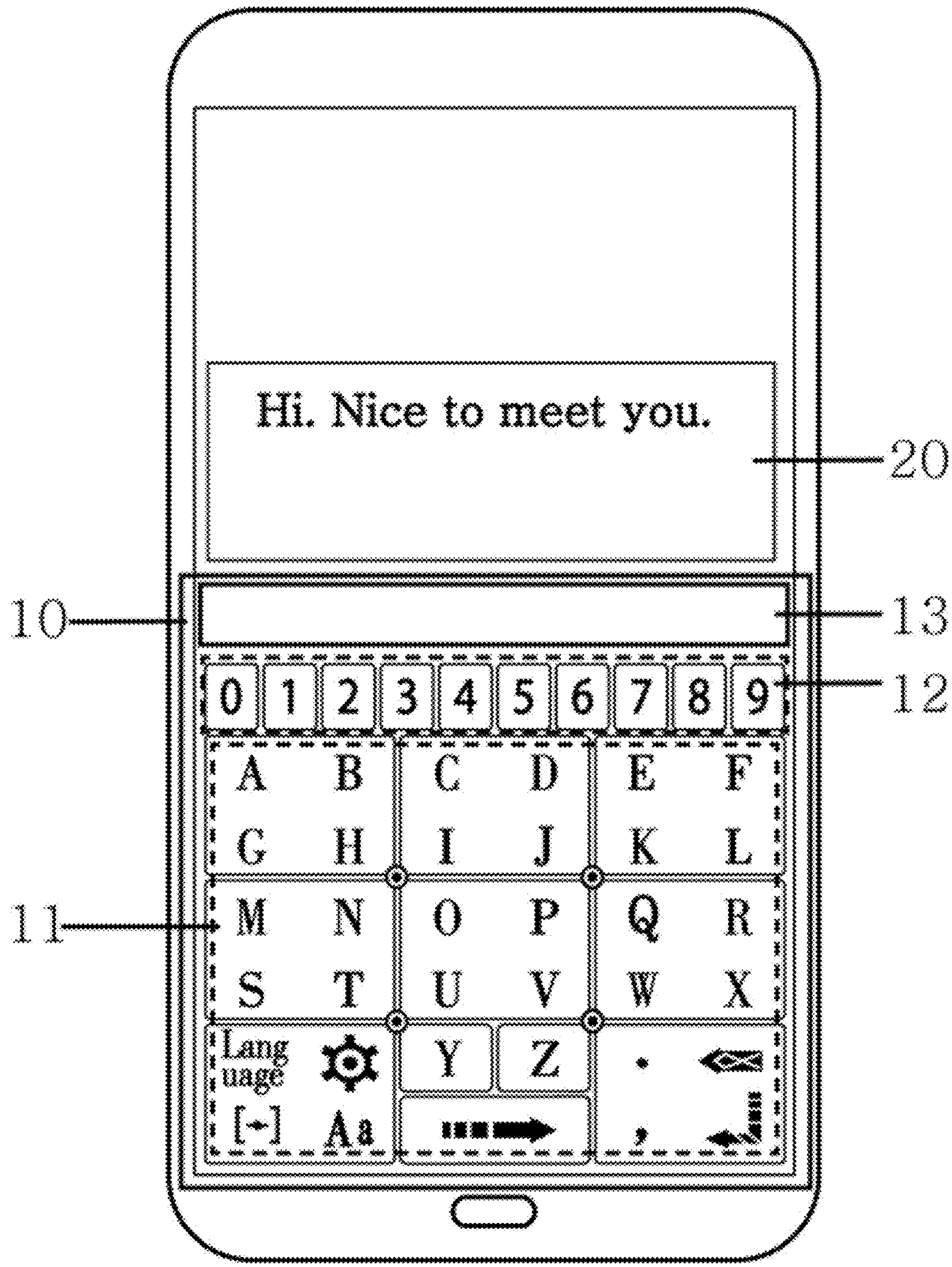

【FIG. 2B】
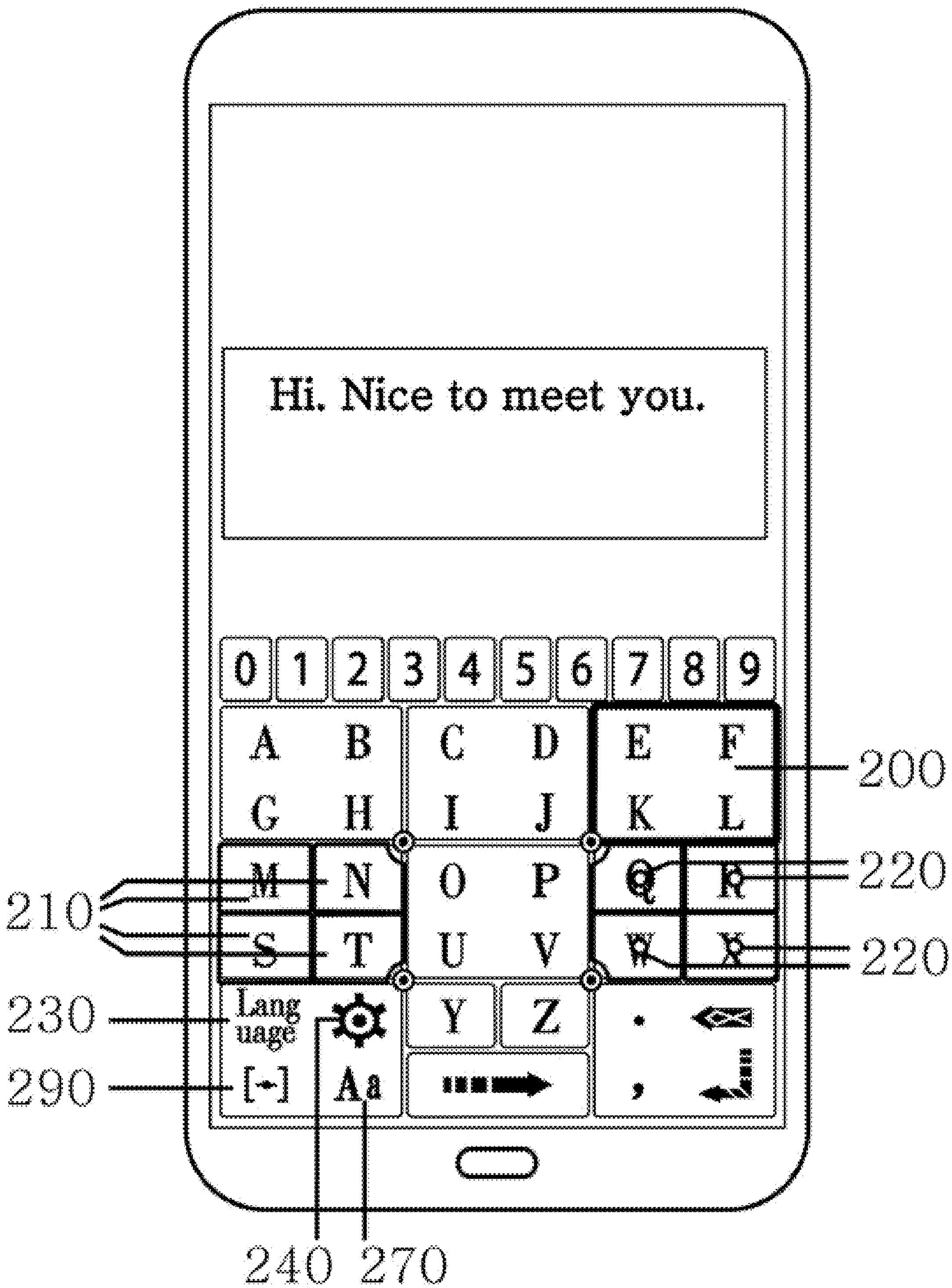

【FIG. 2C】
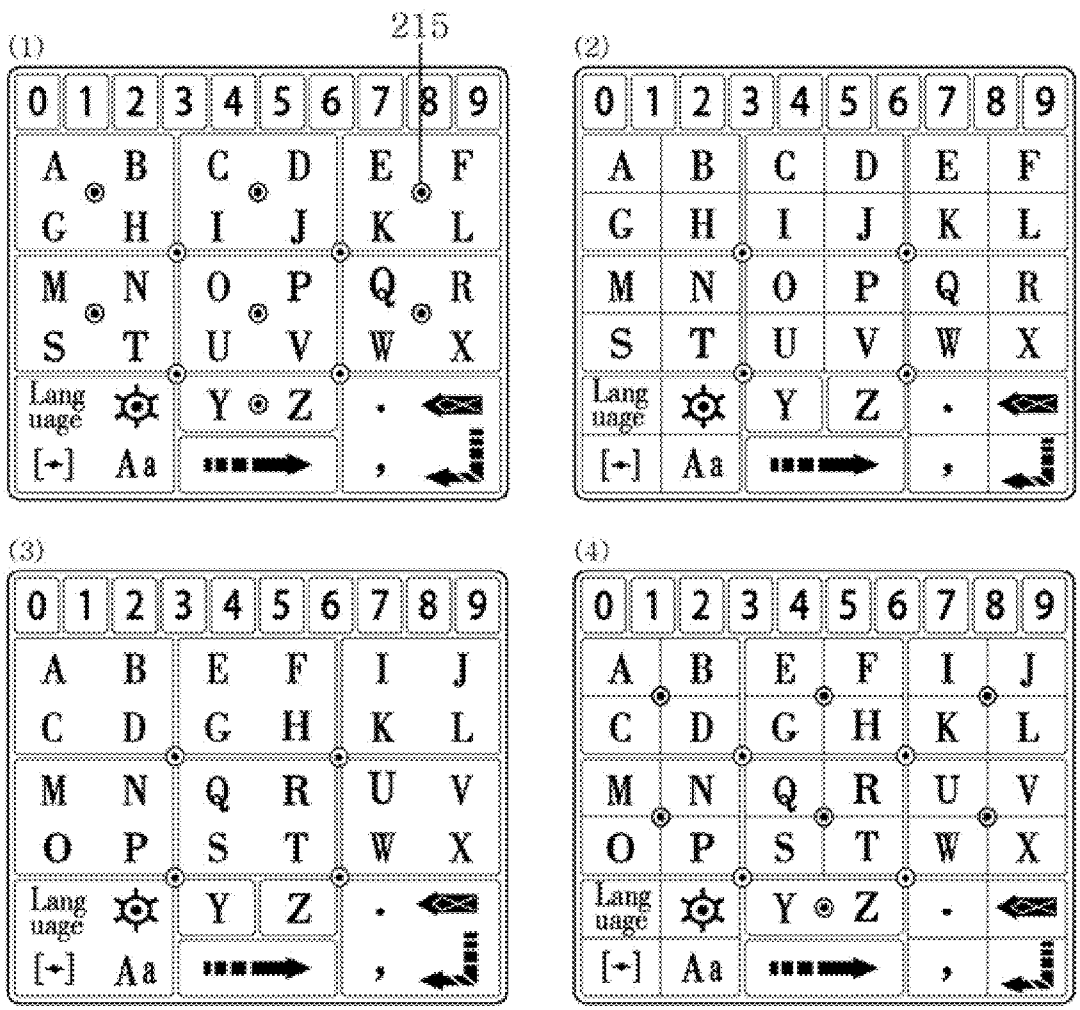

【FIG. 2D】
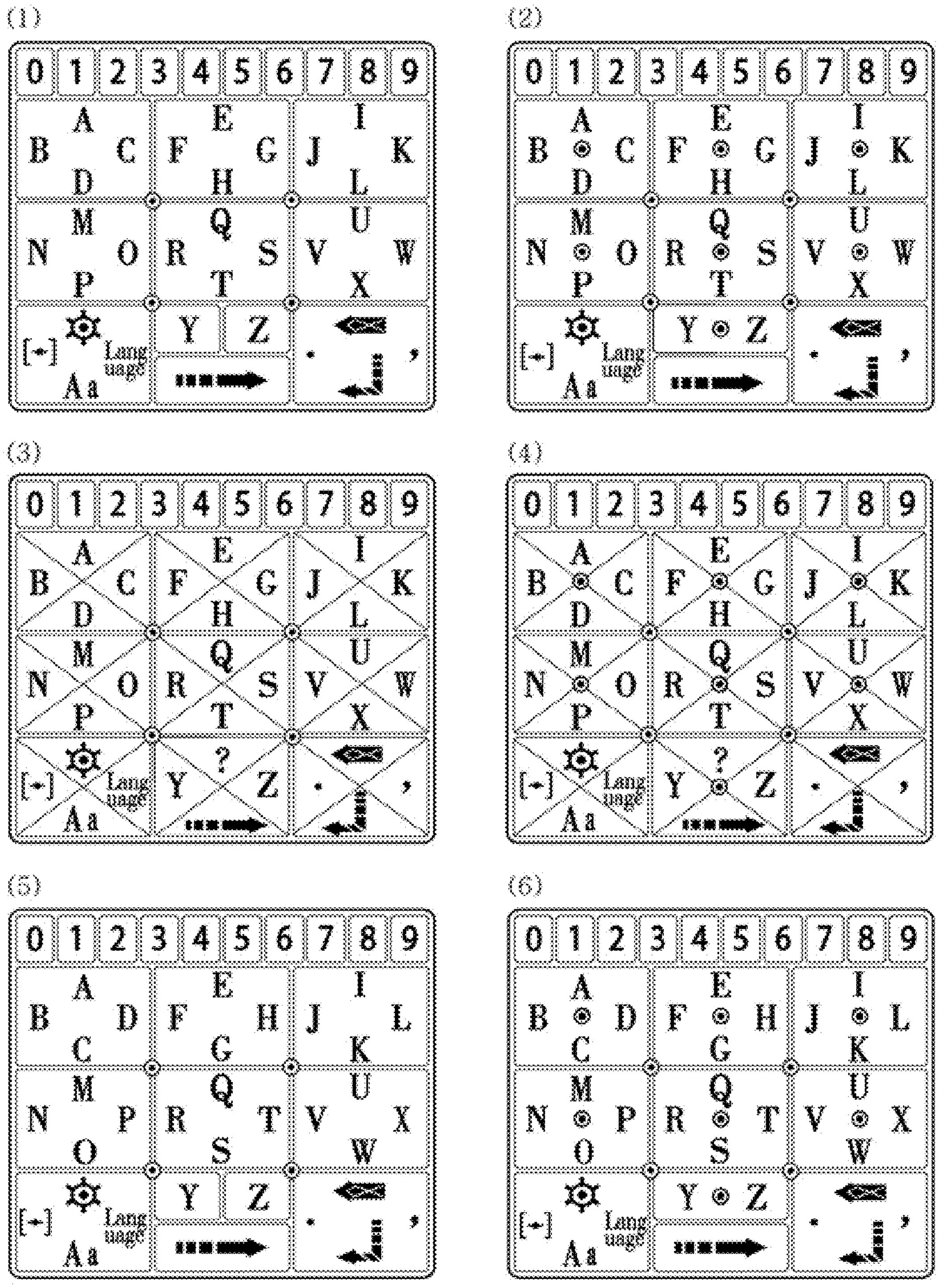

【FIG. 3A】
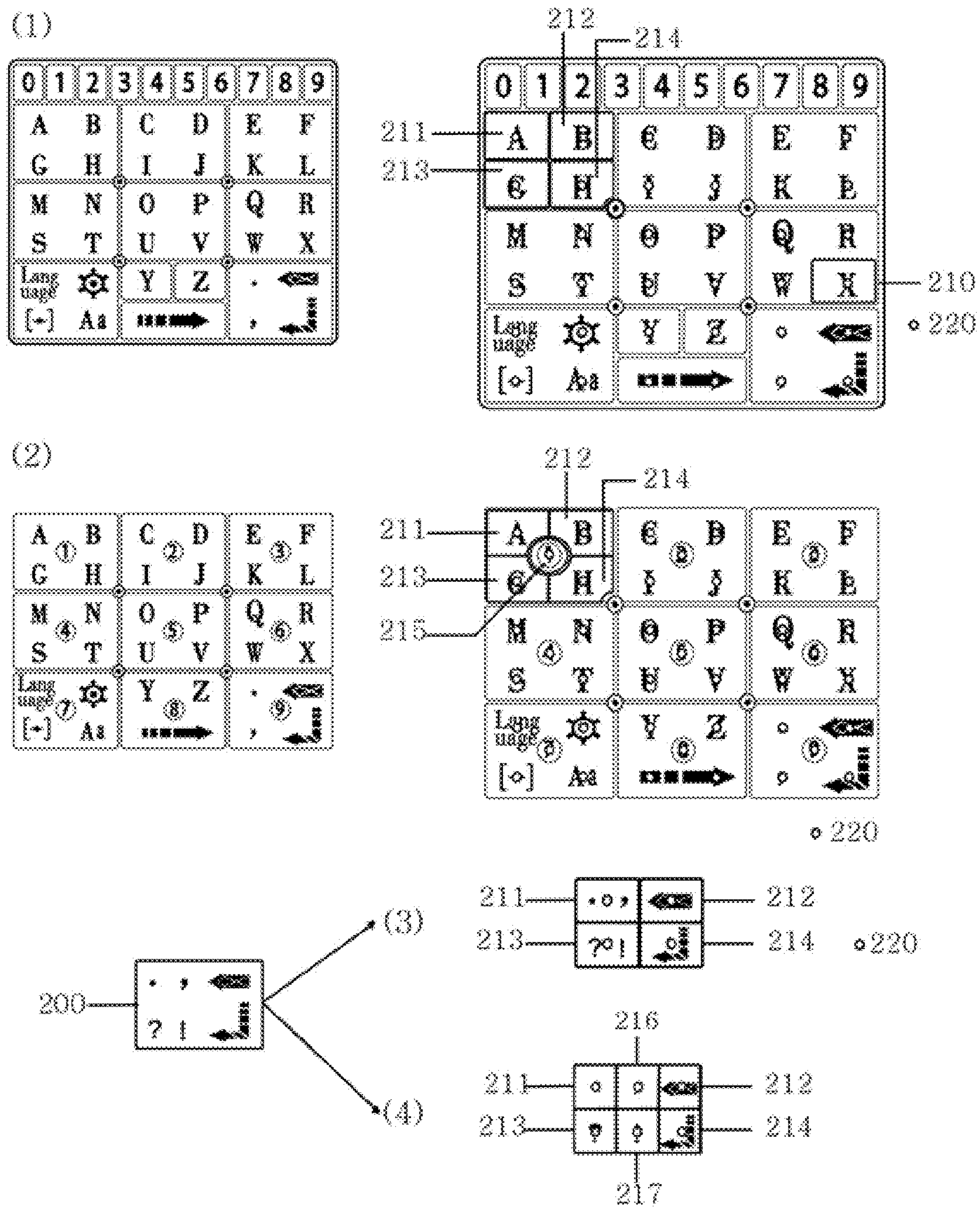

【FIG. 3B】
(1)
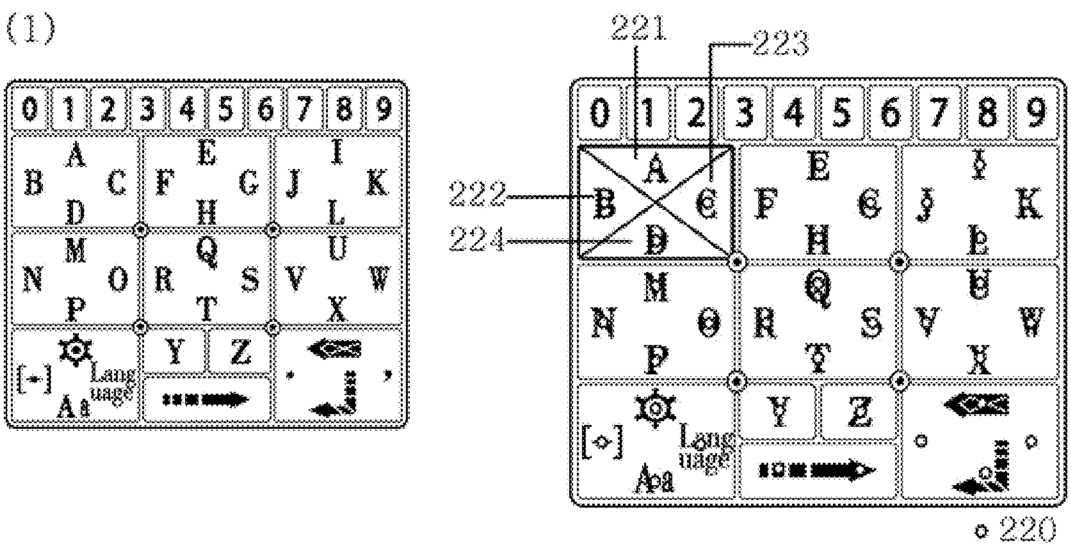
(2)
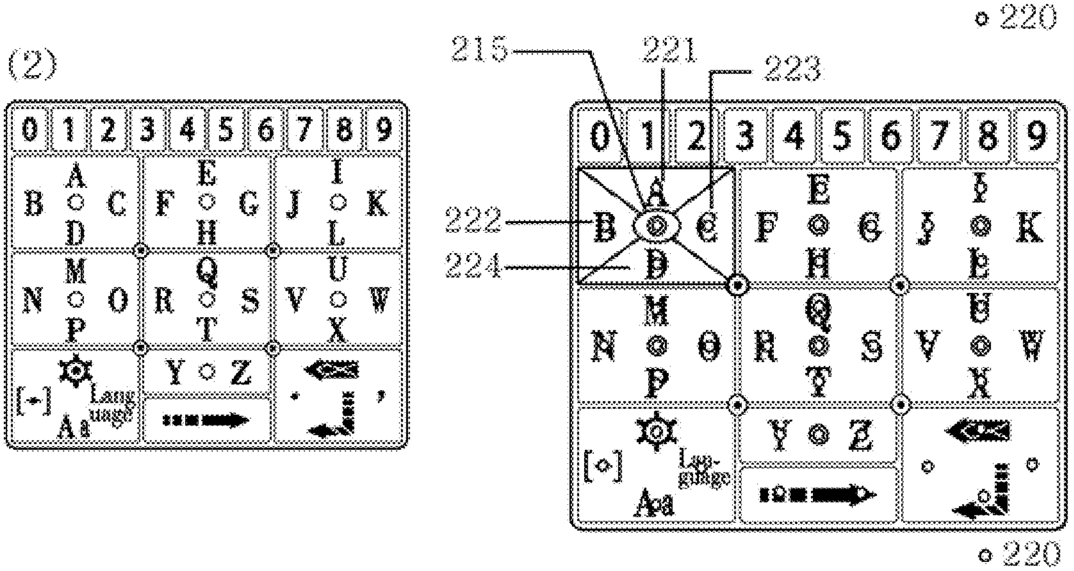

【FIG. 4】
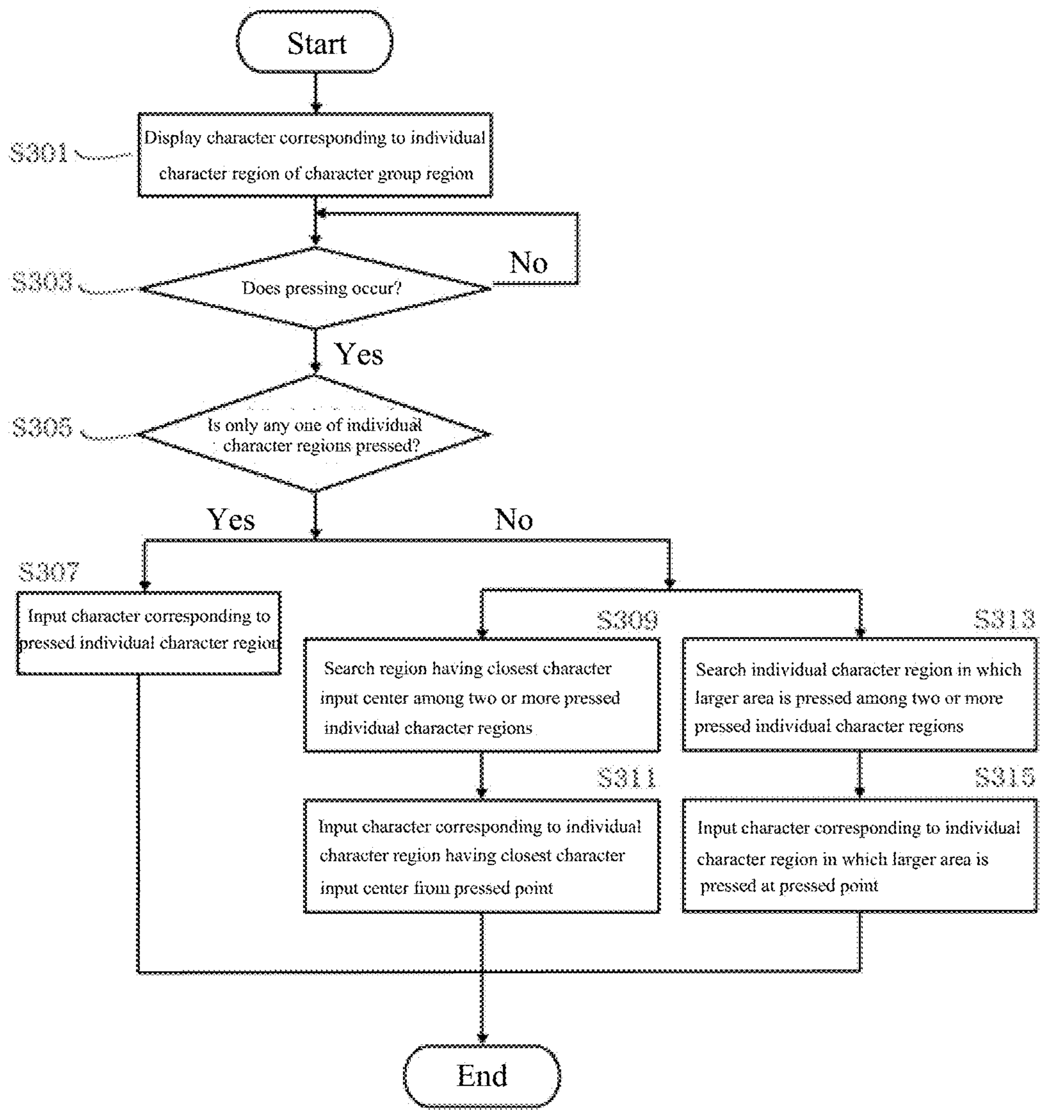

【FIG. 5】
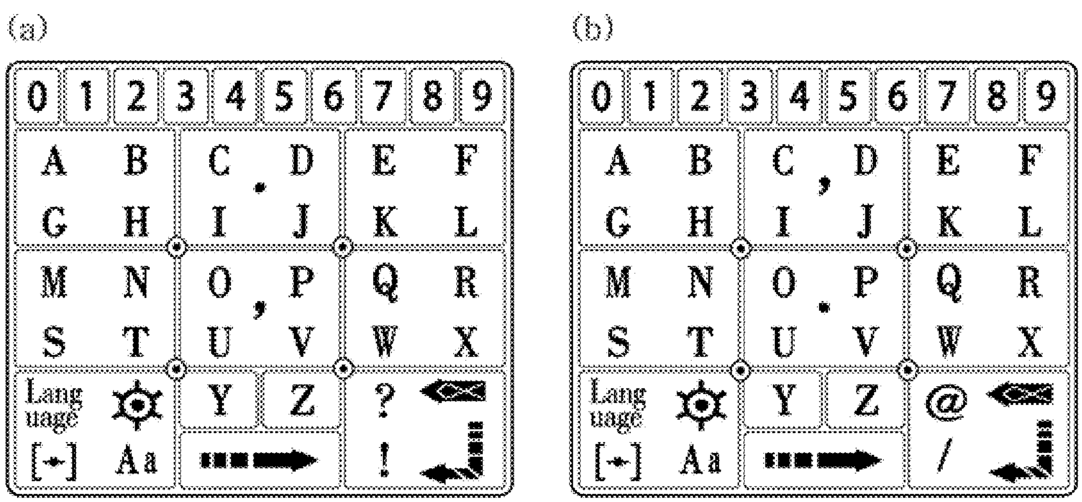

【FIG. 6】
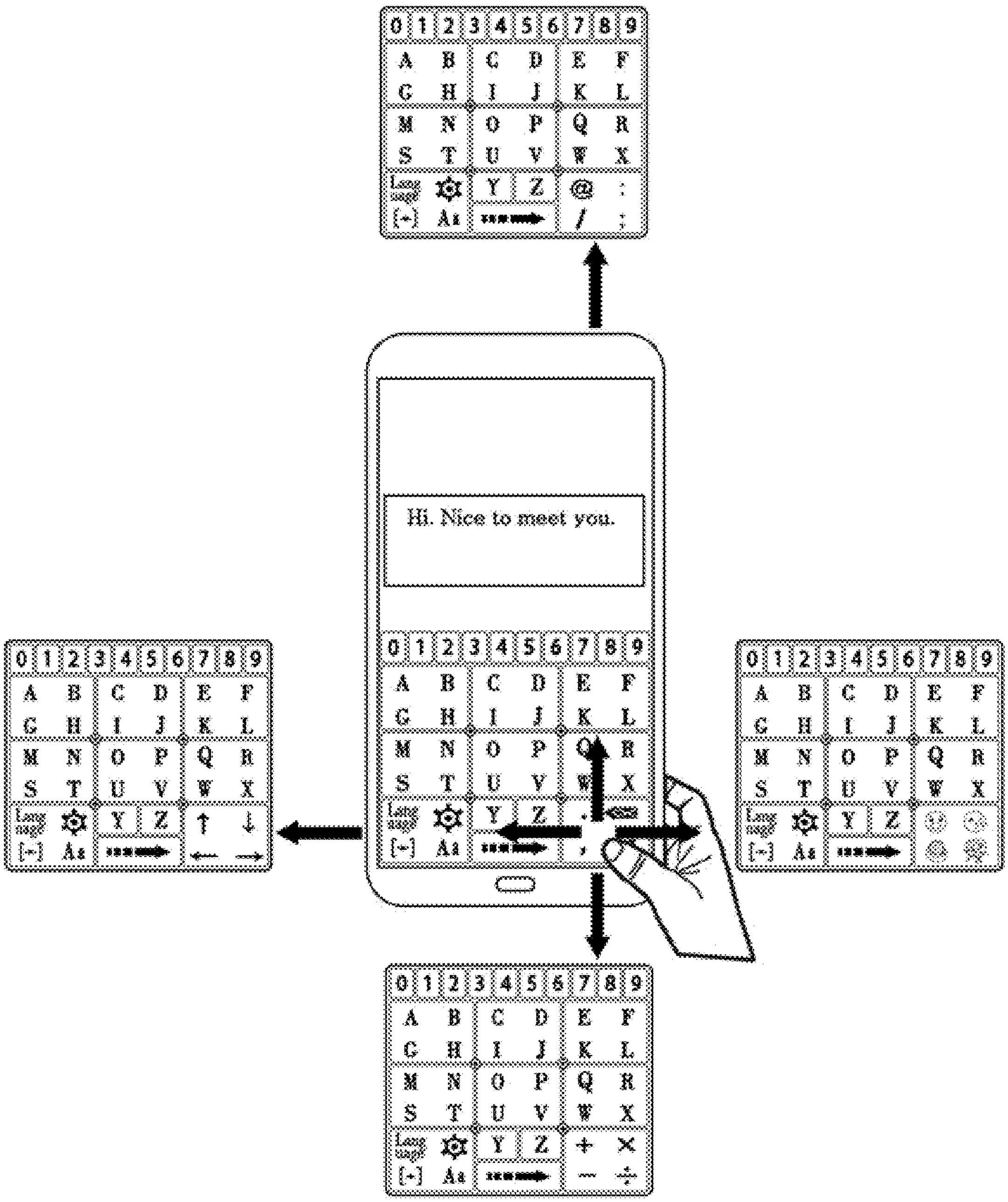

【FIG. 7】
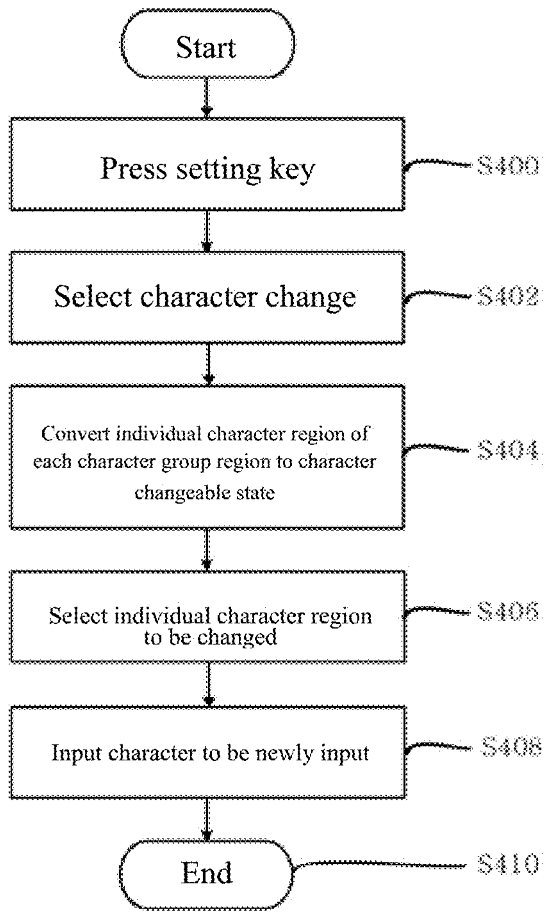

【FIG. 8】
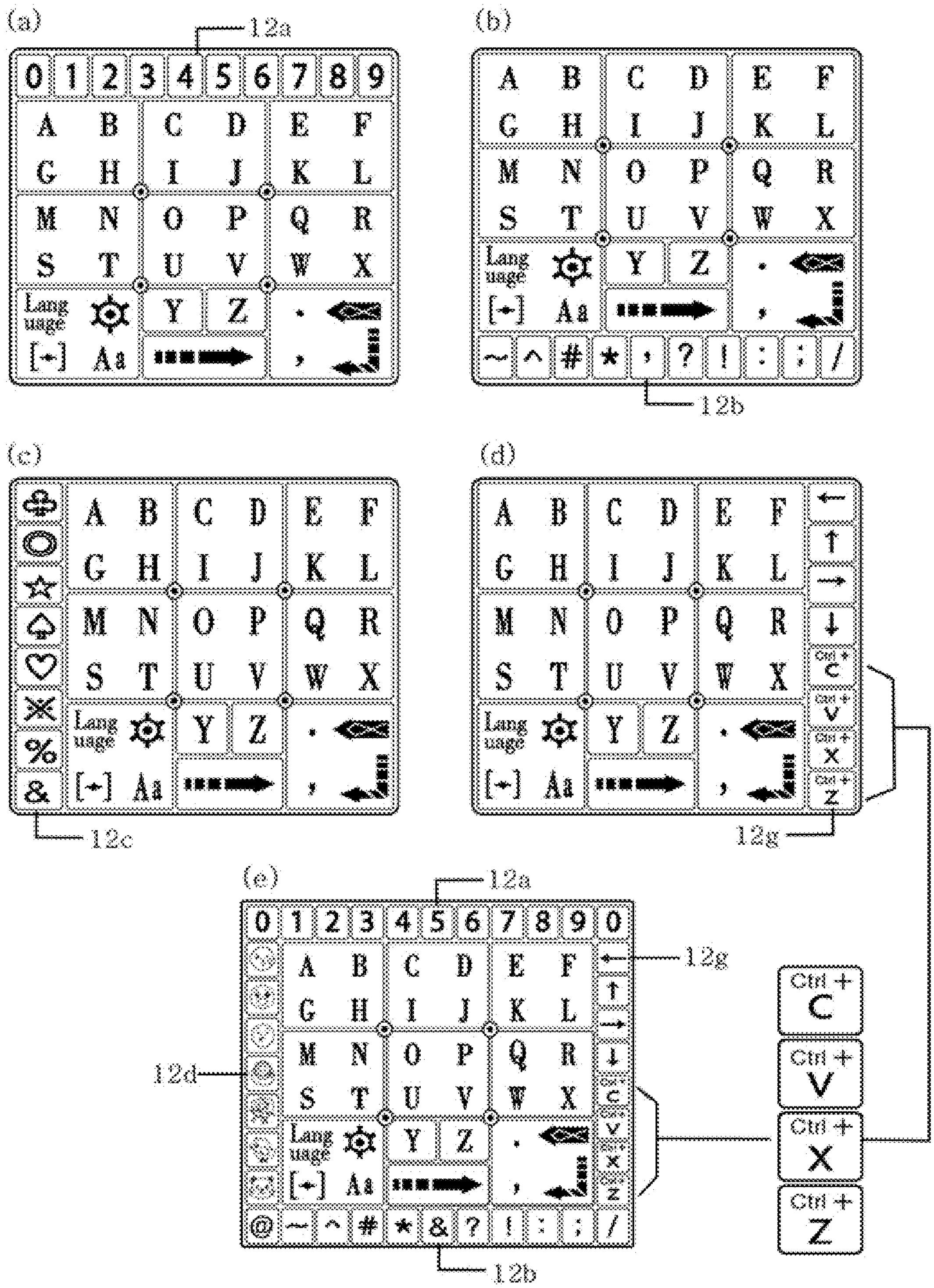

【FIG. 9】
(a)
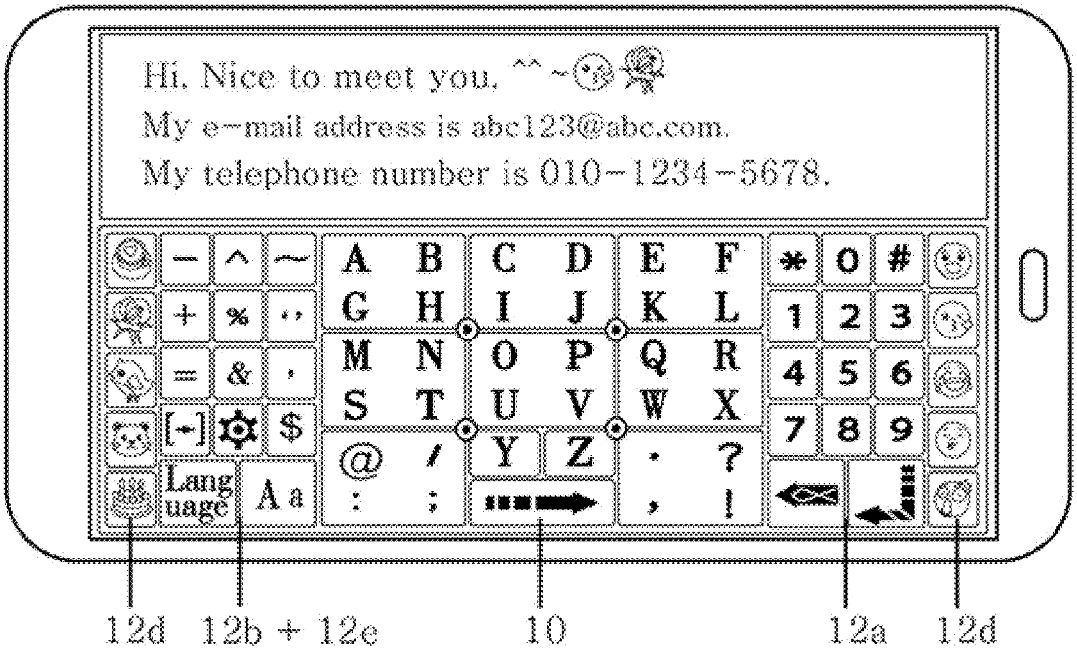
(b)
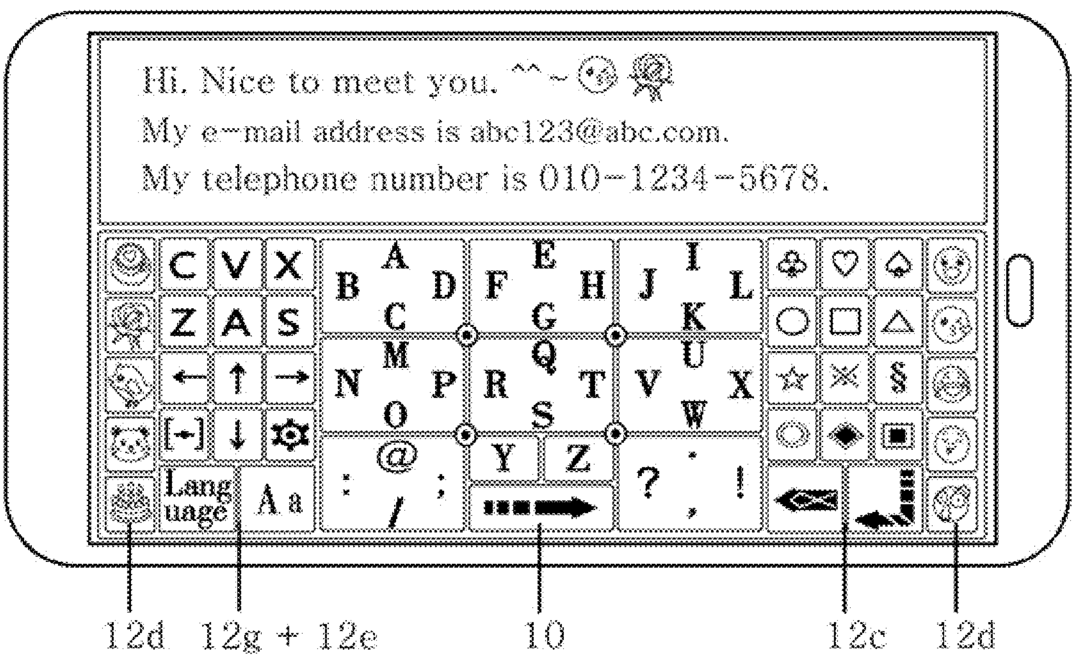

【FIG. 10】
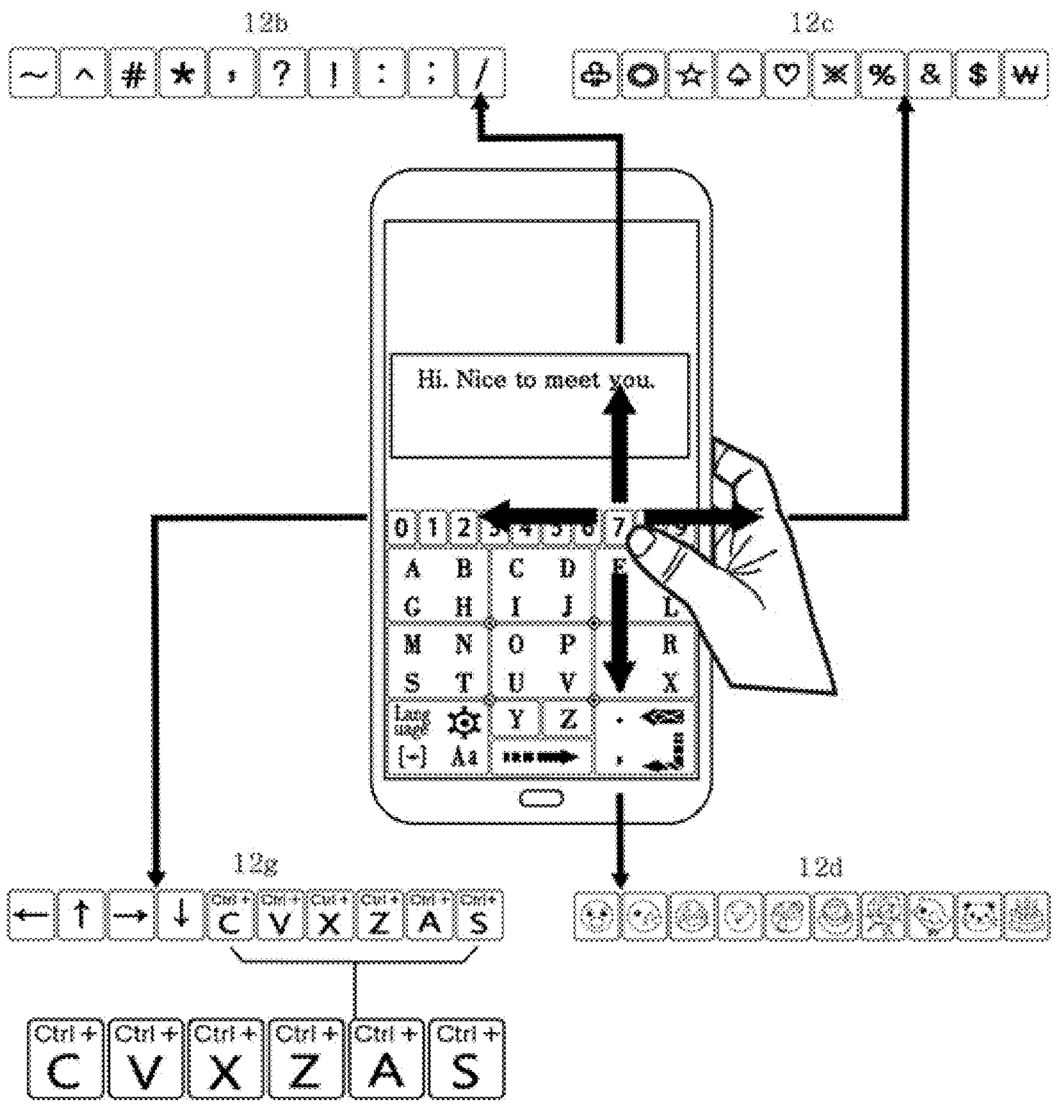

【FIG. 11】
(a)
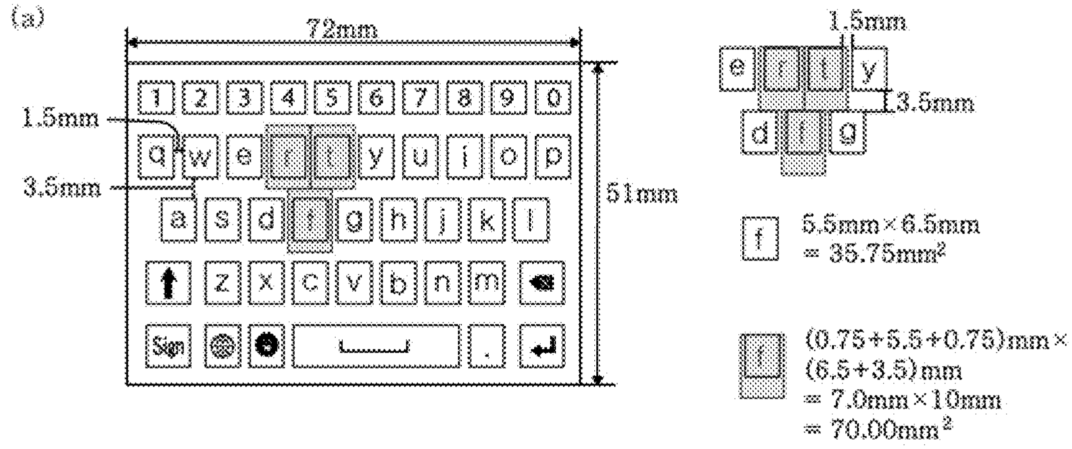
(b)
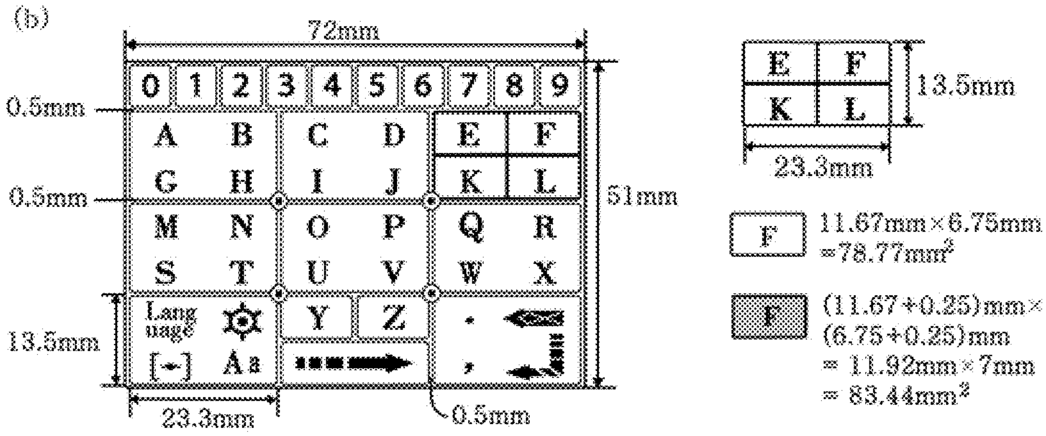

【FIG. 12A】
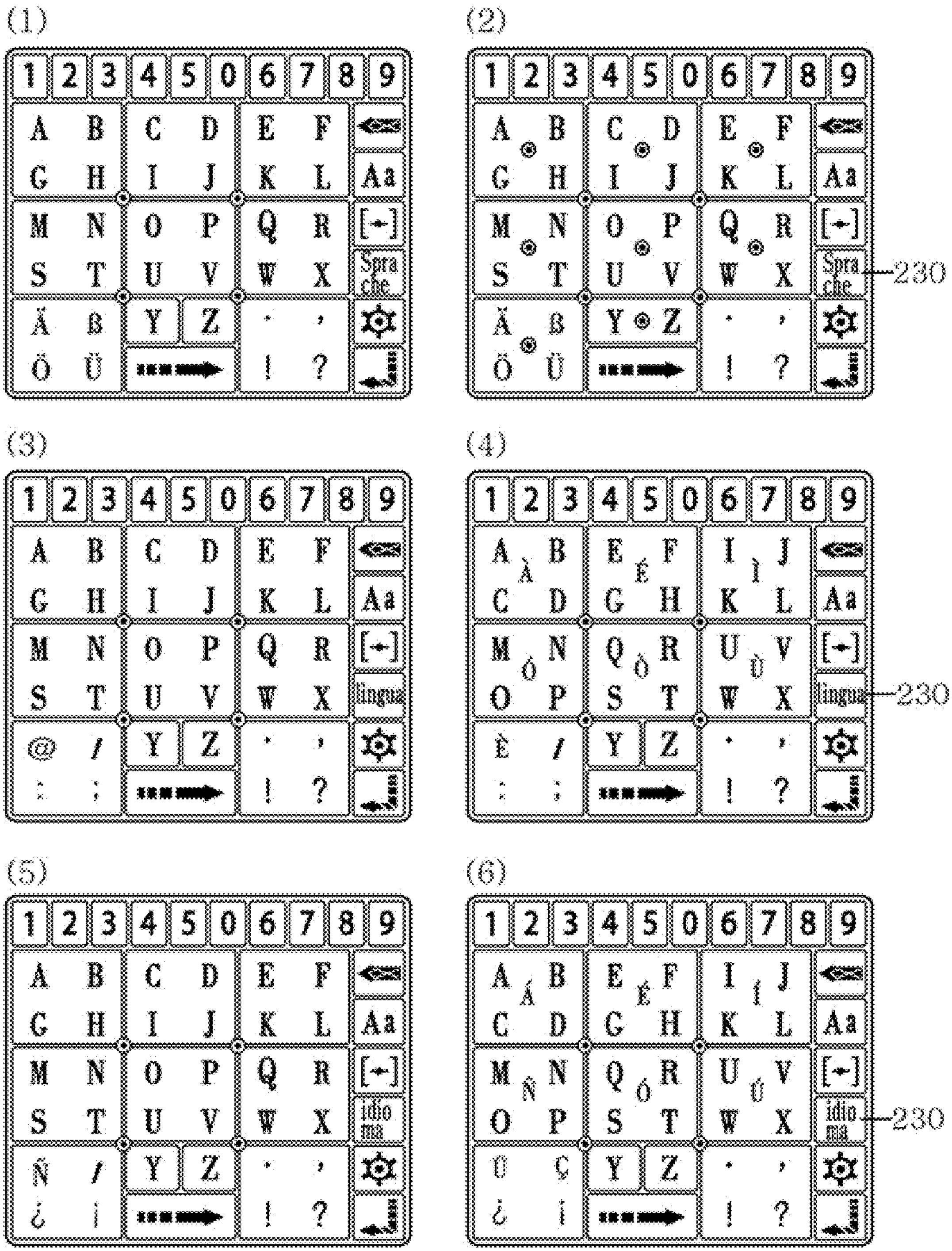

【FIG. 12B】
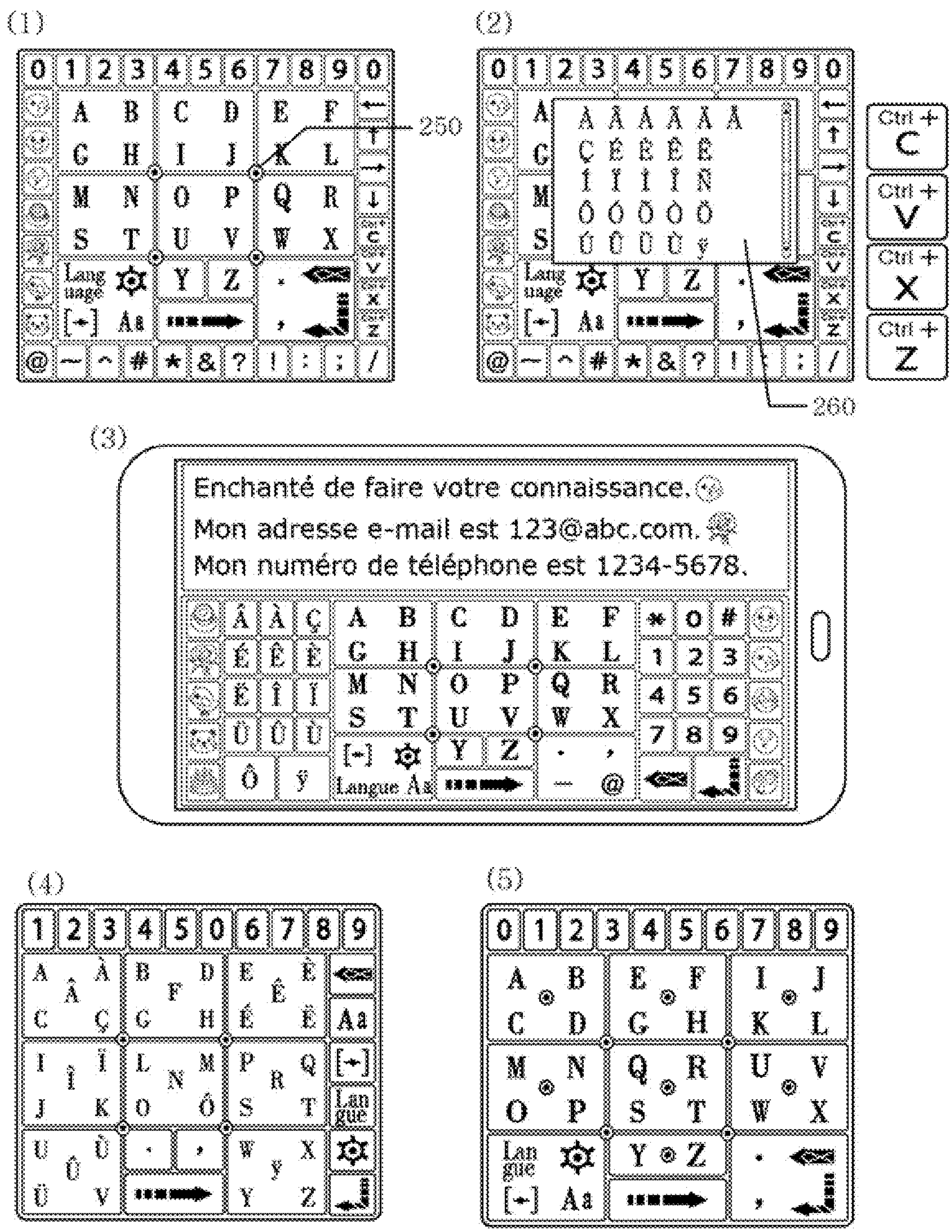

【FIG. 12C】
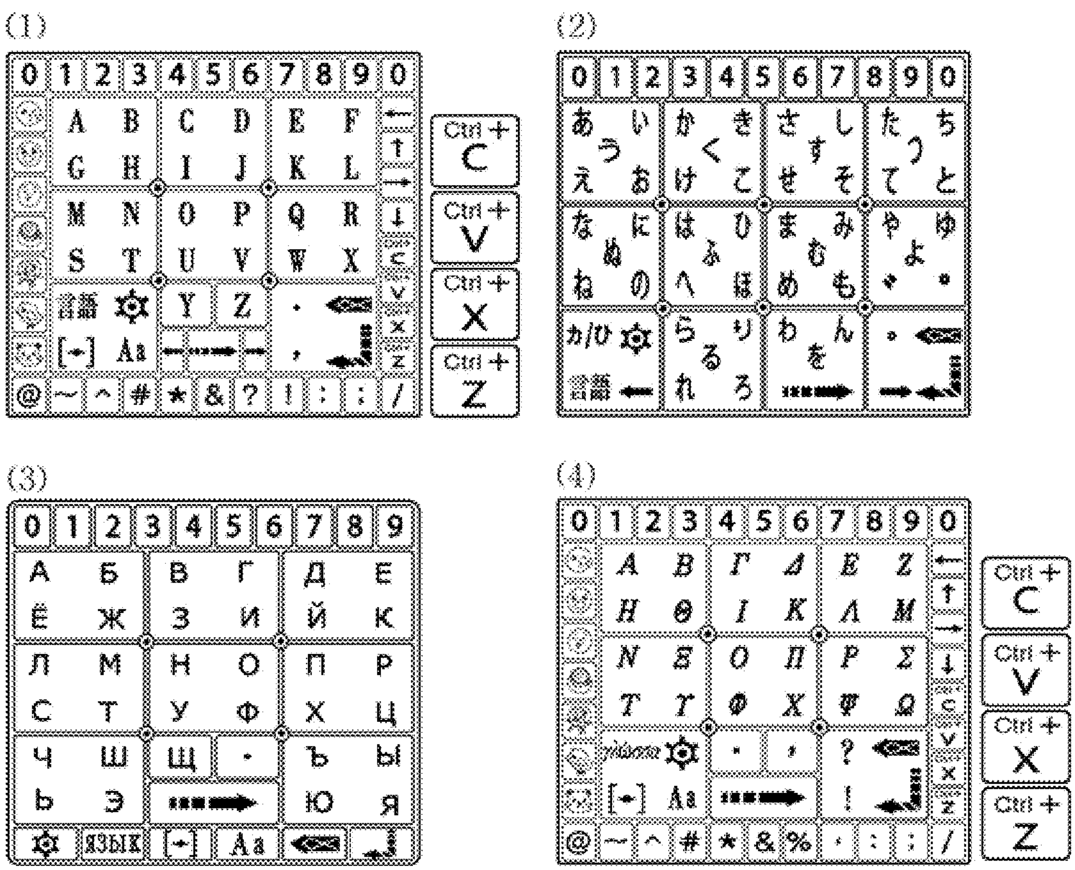

【FIG. 12D】
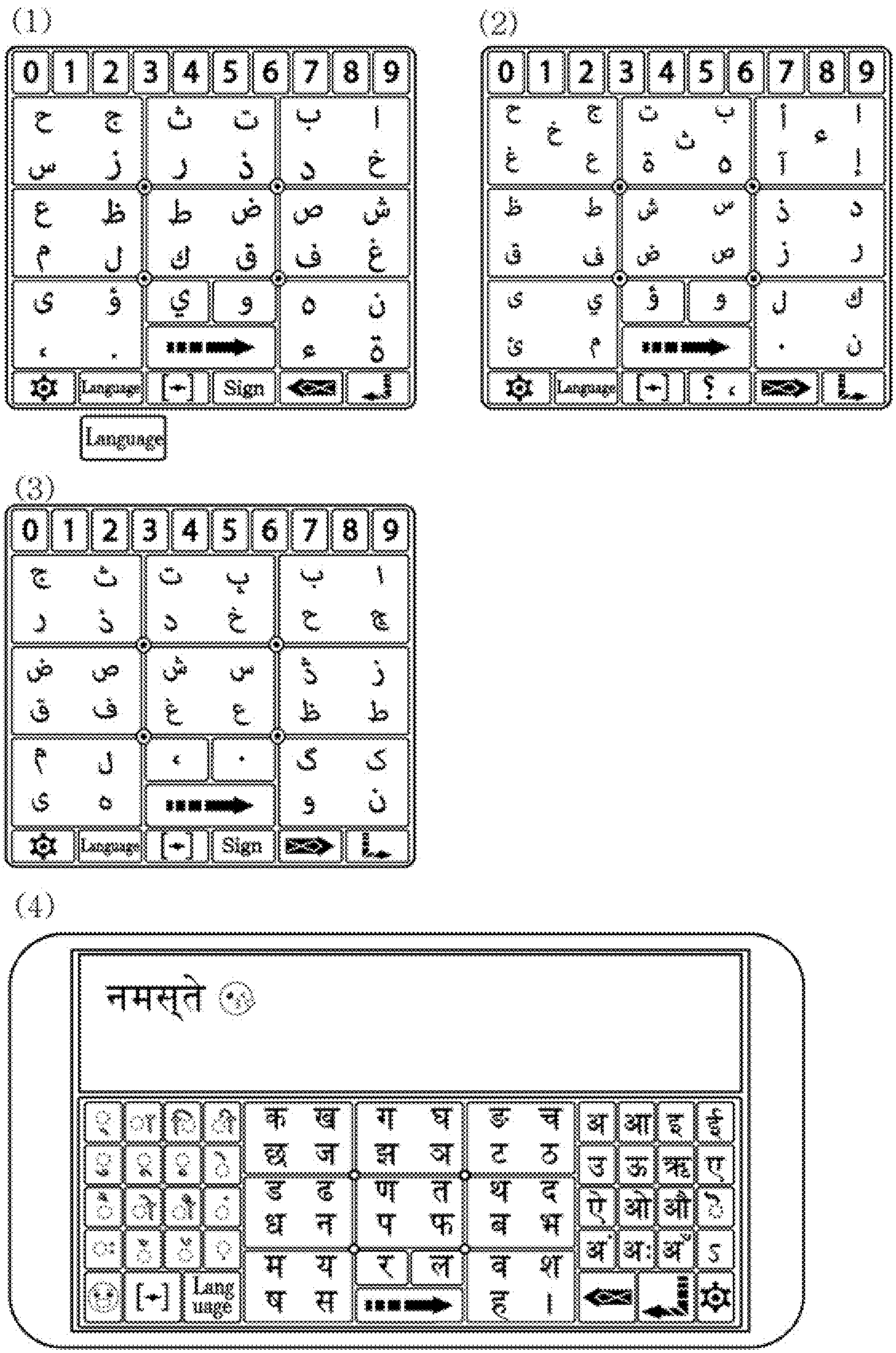

【FIG. 12E】
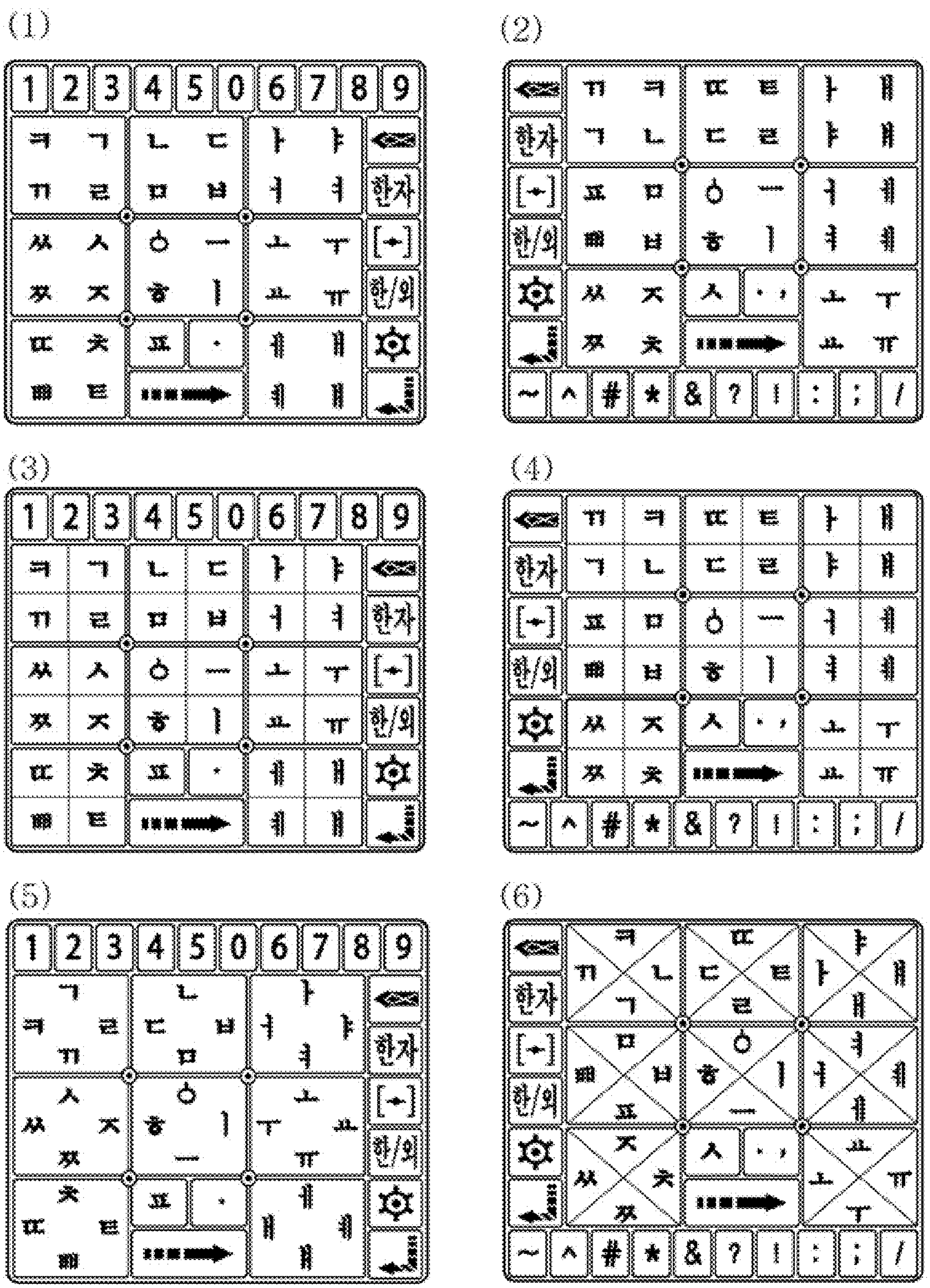

【FIG. 13】
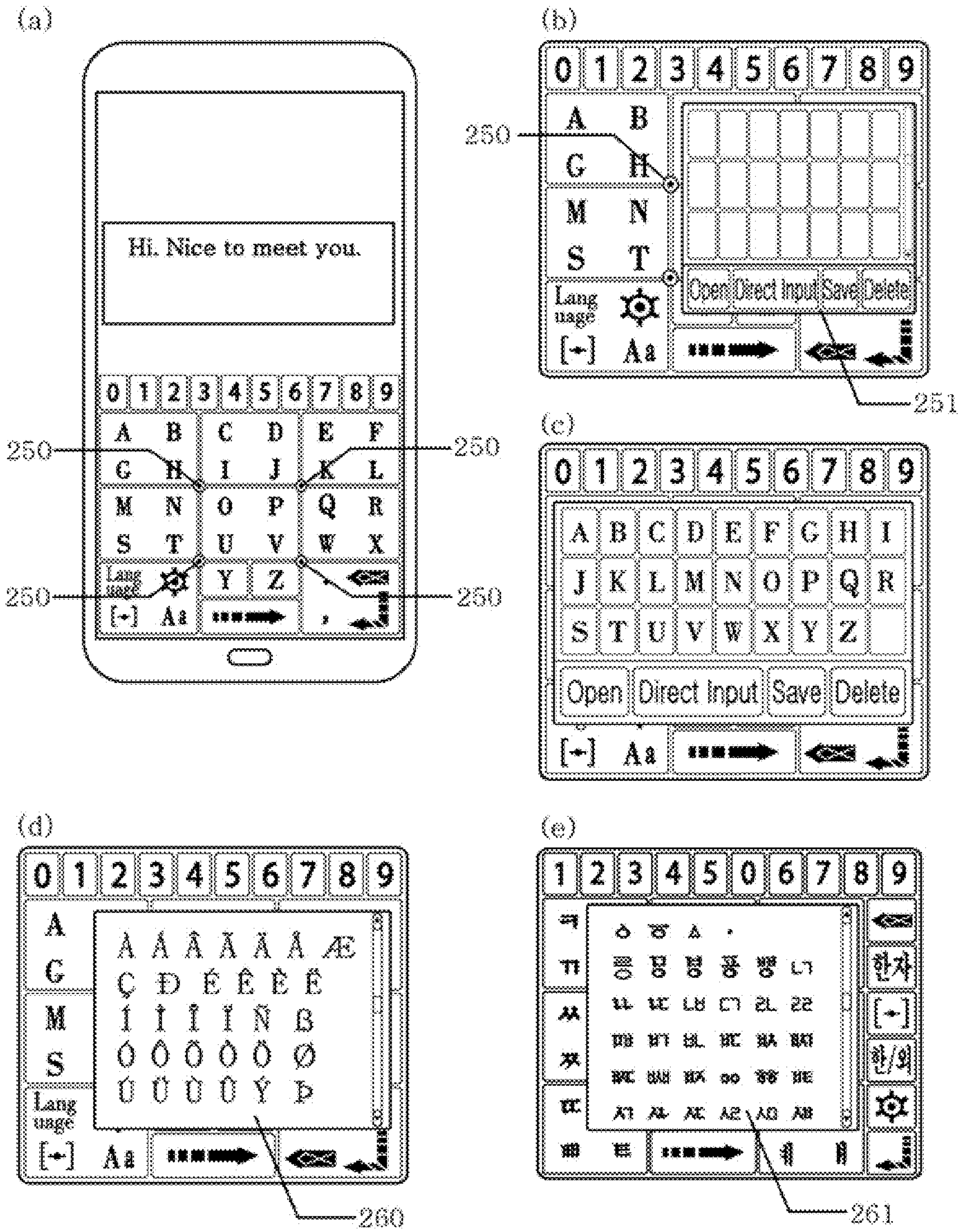

【FIG. 14】
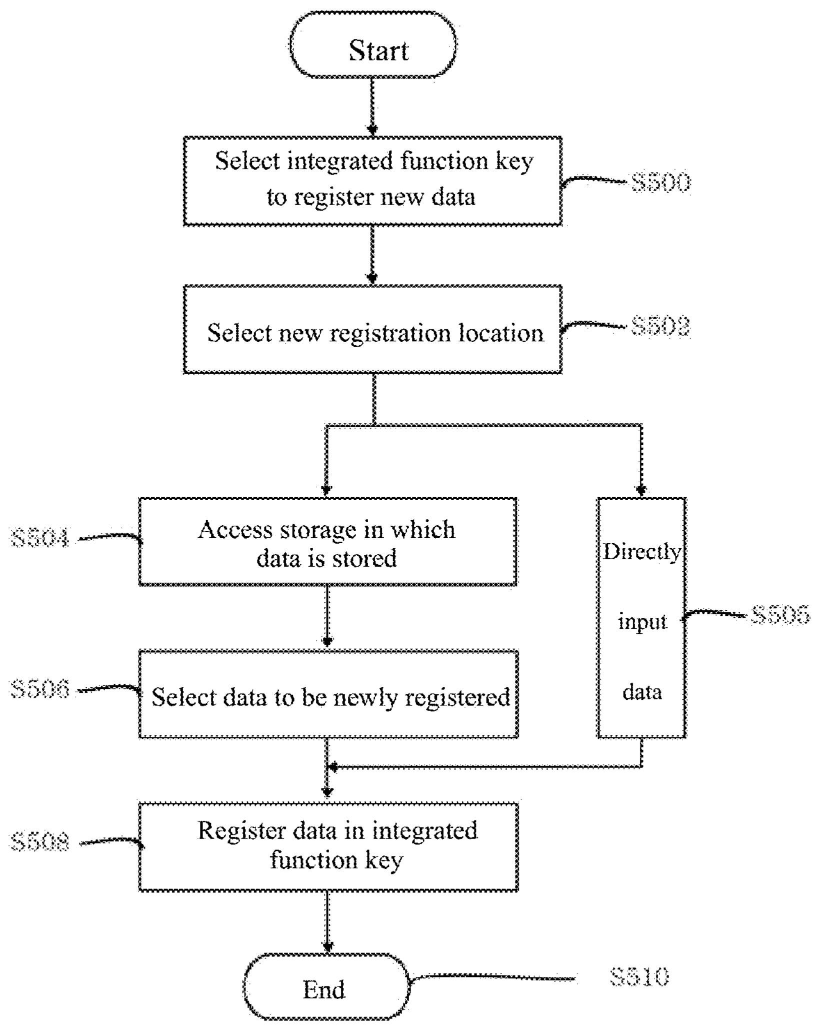

【FIG. 15】
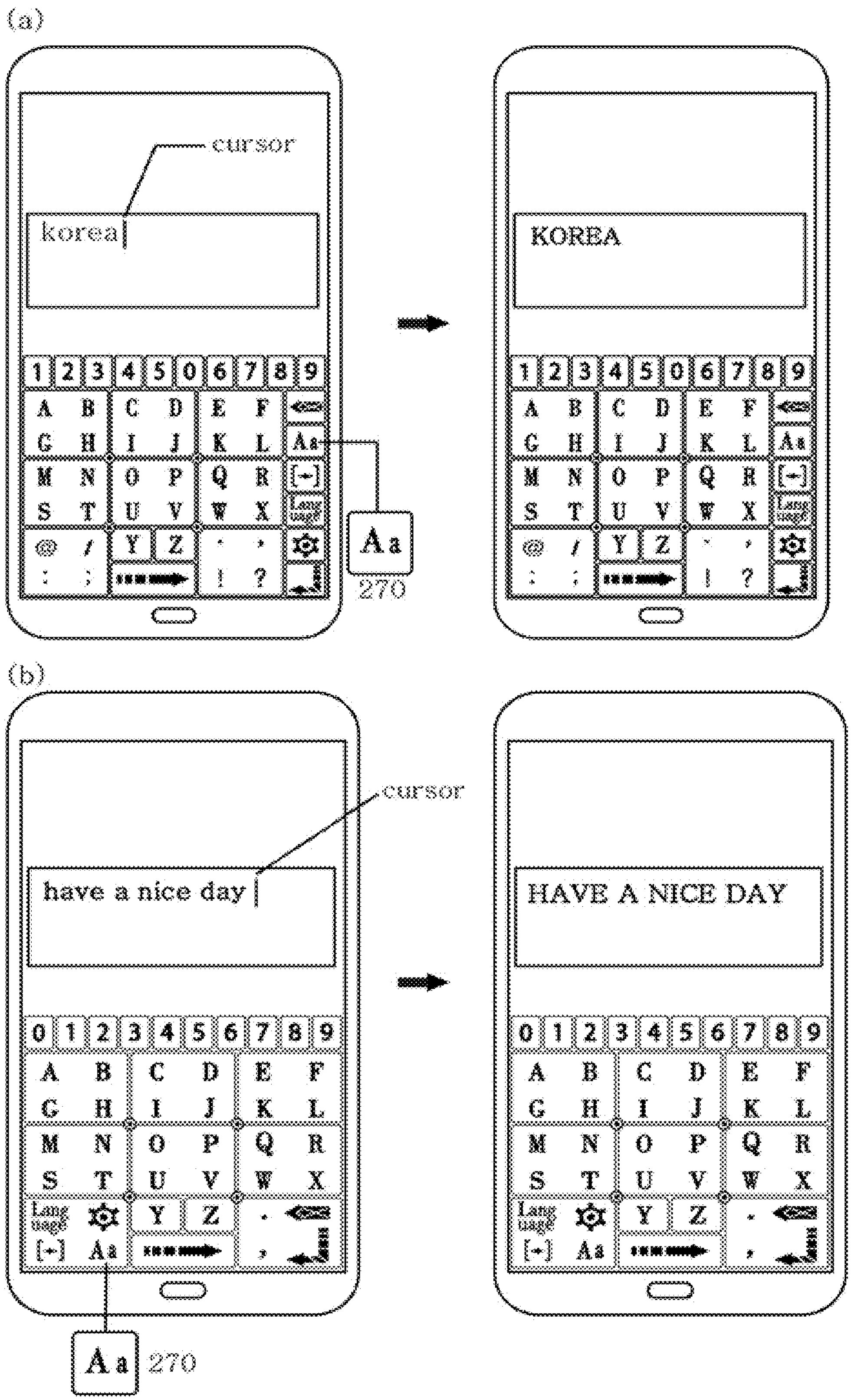

【FIG. 16A】
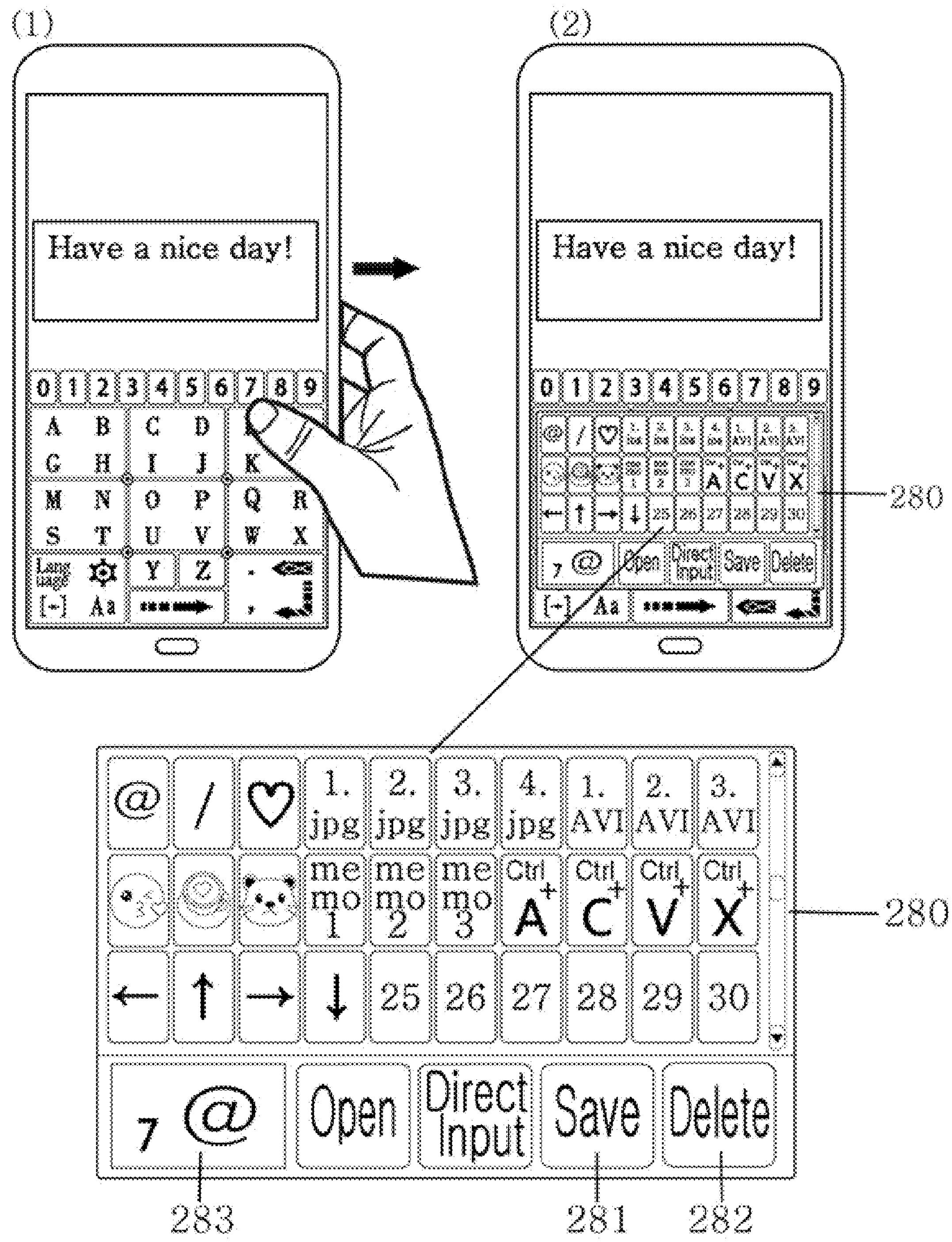

【FIG. 16B】
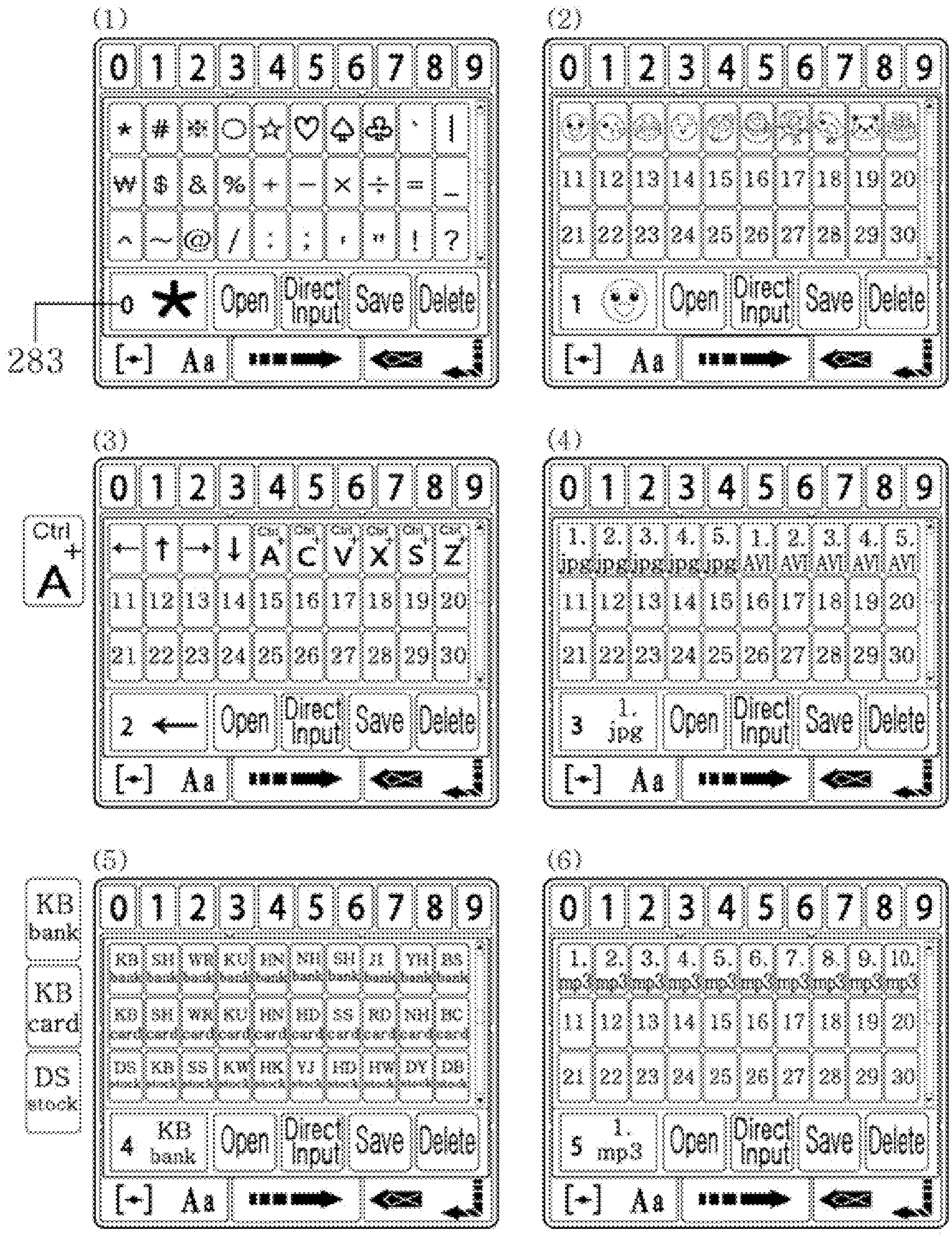

【FIG. 16C】
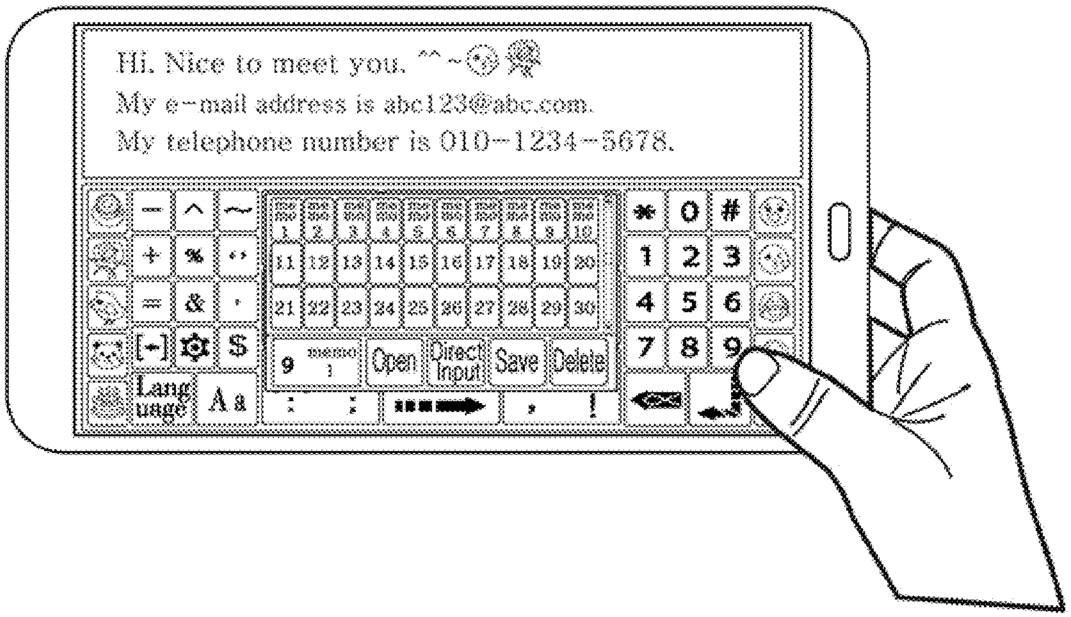
【FIG. 16D】
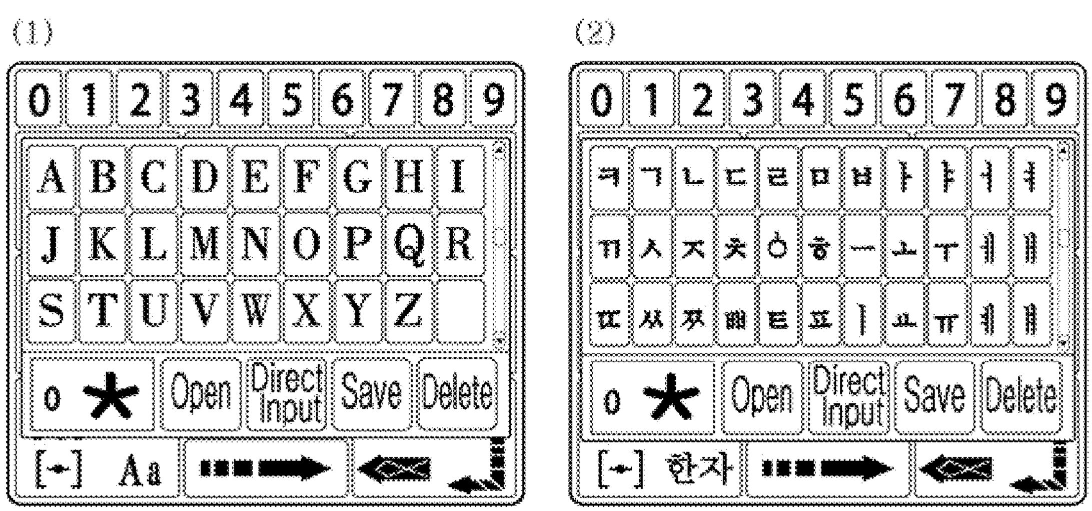

【FIG. 16E】
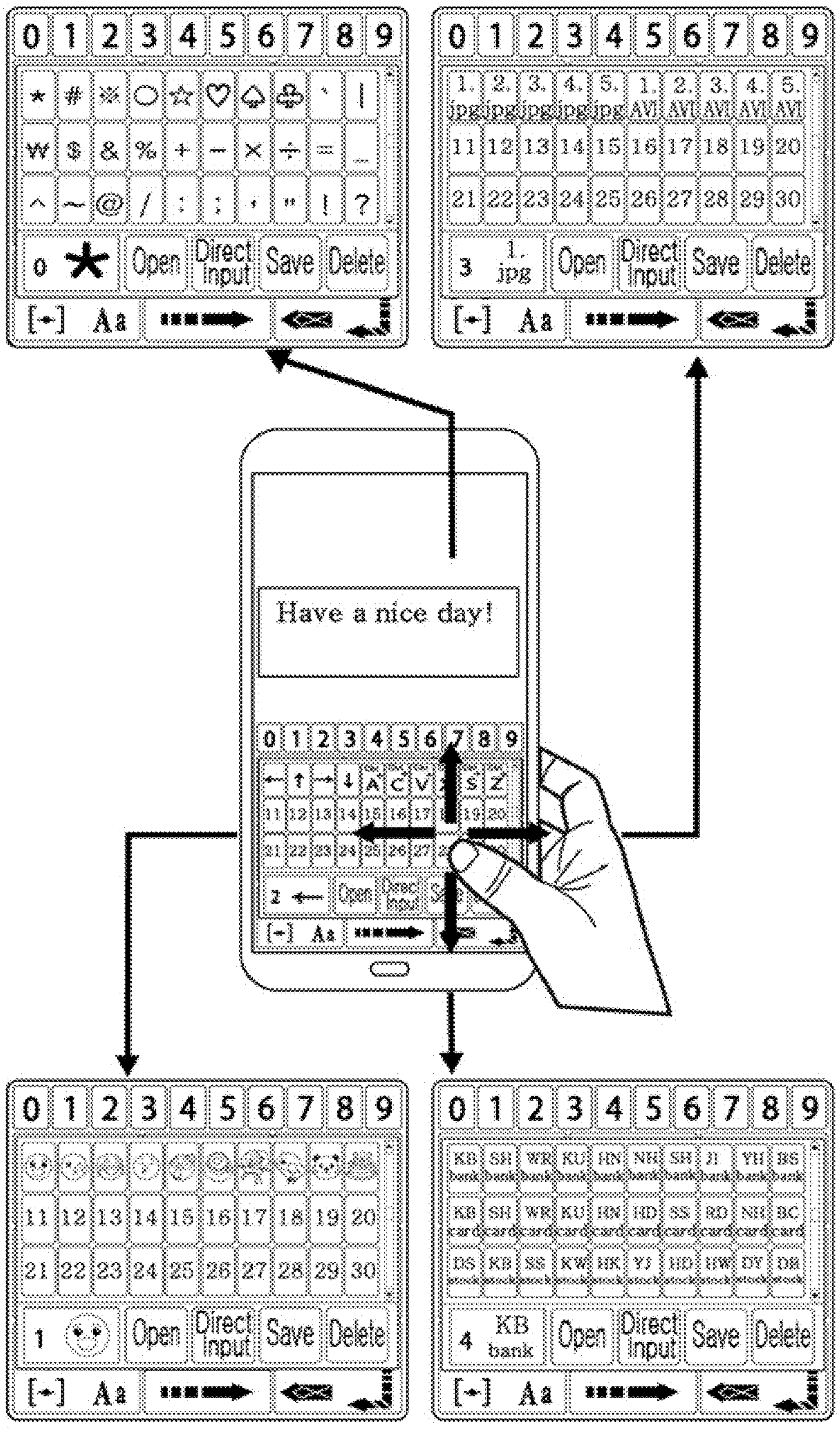

【FIG. 17A】
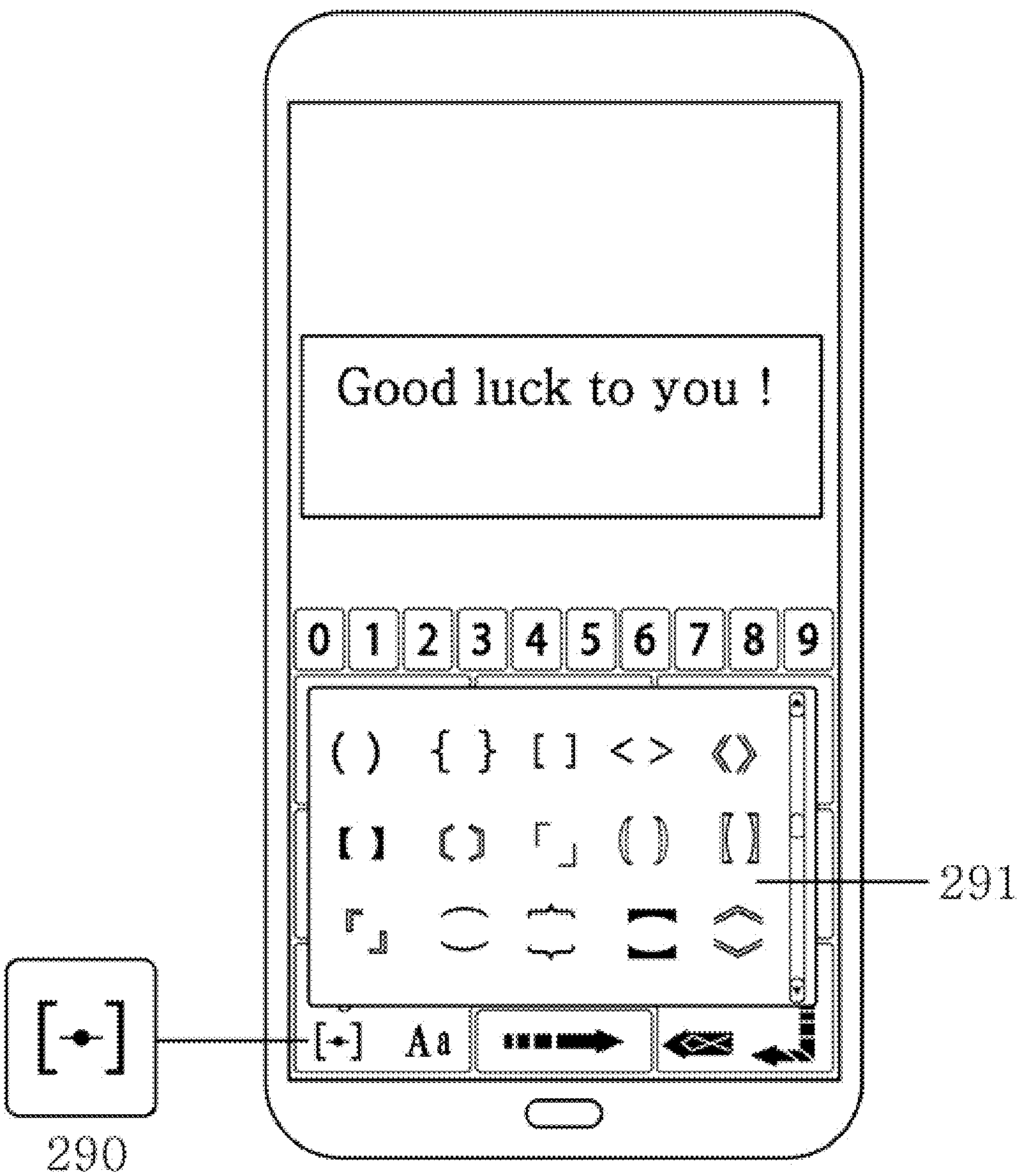

【FIG. 17B】
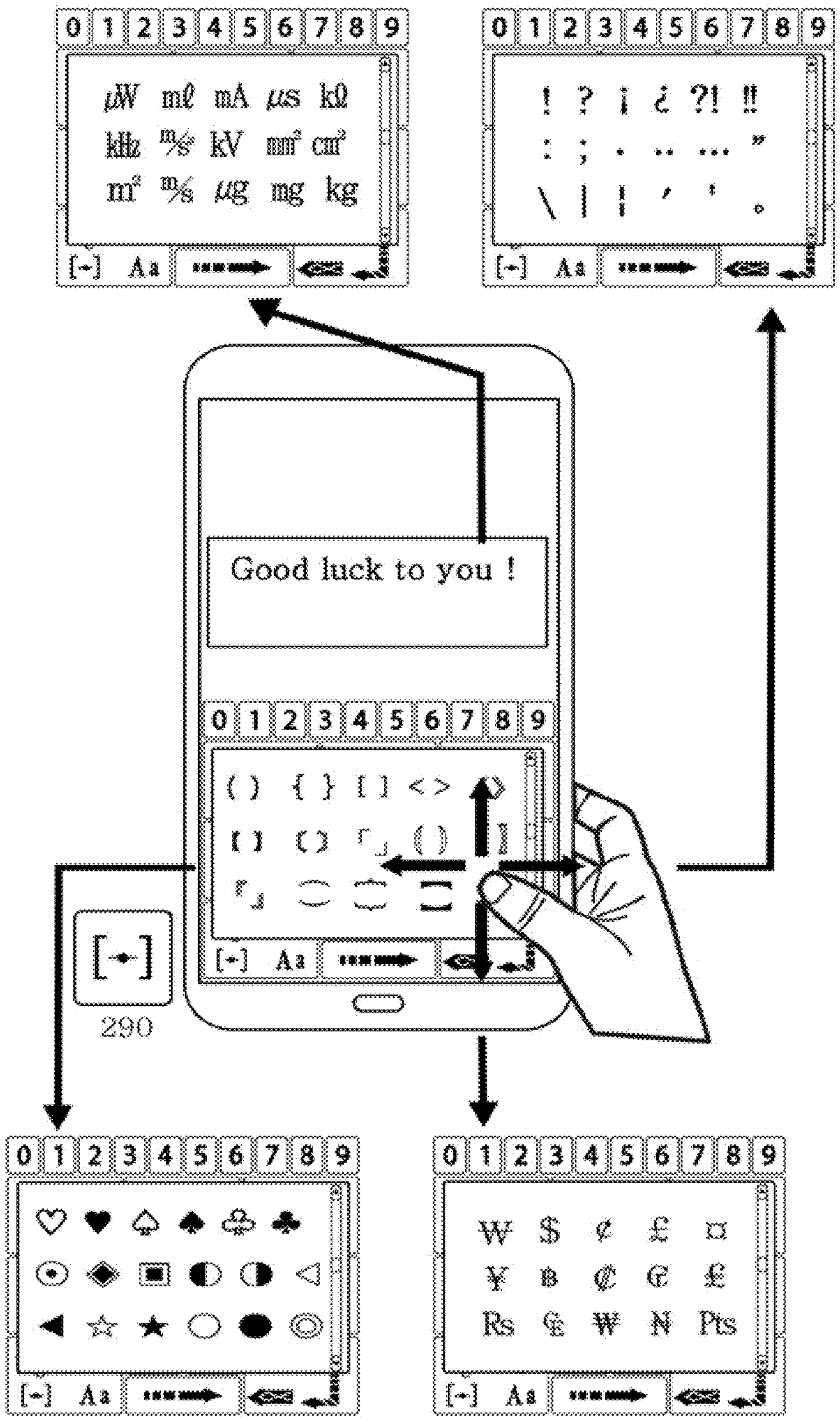

【FIG. 17C】
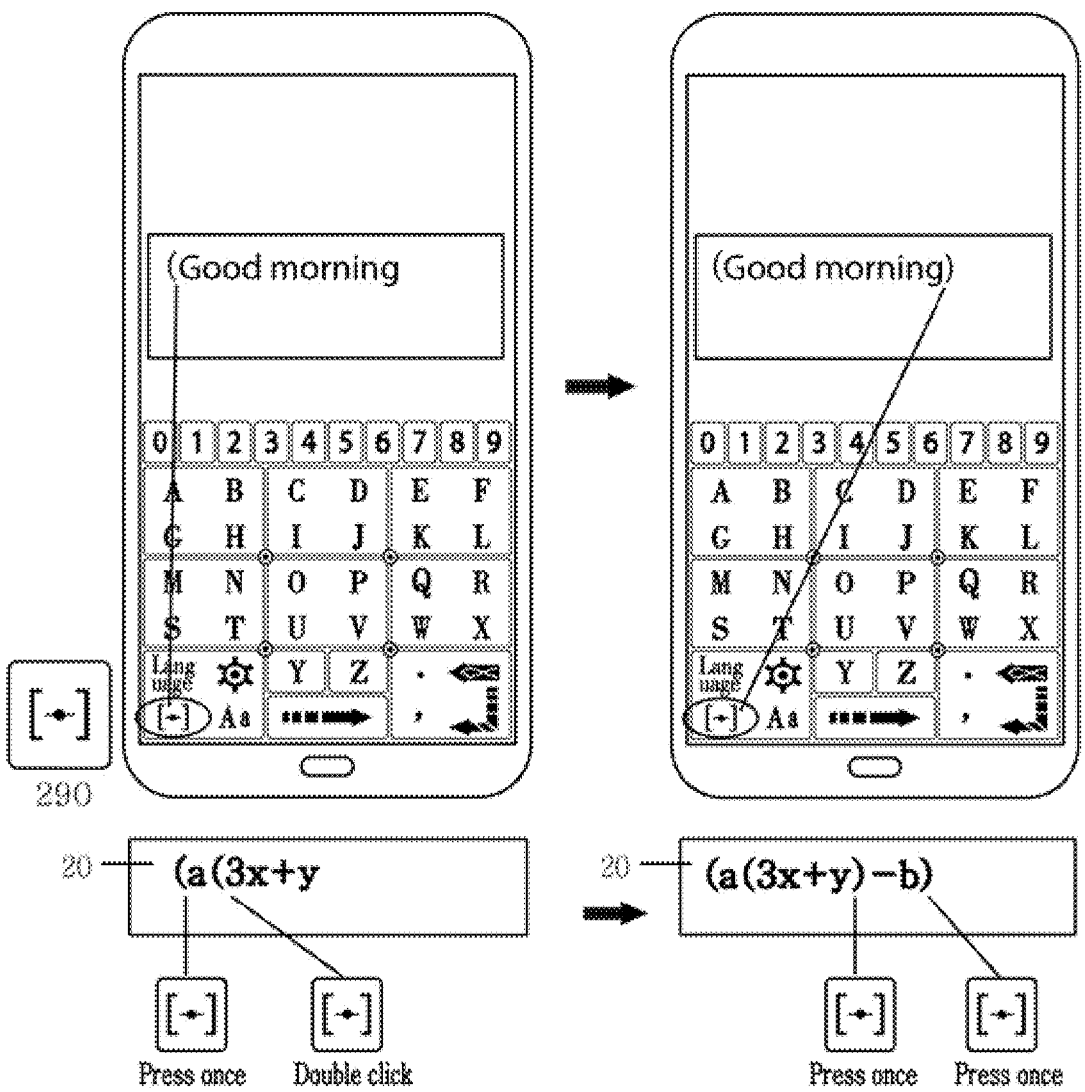

【FIG. 17D】
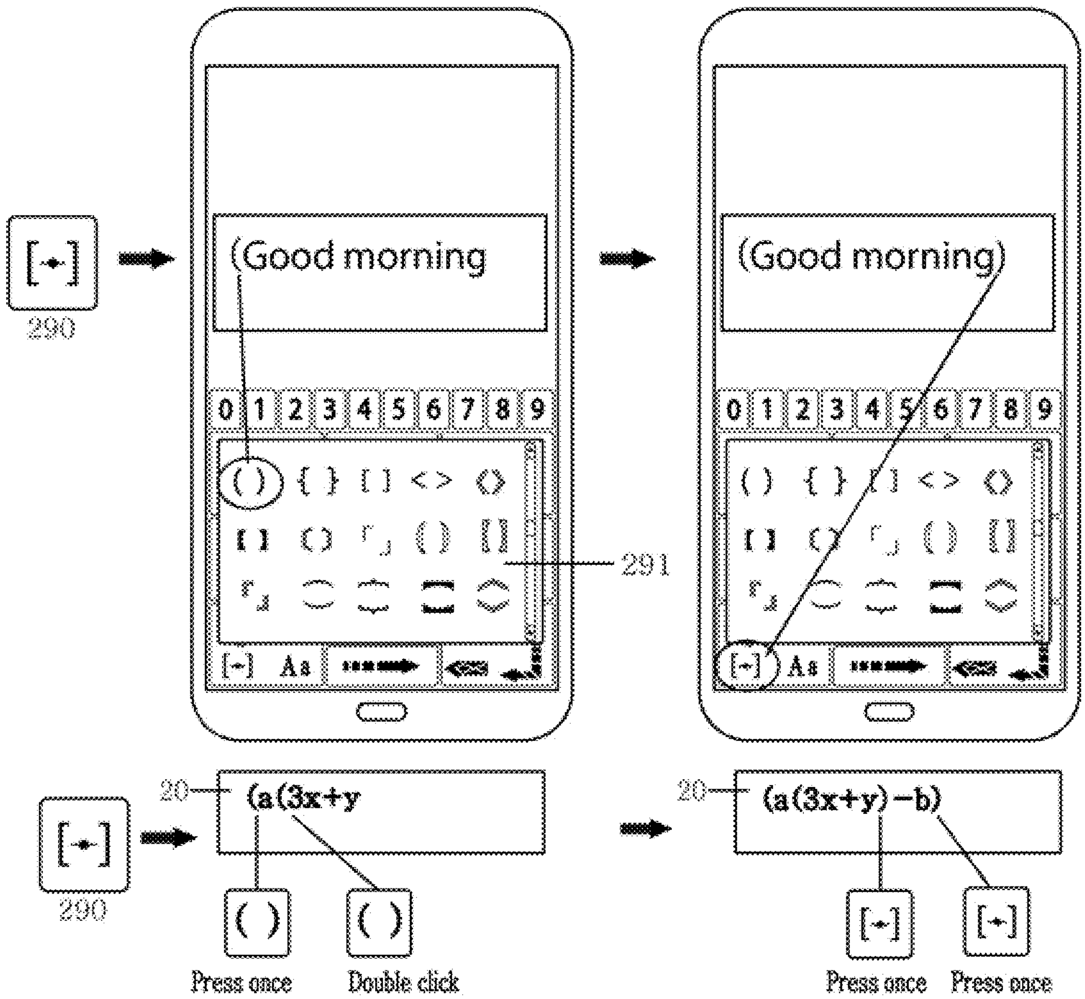

【FIG. 18】
(a)
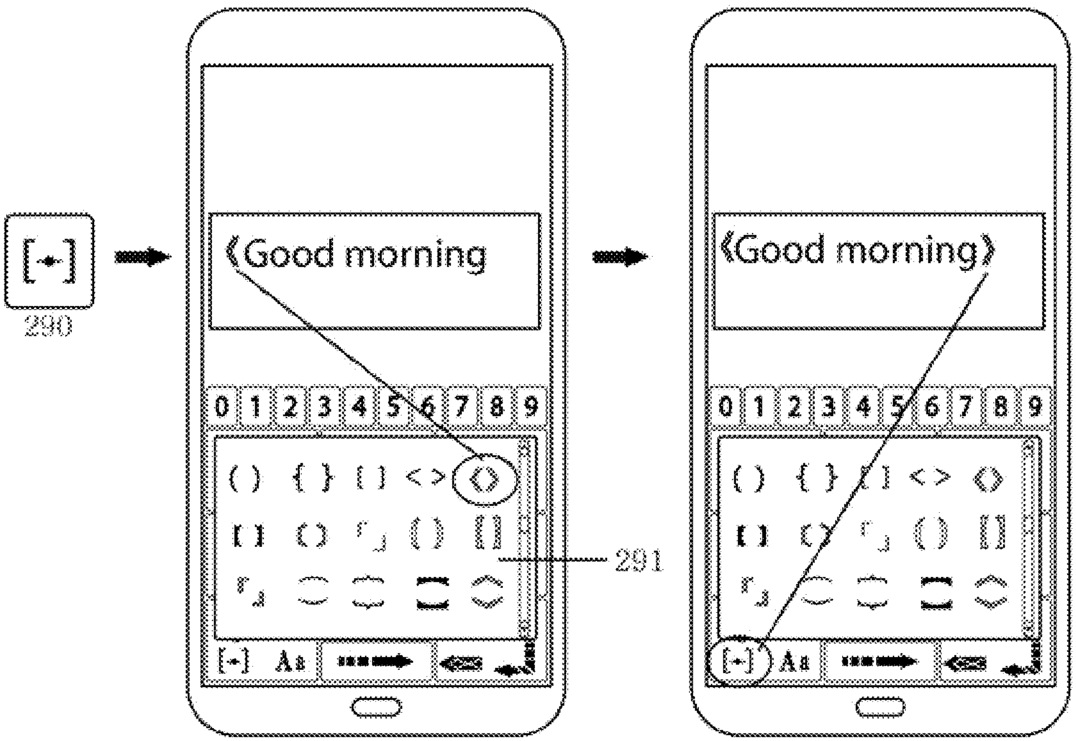
(b)
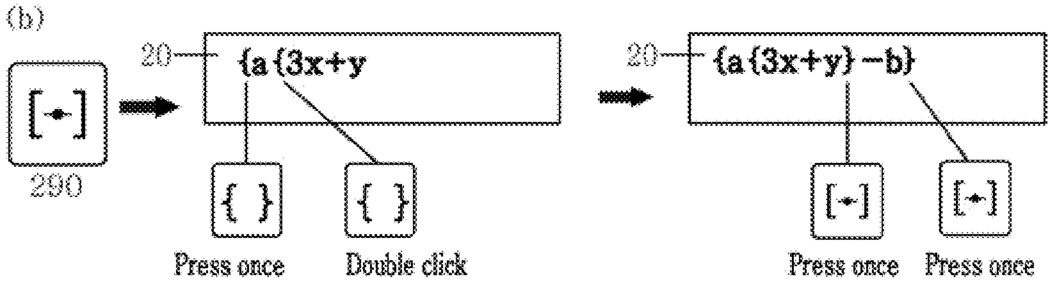

【FIG. 19】
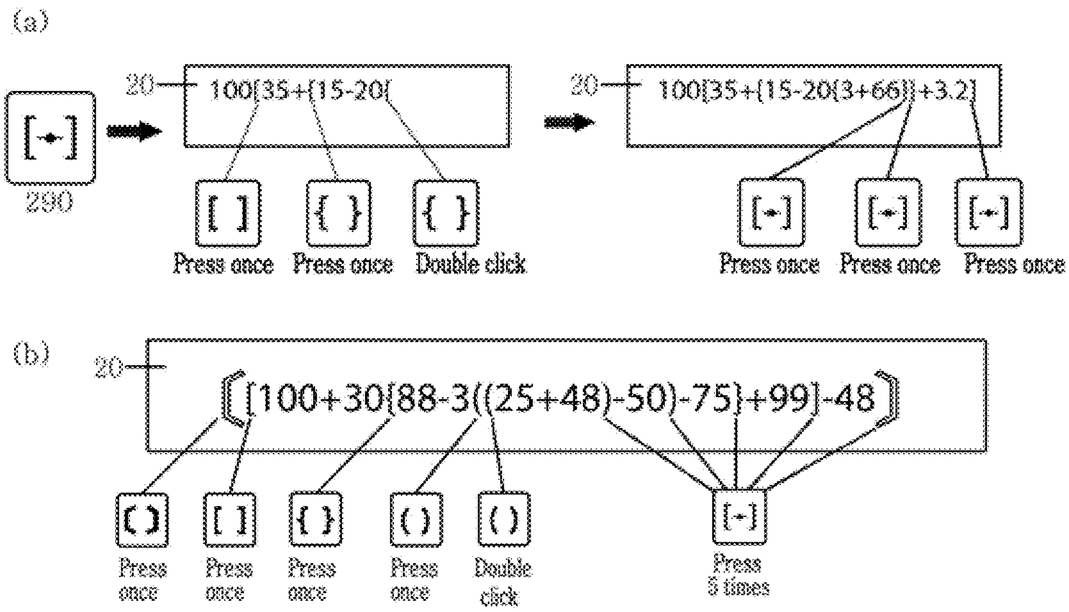
【FIG. 20】
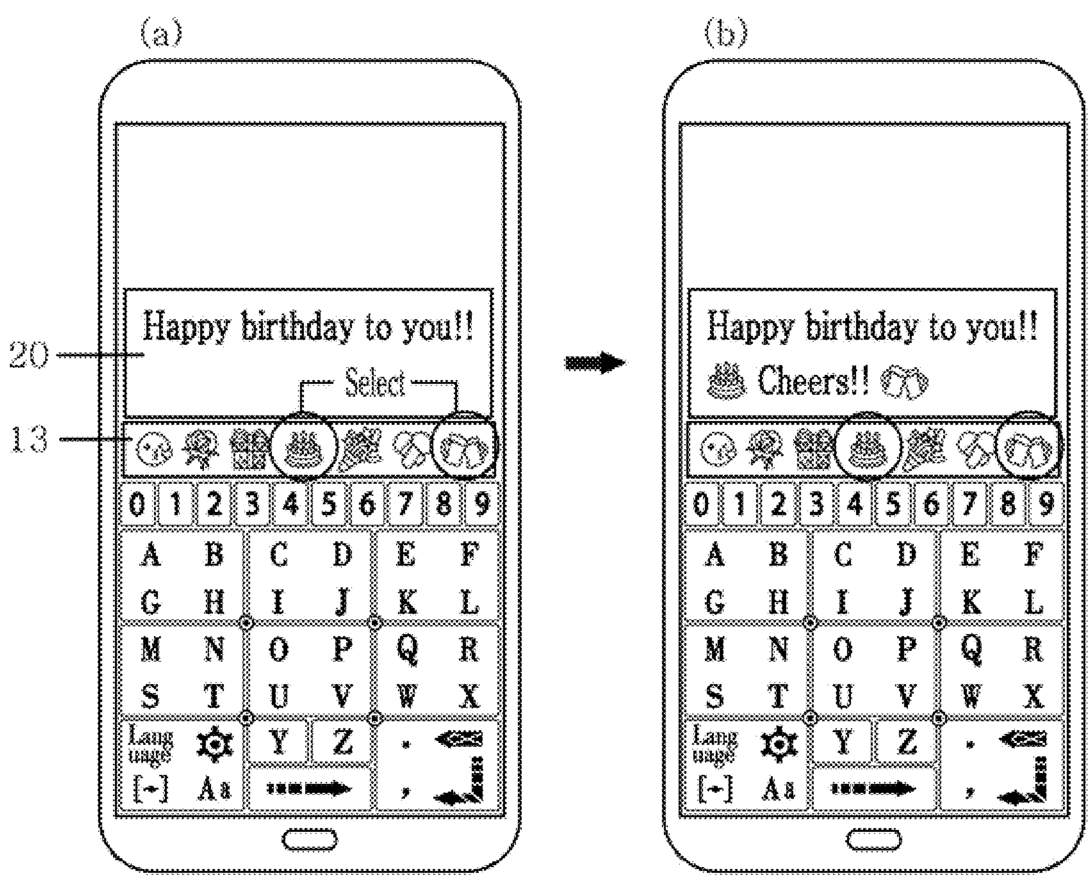
5

【FIG. 21】
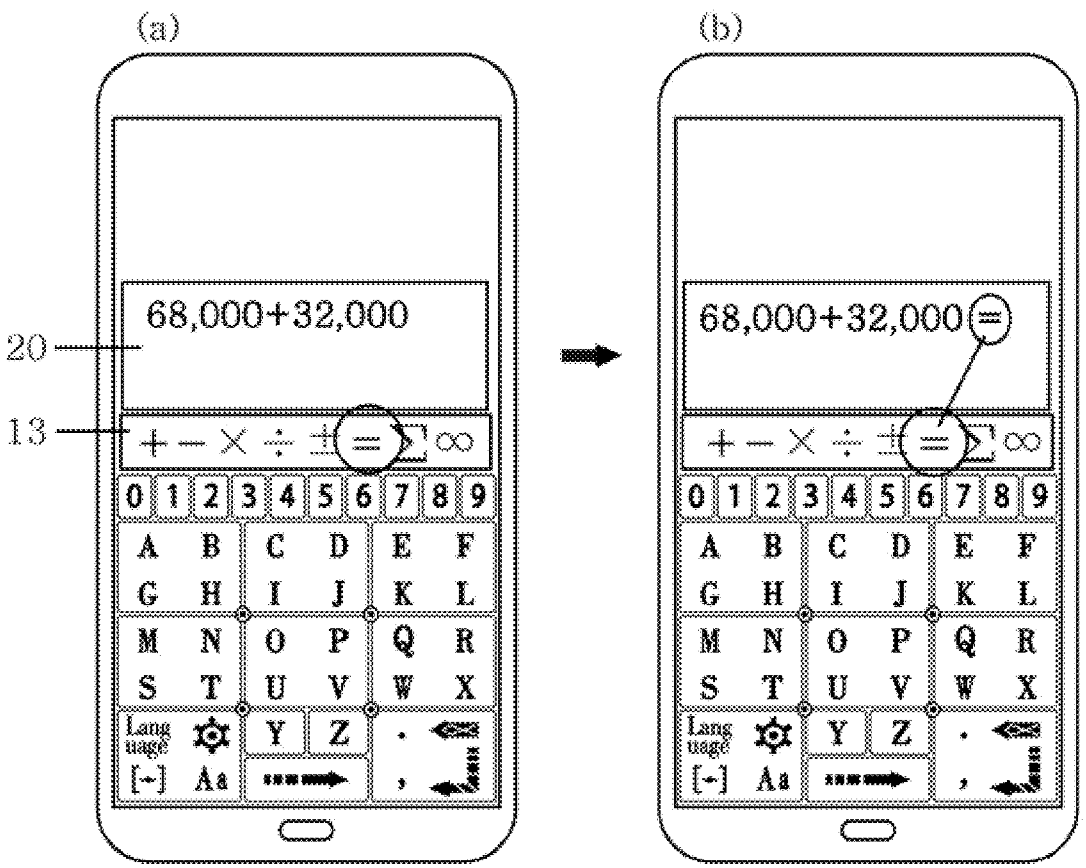

【FIG. 22】
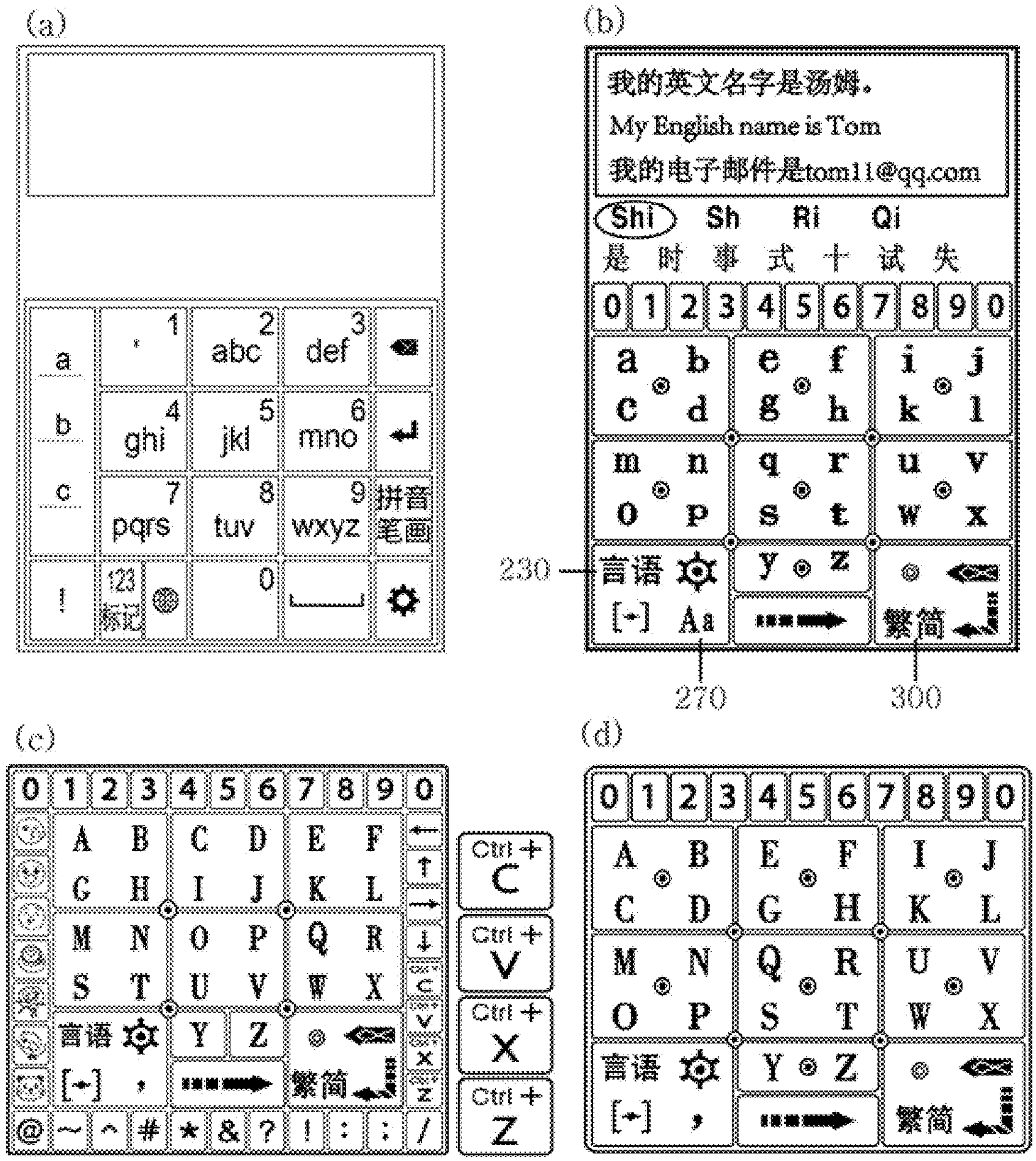

【FIG. 23A】
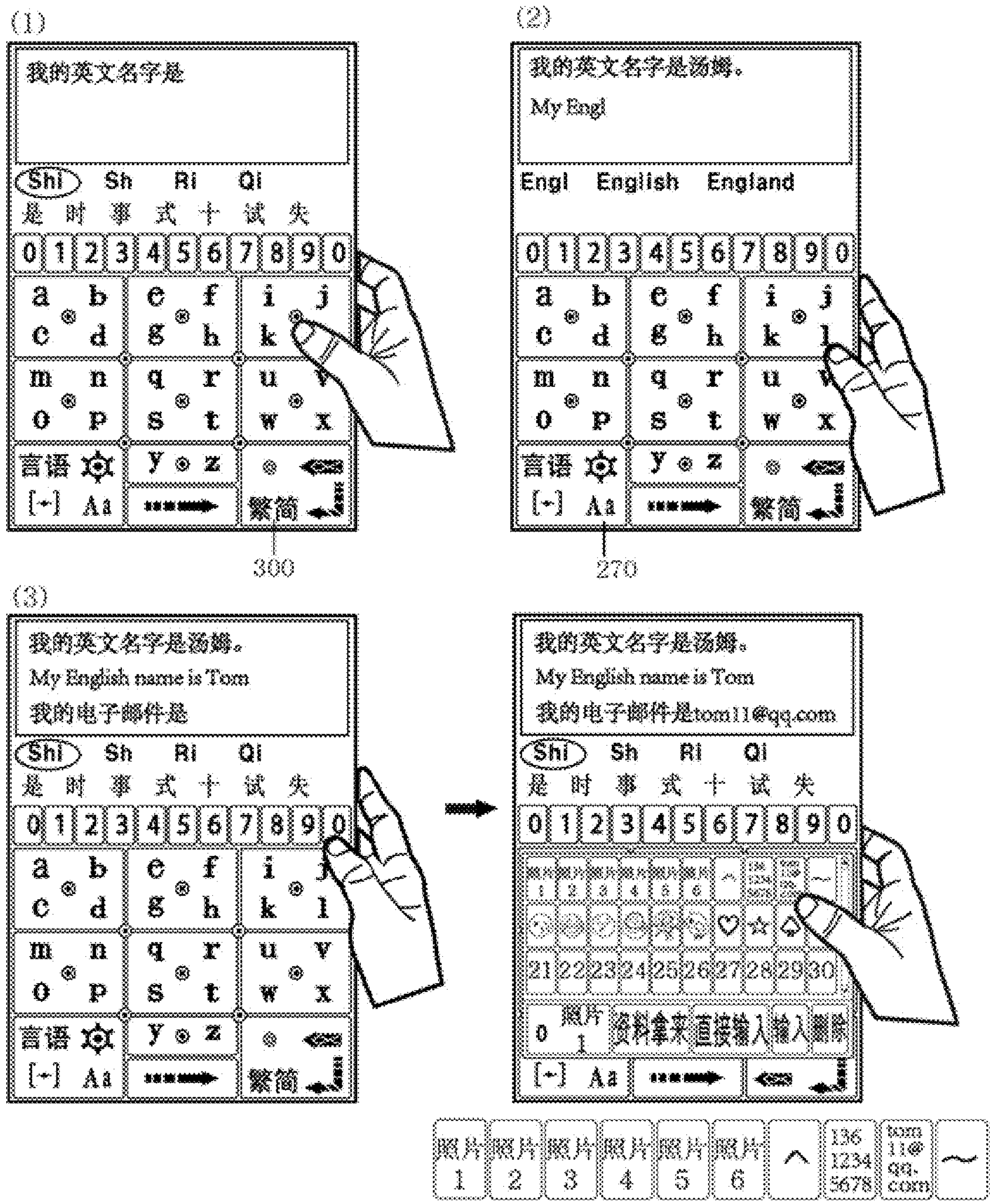

【FIG. 23B】
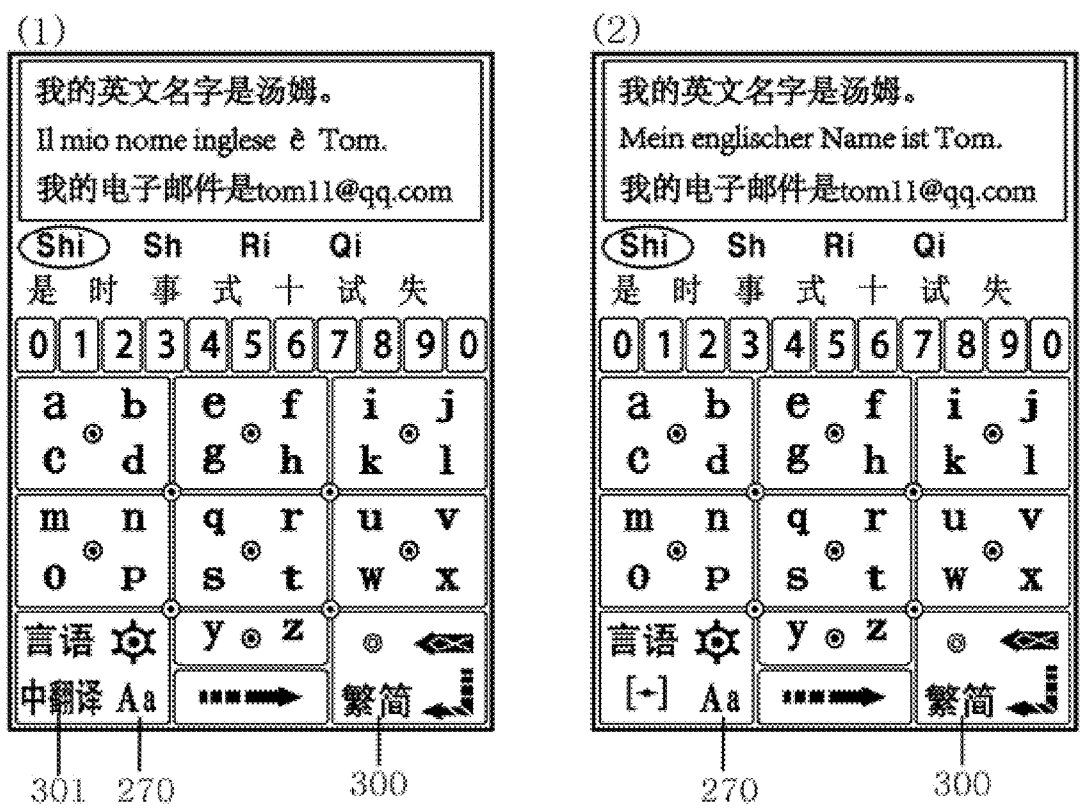

【FIG. 24】
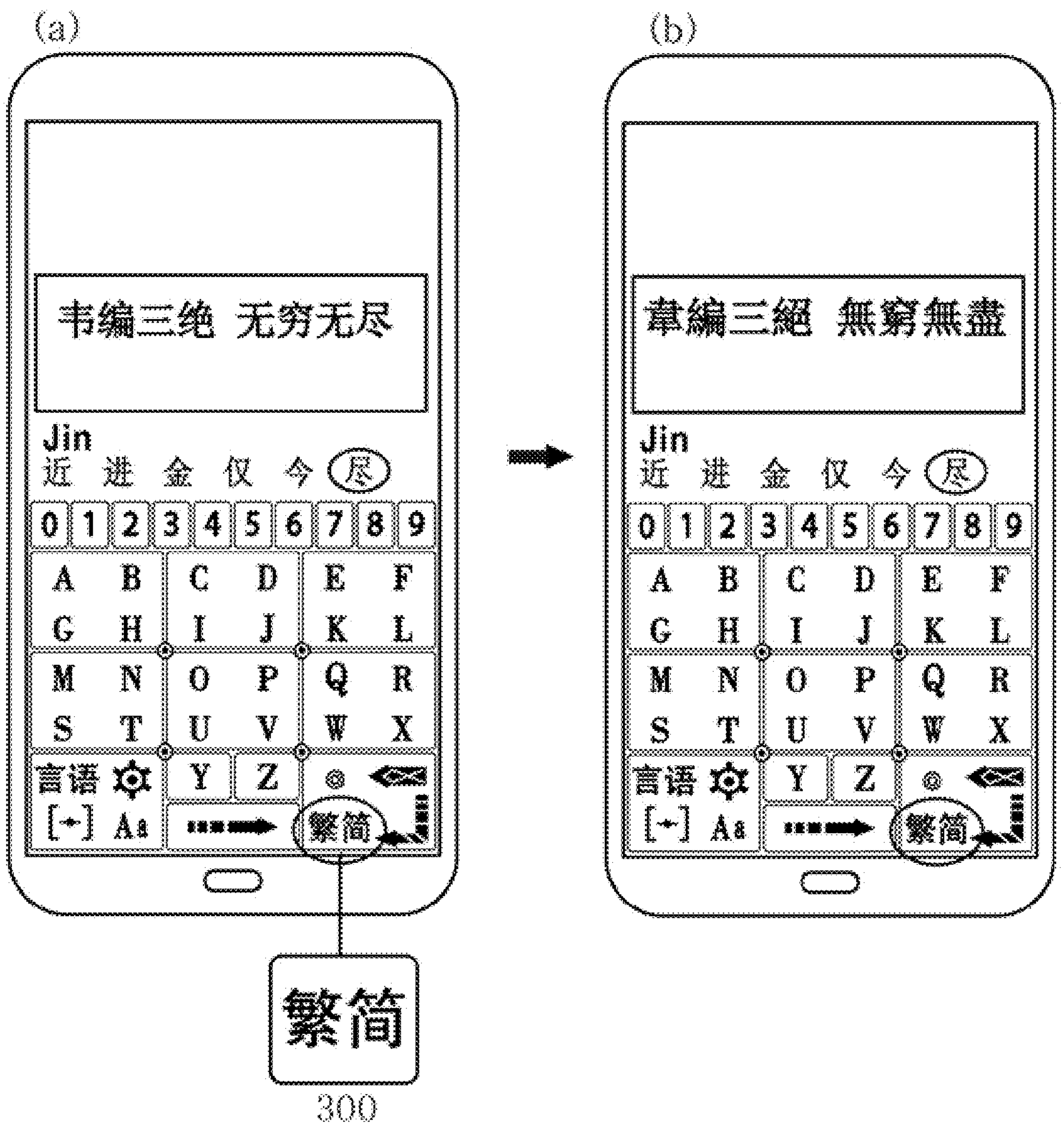

【FIG. 25A(1)】
(1)
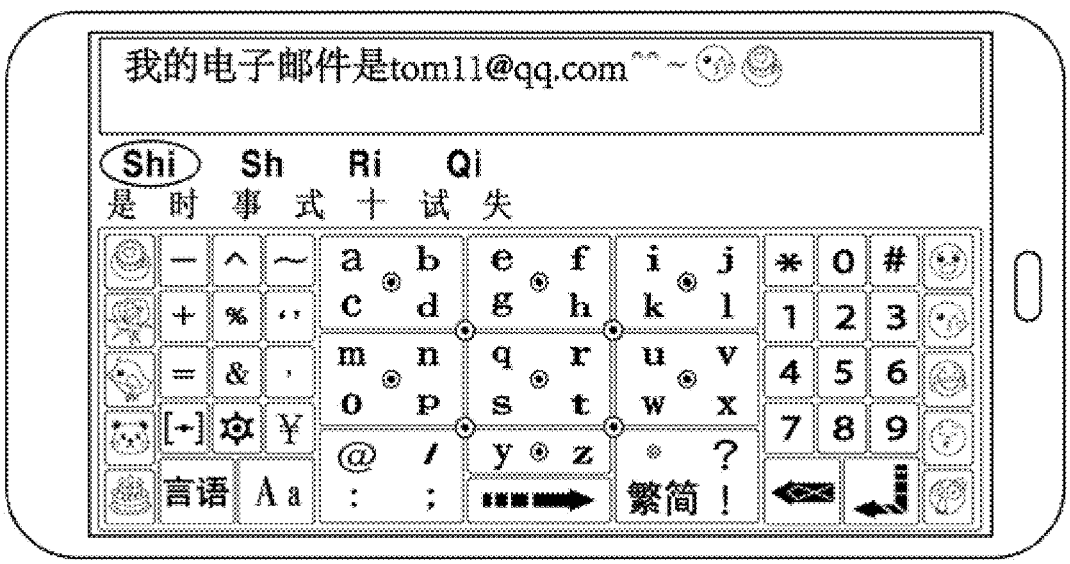

【FIG. 25A(2)】
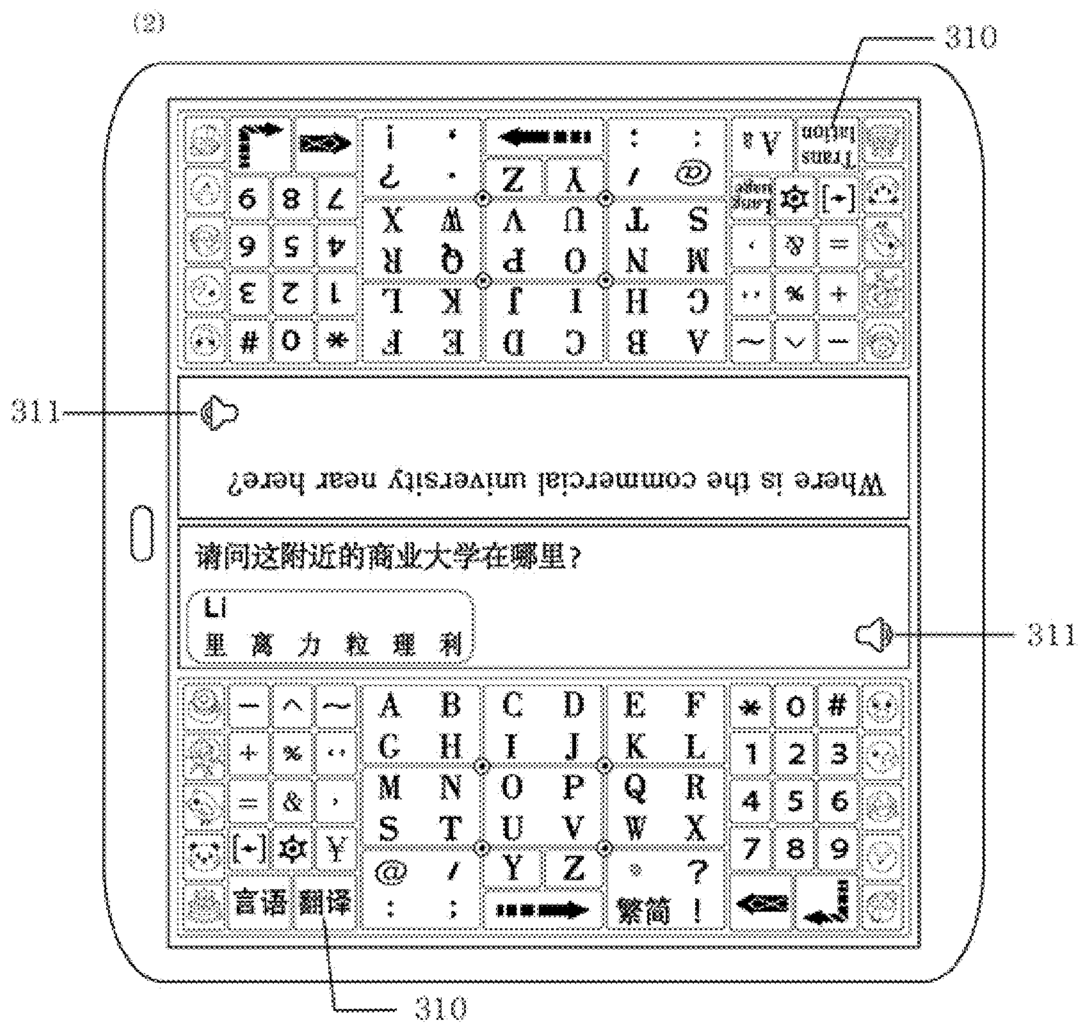

【FIG. 25B(1)】
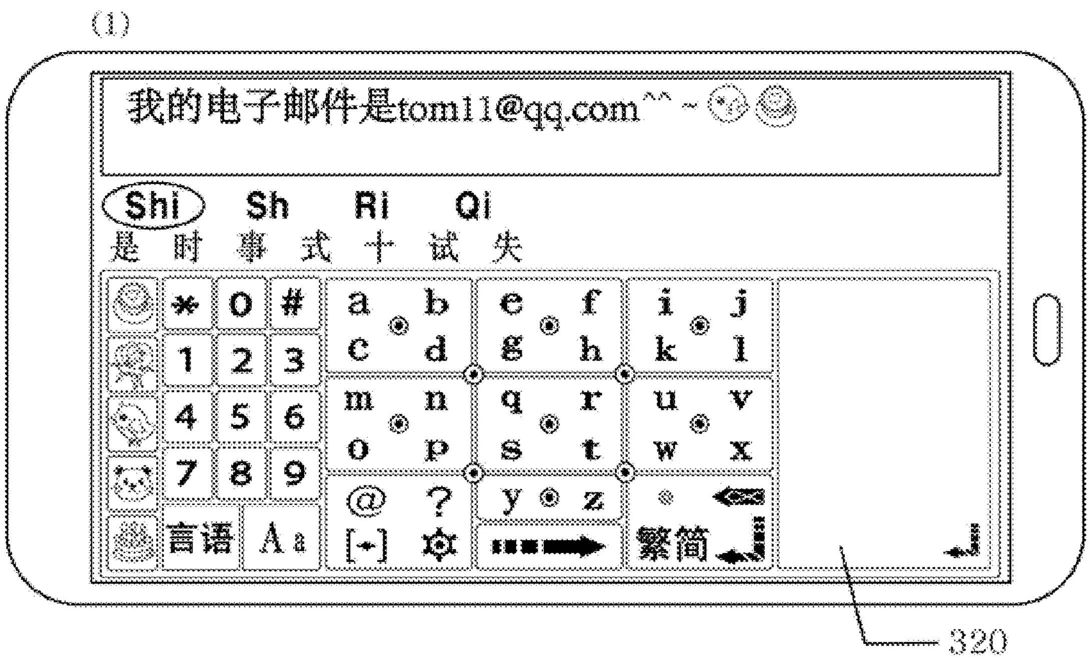

【FIG. 25B(2)】

【FIG. 25C(1)】
(1)
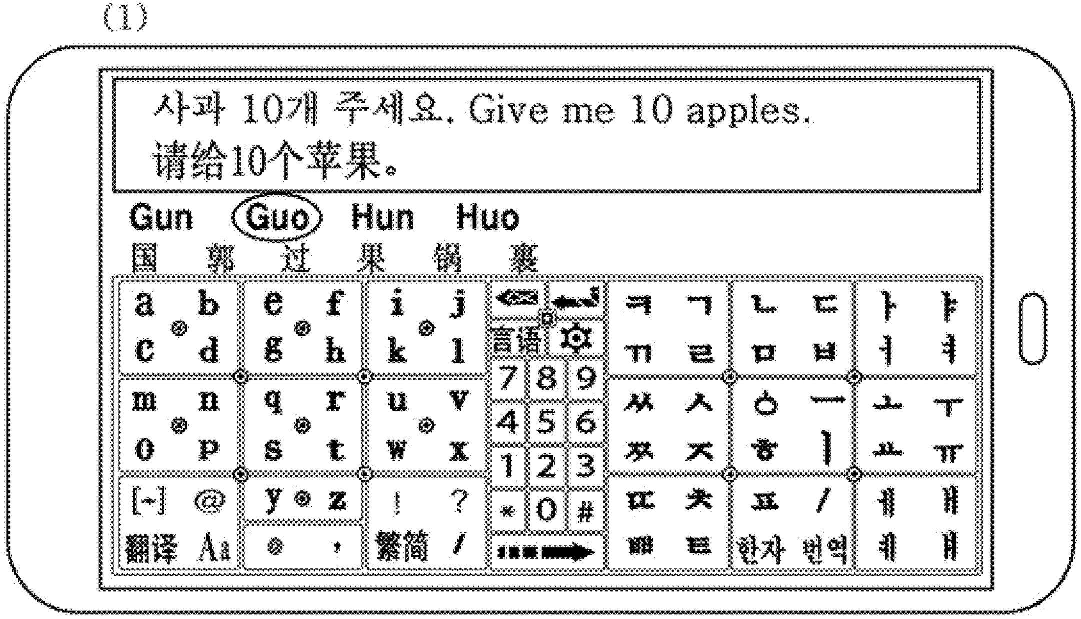
【FIG. 25C(2)】
(2)
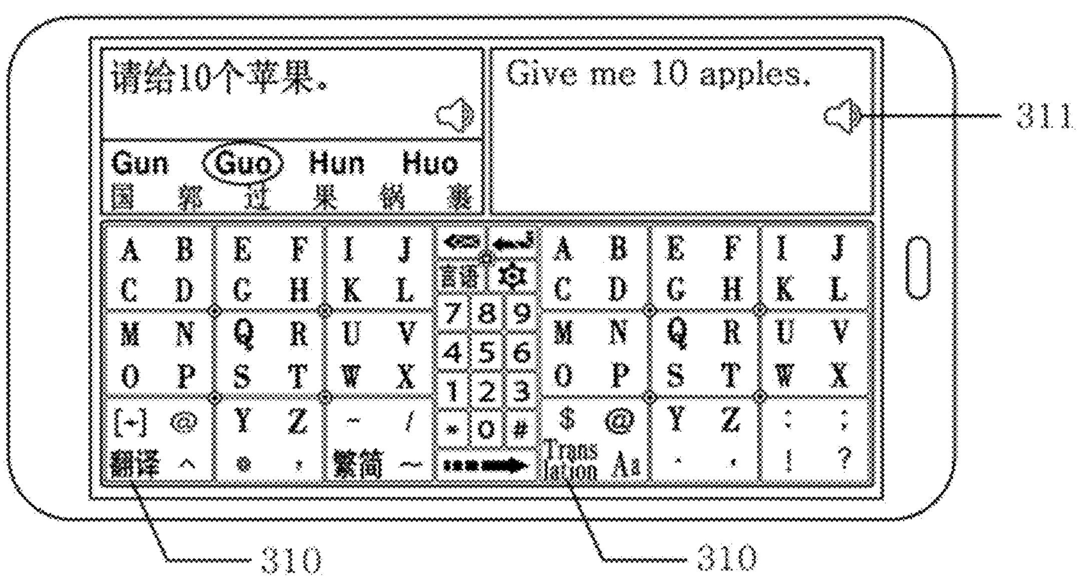
5

【FIG. 25C(3)】
(3)
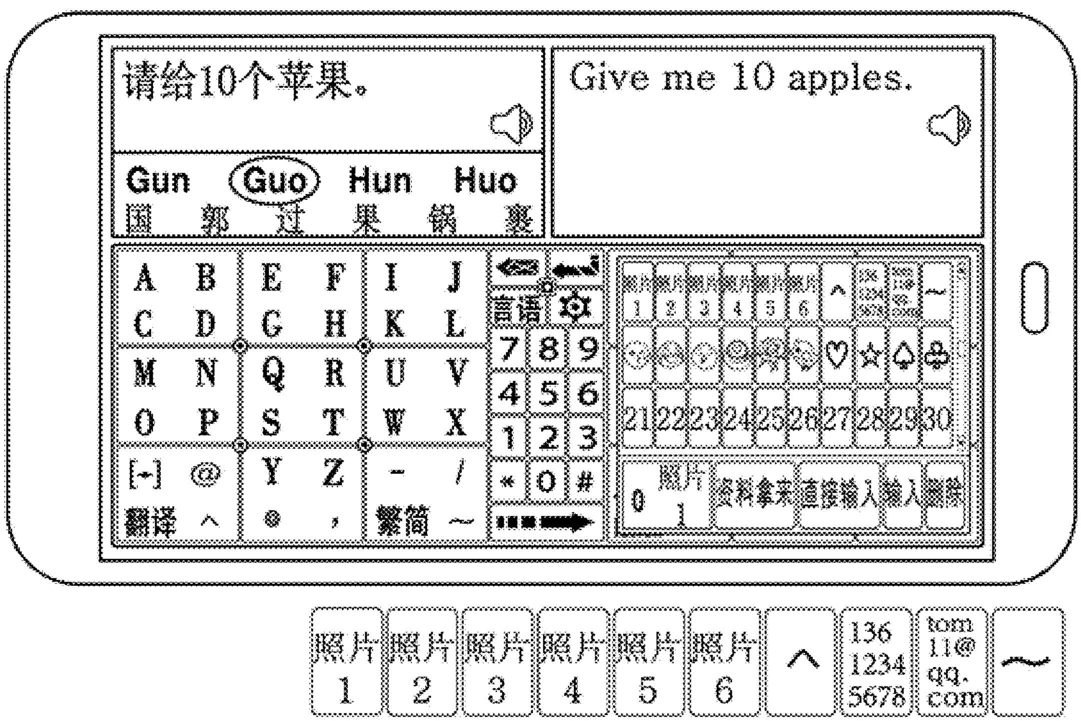

【FIG. 25D】
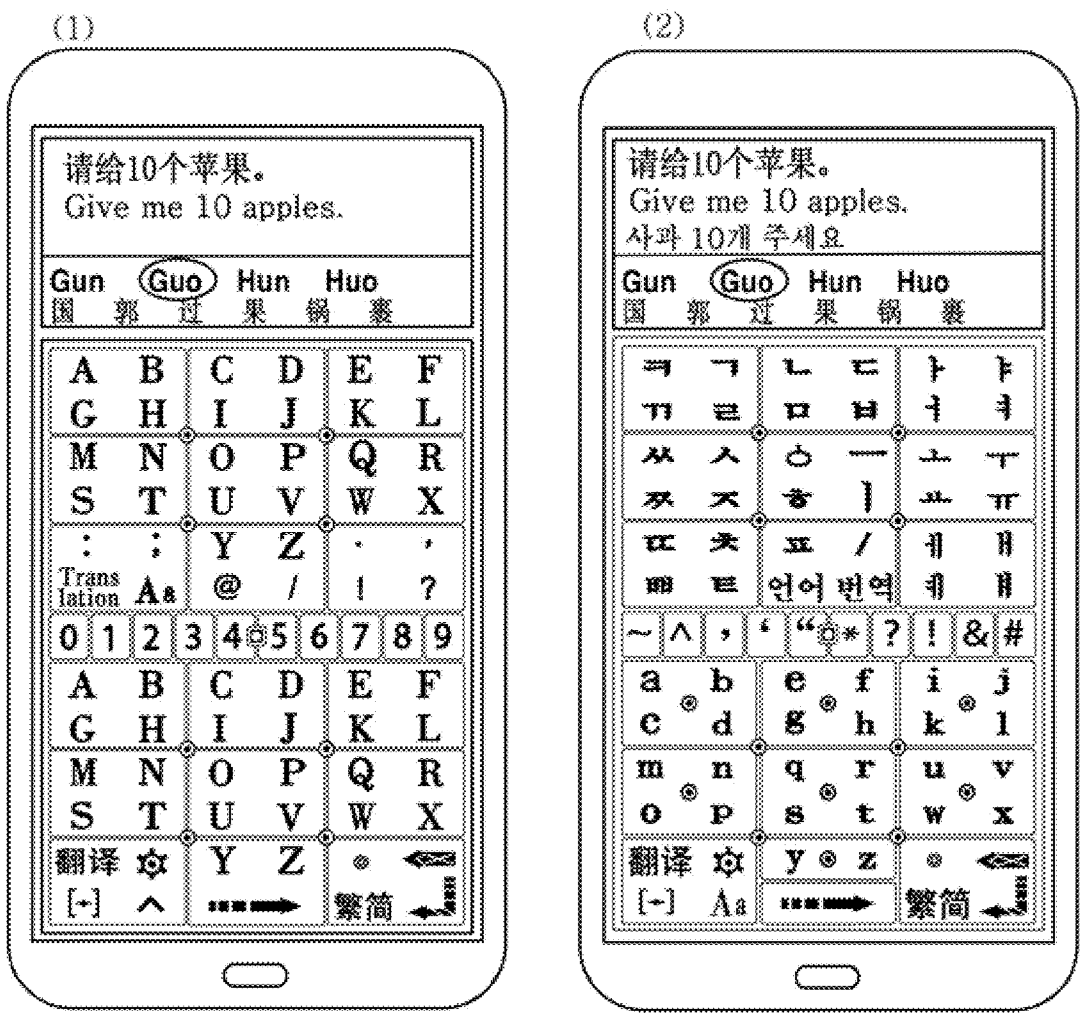

【FIG. 25E】

【FIG. 25F】
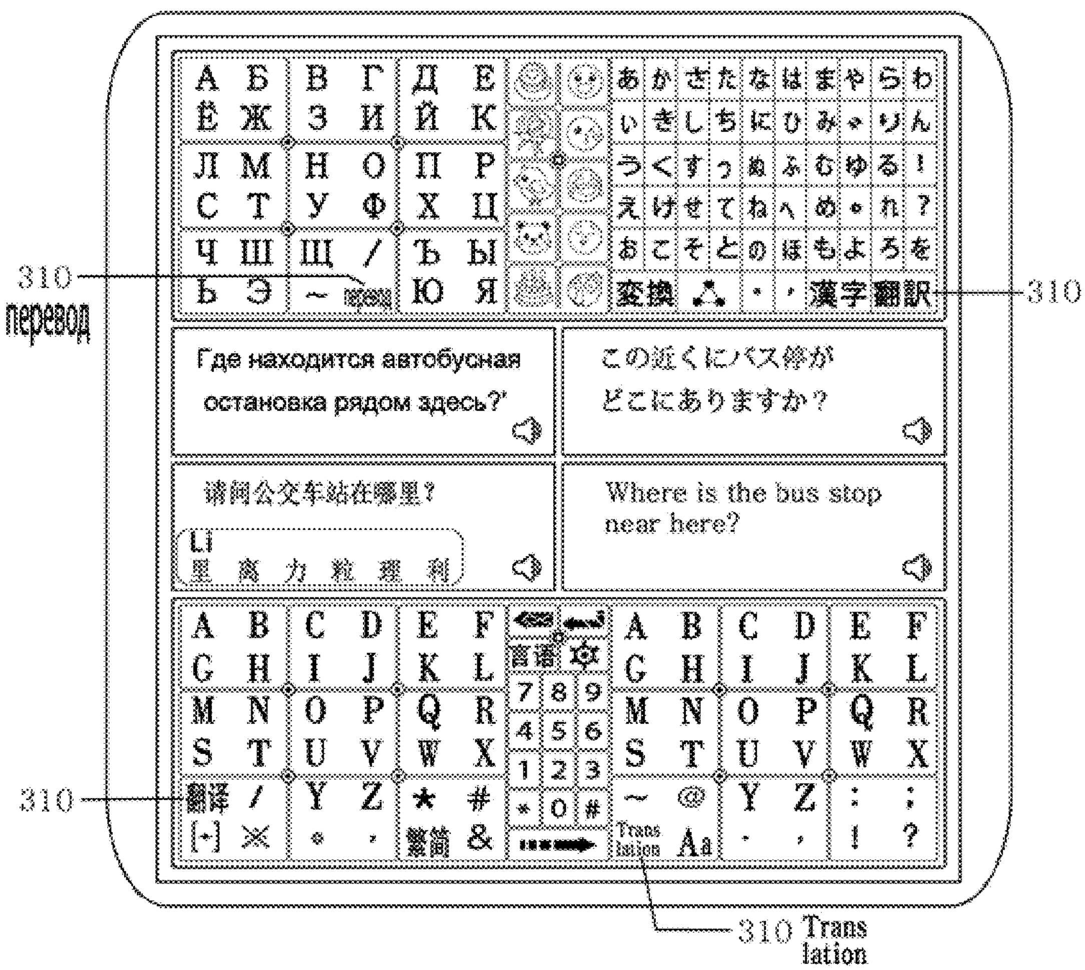

【FIG. 25G】
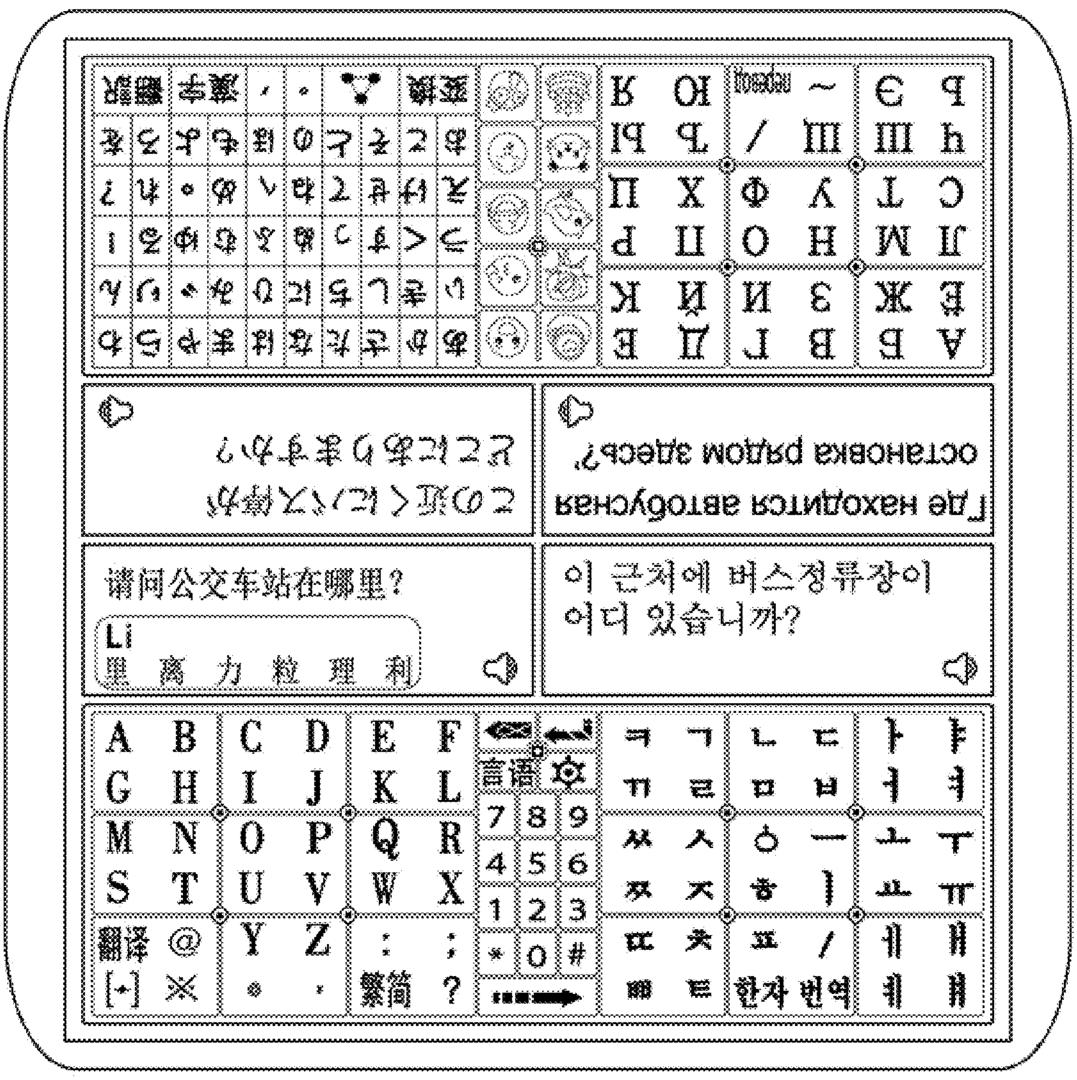

【FIG. 26A】

【FIG. 26B】
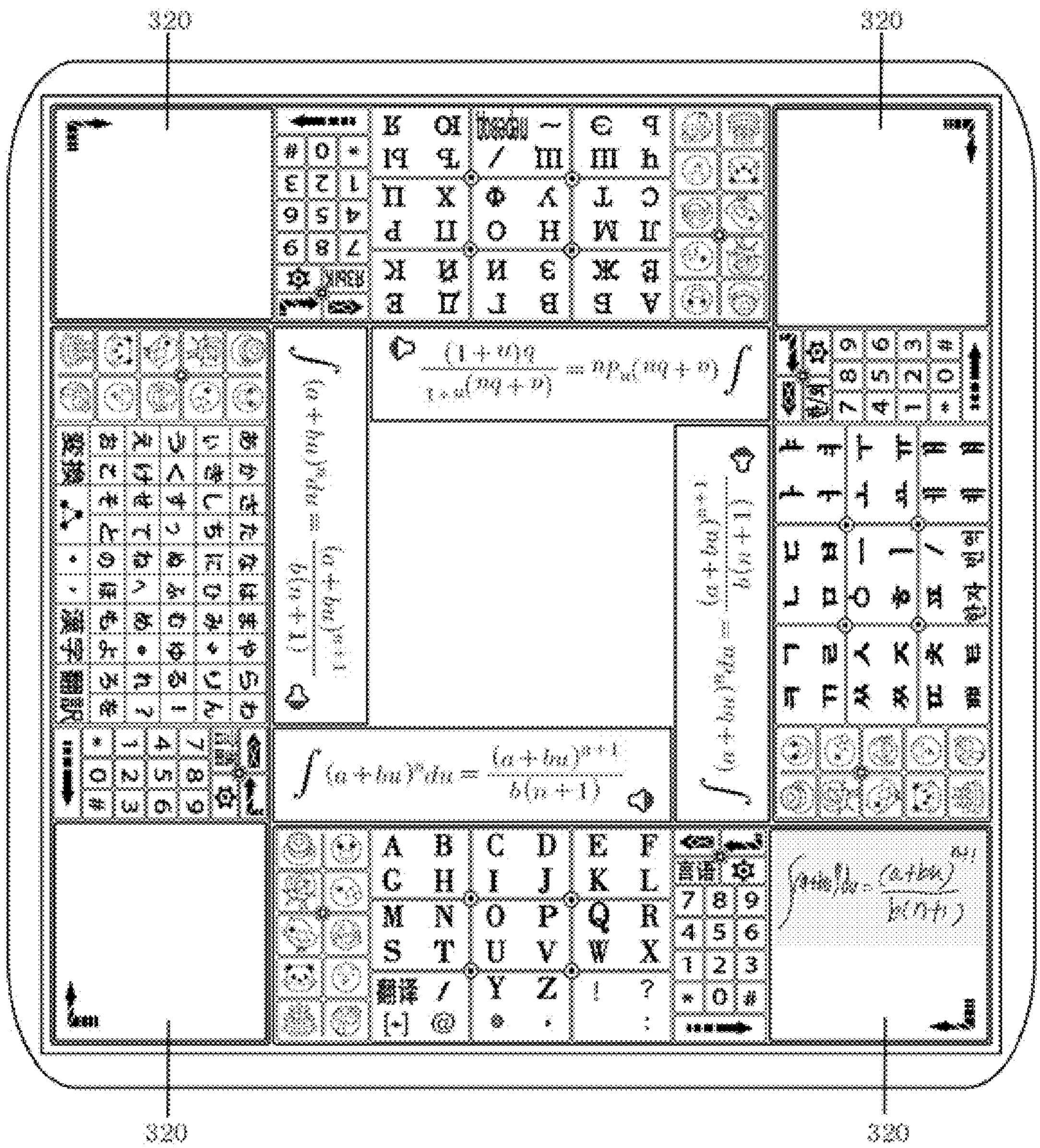

【FIG. 26C(1)】
(1)
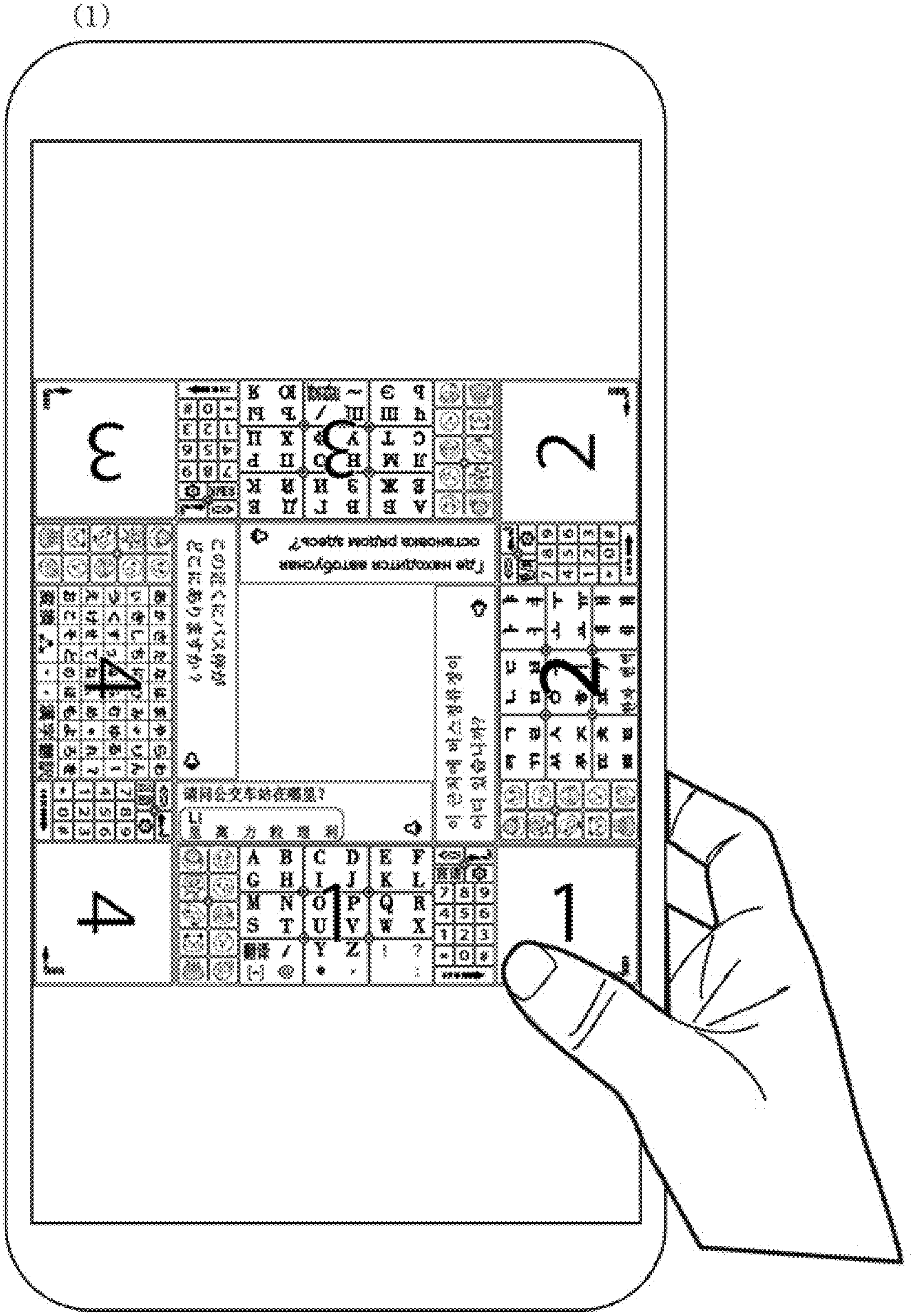

【FIG. 26C(2)】
(2)
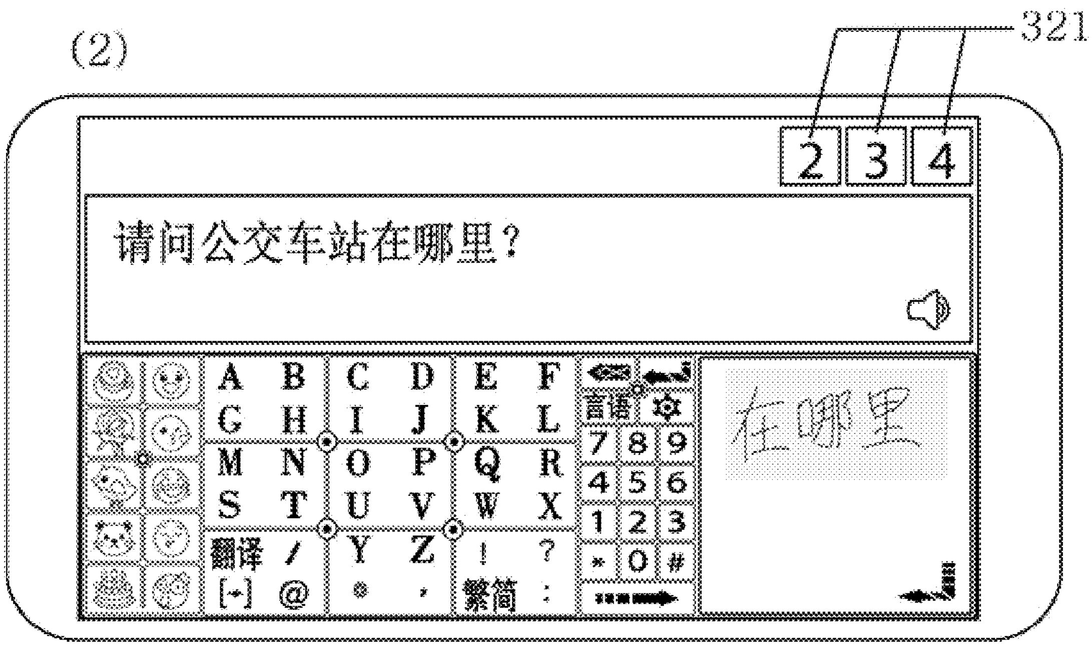
【FIG. 26C(3)】
(3)
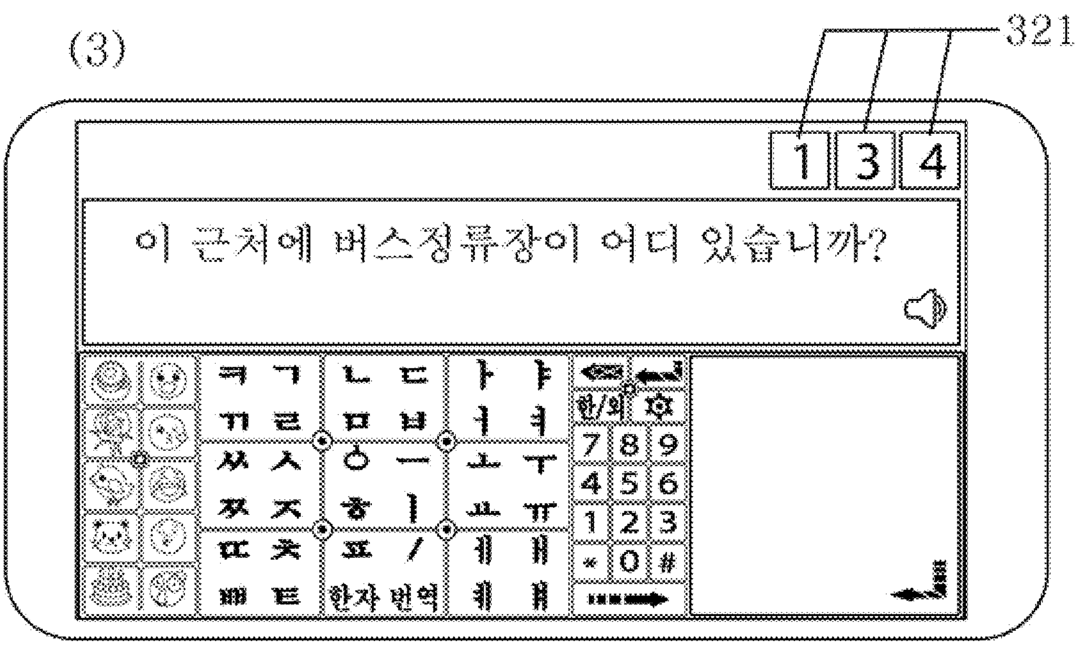
5

CHARACTER INPUT DEVICE

TECHNICAL FIELD

The present invention relates to a character input device, and more particularly, to a character input device for dividing a character input unit into one or more character group regions and individual character regions and sequentially arranging characters of each language to input characters in an intuitive and efficient manner.

BACKGROUND ART

Currently, a QWERTY keyboard is used as a character input device all over the world. Since a character input method using the QWERTY keyboard has no regularity in character arrangement, it is difficult to find a position of characters intuitively, and it takes a long time to learn the arrangement of the characters. In addition, in many cases, due to the characteristics of a method of arranging characters in a limited space, characters adjacent to the upper, lower, left, and right sides are pressed and thus typing errors frequently occur, which reduces speed of inputting characters.

In other character input methods, a plurality of characters are arranged in one character button in order to widen an area occupied by one character. In this case, it is inconvenient to repeatedly hit, press and hold down, push, and press and push the character button, or press a shift key or a function key to input one character. The input efficiency is low because the number of input times is increased, the movement of the finger is increased, and the input time is increased as compared to a method in which all the characters constituting the corresponding language are arranged on the character input unit and the characters are directly pressed.

Therefore, a user interface in a new input method is required to reduce the typing errors and increase the speed of inputting characters.

DETAILED DESCRIPTION OF THE DISCLOSURE

Technical Object

In order to solve the problem, a device for inputting characters rapidly and accurately with a small number of input times without typing errors for each language is provided.

Technical Solution

In order to solve the technical problem, a character input device according to the present invention includes a character input unit 10 for inputting a character or a symbol, a display unit 20 for displaying on a display the character or symbol input via the character input unit, a storage unit 40 for storing data input via the character input unit and information or data related to character input, and a control unit 30 controlling the character input unit, the display unit, and the storage unit, and the character input unit is divided into a character group region 200 in a matrix of m×n (m and n are natural numbers) to form a language input unit 11, a miscellaneous input unit 12, and an auxiliary input unit 13, the character group region is divided into one or more individual character regions 210 in which the character or the symbol is arranged to input characters for each language displayed in the language input unit by a pressing a key once as it is without performing repeatedly pressing, pressing and holding down, pushing, and pressing and pushing.

Advantageous Effects

According to the present invention, it is possible to minimize interference with adjacent characters through efficient spatial arrangement and operation by dividing and arranging the character input device into a character group region and an individual character region.

By arranging the characters for each language in the character input device sequentially, it is possible for a user to intuitively and easily recognize the positions of the characters and rapidly and accurately input the characters with a small number of input times without typing errors.

BRIEF DESCRIPTION OF DRAWINGS

The above and other aspects, and advantages of certain embodiments of the disclosure will be more apparent from the following description taken in conjunction with the accompanying drawings, in which:

FIG. 1 is a configuration diagram of a character input device according to an embodiment of the present invention.

FIG. 2A is a diagram illustrating a character input unit and a display unit according to an embodiment of the present invention.

FIG. 2B is a diagram illustrating a character group region, an individual character region, and a character input center according to an embodiment of the present invention.

FIGS. 2C and 2D are diagrams illustrating an example in which characters are arranged in an individual character region of a character group region according to an embodiment of the present invention.

FIGS. 3A and 3B are diagrams illustrating an individual character region and a character input center according to an embodiment of the present invention.

FIG. 4 is a flowchart illustrating a process of inputting characters according to an embodiment of the present invention.

FIG. 5 is a diagram illustrating an example in which a period and a comma are modified and arranged according to an embodiment of the present invention.

FIG. 6 is a diagram illustrating an example in which a character group region is converted according to an embodiment of the present invention.

FIG. 7 is a flowchart illustrating a process of changing characters in the character input unit according to an embodiment of the present invention.

FIGS. 8A to 8E are diagrams illustrating an example in which a miscellaneous input unit is arranged according to the embodiment of the present invention.

FIG. 9 is a diagram illustrating an example in which a language input unit and a miscellaneous input unit are arranged according to the embodiment of the present invention.

FIG. 10 is a diagram illustrating an example in which a miscellaneous input unit is converted into another miscellaneous input unit according to the embodiment of the present invention.

FIG. 11 is a diagram comparing an area occupied by one character in an English character input unit according to an embodiment of the present invention and an existing English QWERTY character input unit which are arranged in the same area.

FIGS. 12A to 12E are diagrams illustrating character input units of respective countries according to a specific embodiment of the present invention.

FIG. 13 is a diagram illustrating an integrated function key according to an embodiment of the present invention.

FIG. 14 is a flowchart illustrating a process of registering new data using the integrated function key according to an embodiment of the present invention.

FIG. 15 is a diagram illustrating an upper/lower case shift key according to an embodiment of the present invention.

FIGS. 16A to 16E are diagrams illustrating an example in which a digit data display is displayed by pressing each digit for 0.2 seconds or more according to an embodiment of the present invention.

FIG. 17A is a diagram illustrating an example in which a parenthesis symbol display is displayed by pressing an integrated parenthesis key according to an embodiment of the present invention.

FIG. 17B is a diagram illustrating an example of shifting a parenthesis symbol display into another symbol display according to an embodiment of the present invention.

FIG. 17C is a diagram illustrating a method of inputting a parenthesis symbol by pressing an integrated parenthesis key according to an embodiment of the present invention.

FIG. 17D is a diagram illustrating a method of inputting a parenthesis symbol on the parenthesis symbol display according to an embodiment of the present invention.

FIG. 18 is a diagram illustrating a method of inputting various parenthesis symbols by the integrated parenthesis key according to an embodiment of the present invention.

FIG. 19 is a diagram illustrating a method of consecutively inputting various parenthesis symbols by the integrated parenthesis key according to an embodiment of the present invention.

FIG. 20 is a diagram illustrating an example in which data are displayed in an auxiliary input unit according to the embodiment of the present invention.

FIG. 21 is a diagram illustrating an example in which an operation symbol is displayed on the auxiliary input unit according to an embodiment of the present invention FIG. 22 is a diagram illustrating an example of a Chinese-version character input unit according to an embodiment of the present invention.

FIGS. 23A and 23B are diagrams illustrating examples in which languages using Chinese and Roman are simultaneously input by a Chinese-version 1 character input unit according to an embodiment of the present invention.

FIG. 24 is a diagram illustrating an example of arranging a traditional-simplified Chinese shift key in a Chinese-version character input unit according to an embodiment of the present invention.

FIGS. 25A to 25G are diagrams illustrating examples in which language input units of various countries are arranged and utilized in various ways according to an embodiment of the present invention.

FIGS. 26A to 26C are diagrams illustrating examples in which four languages are simultaneously input according to an embodiment of the present invention.

MODES FOR EMBODYING THE INVENTION

The above and other features and advantages of the disclosure will become more apparent by describing in detail exemplary embodiments thereof with reference to the attached drawings. In addition, the same reference numerals are assigned to the same or corresponding parts in each drawing, and redundant explanations are omitted.

Hereinafter, embodiments of the present invention will be described in detail with reference to the accompanying drawings and the contents disclosed in the accompanying drawings.

In the present invention, the term "characters" collectively refers to everything required for inputting characters such as consonants and vowels constituting each language, numbers, symbols, special characters, emoticons, function keys, setting keys, and editing keys that may be displayed on a display by pressing a keyboard, user-created data, or the like. The present invention is implemented in software in a terminal such as a smart phone, a pad type terminal or a tablet PC, and the meaning of "in software" refers to a preset function in which characters are programmed to be displayed corresponding to individual keys of a keyboard to be displayed on a corresponding key by an instruction of a controller according to the operation of shift key, or a list or function may be edited by registering, deleting, and the like. The key of the present invention may be a button for displaying characters with a partitioned area on touch display or individual liquid crystal display (LCD), light emitting diode (LED), organic LED (OLED), or optical fiber.

FIG. 1 is a configuration diagram of a character input device according to an embodiment of the present invention. The present invention is configured to input a character displayed on the character input device by pressing a key once as it is, and the present invention is advantageous in that it is unnecessary to perform additional input operations such as pressing and holding down, repeatedly pressing, pushing, and pressing and pushing as disclosed in the related art.

A character input device 1 for inputting characters according to the present invention includes a character input unit 10 including a language input unit 11, a miscellaneous input unit 12 or an auxiliary input unit 13 for inputting characters; a display unit 20 for displaying characters, symbols, and the like which are input via the character input unit 10 on a display; a storage unit 40 for storing information or data, programs, and the like related to character input, and a controller 30 for controlling the character input unit, the display unit, and the storage unit.

The character input unit 10 is configured by one or more character group regions 200, and the character group region 200 is composed of one or more individual character regions 210, and a character input center 220 is disposed at the center of the individual character regions.

According to arranged positions in the character group region, the individual character regions may be divided into a left upper individual character region 211, a right upper individual character region 212, a left lower individual character region 213, and a right lower individual character region 214, or divided into a left upper individual character region, a right upper individual character region, a left lower individual character region, a right lower individual character region, and a central individual character region 215, or divided into a left upper individual character region, a right upper individual character region, a left lower individual character region, a right lower individual character region, an upper central individual character region 216, and a lower central individual character region 217. Further, the individual character regions may be divided into an upper individual character region 221, a lower individual character region 222, a left individual character region 223, and a right individual character region 224, or divided into an upper individual character region, a lower individual character region, a left individual character region, a right individual character region, and a central individual character region.

FIG. 2 shows the character input unit 10 and the display unit 20 as an embodiment in which the present invention is applied to a smart phone. Referring to FIG. 2A, the character input unit 10 includes the language input unit 11, the miscellaneous input unit 12, or the auxiliary input unit 13, and characters input via the character input unit are displayed on the display unit 20. The language input unit may be referred to as an English input unit, a Korean input unit, a Chinese input unit, a Russian input unit, a Japanese input unit, a German input unit, a French input unit, a Spanish input unit, an Arabic input unit, an Iranian input unit, and a Hindi input unit according to languages.

Referring to FIG. 2B, the character input unit 10 may include one or more character group regions 200, and the character group region may include one or more individual character regions 210, and each character input center 220 is located at the center of the individual character regions. Characters correspond to the individual character regions, and the character corresponding to the individual character region is input when the pressing of the individual character region is sensed. In FIG. 2B, a language shift key 230, a setting key 240, an upper/lower case shift key 270, and an integrated parenthesis key 290 are also illustrated.

When the character input unit is composed of one or more character group regions 200, the number thereof and the arrangement method are most effectively and variously modified for receiving characters from a user depending on a type of the character input device and a size of the display.

The character group region may divide one or more individual character regions into various combinations of rectangles, triangles, polygons, circles, and the like. FIG. 2C shows an example in which individual character regions are divided into rectangles, and FIG. 2D shows an example in which individual character regions are divided into triangles. In this case, the character group regions and the individual character regions are visually divided by boundary lines, separation regions, or the like to facilitate input of characters.

FIGS. 3A and 3B show the individual character region 210 and the character input center 220 of the character group region 200 according to an embodiment of the present invention.

The individual character regions of the character group region may be divided into a left upper individual character region 211, a right upper individual character region 212, a left lower individual character region 213, and a right lower individual character region 214 as shown in FIG. 3A(1), or divided into a left upper individual character region, a right upper individual character region, a left lower individual character region, a right lower individual character region, and a central individual character region 215 as shown in FIG. 3A(2). As shown in FIG. 3A(4), the individual character regions may be divided into a left upper individual character region, a right upper individual character region, a left lower individual character region, a right lower individual character region, an upper central individual character region 216, and lower central individual character region 217. The individual character regions may be divided into an upper individual character region 221, a lower individual character region 224, a left individual character region 222, and a right individual character region 223 as shown in FIG. 3B(1), or divided into an upper individual character region, a lower individual character region, a left individual character region, a right individual character region, and a central individual character region as shown in FIG. 3B(2).

One character may correspond to one individual character region, two or more characters may correspond to one individual character region, and one character may correspond to two or more individual character regions.

According to an embodiment of the present invention, the character group regions 200 may be arranged in a matrix of m×n (m and n are natural numbers). Referring to FIG. 3A(1), a left upper individual character region in an (3, 2) character group region is an example in which one character "Y" corresponds to one individual character region, and a left lower individual character region and a right lower individual character region in the (3, 2) character group region are integrated to one to correspond to one space bar. At this time, the character input center is not changed, and two character input centers 220 are arranged in the space bar.

When six characters correspond to one character group region, as shown in FIG. 3A(3), two characters correspond to the left upper individual character region and the left lower individual character region, respectively, and one character corresponds to the right upper individual character region and the right lower individual character region, respectively. As such, when two or more characters correspond to one individual character region, respective characters corresponding to the individual character region may be all input by using any one of one-time pressing, repeatedly pressing, pressing and holding down, pushing, and pressing and pushing. As shown in FIG. 3A(4), the character group region may be divided and disposed into six individual character regions, respectively, and in this case, each character may be inputted by one-time pressing.

FIG. 4 is a flowchart illustrating a process of inputting characters by a user according to an embodiment of the present invention. When a user presses or touches the individual character region to input a character, if the touched portion overlaps with an adjacent character, in the character recognition in the present invention, a closer character may be recognized by calculating a distance from the character input center, or a character in an individual character region having a larger area may be recognized by calculating an area of the pressed point.

The character input unit divides the character group region into the individual character regions and a corresponding character is displayed in each individual character region in operation S301. An individual character region in the character group region is pressed in operation S303. At this time, when any one of a plurality of individual character regions is pressed in operation S305, the character corresponding to the individual character region is input in operation S307. When the user simultaneously presses the plurality of individual character regions in the character group region, it is determined where an individual character region closest to the character input center is located, among the two or more pressed individual character regions in operation S309, and a character corresponding to an individual character region having the closest distance between the pressed point and the character input center in each individual character region is input in operation S311. Alternatively, when the user simultaneously presses the plurality of individual character regions in the character group region, a character corresponding to an individual character region having a larger pressed area among the pressed individual character regions is input in operation S315.

Languages of the world may be roughly divided into characters using "Alphabet" and non-alphabet characters. The alphabet is collectively called a "letter" character as a character system divided into consonants and vowels. For example, there are Roman alphabet or Latin alphabet, Korean alphabet, Cyrillic alphabet, Greek alphabet, Georgian alphabet, Armenian alphabet, and the like.

Languages written in the Roman alphabet or Latin alphabet include Latin, Spanish, Portuguese, German, Indonesian, Vietnamese, French, Italian, Turkish, Polish, Malaysian, Dutch, and the like, in addition to English.

Countries using the Roman alphabet use 26 alphabet letters as base characters, and may use additional variant characters for each country. The "variant characters" referred to in the present invention means all characters in which phonetic symbols or intonation marks are added to the alphabet letters or the alphabet letters are modified, in addition to the 26 alphabet letters. For example, in addition to 26 alphabet letters, German uses "Ä, Ö, Ü, ß", Italian additionally uses "À, É, È, Ì, Ò, Ó, Ù", and French uses "Â, À, É, È, Ê, Ë, Ï, Î, Ô, Ù, Ü, Û, Ç, ÿ" and Spanish uses "Ñ, Á, É, Í, Ó, Ú, Ü, Ç". Table 1 is a table of the languages using Roman characters using variant characters as well as the 26 alphabet letters.

TABLE 1

| Language name | Composition of Characters | Total number of characters | Additional variant characters or specific characters other than 26 alphabet letters |
|---|---|---|---|
| Dutch | 26 alphabet letters + 1 character | 27 | IJ |
| Albanian | 26 alphabet letters + 2 characters | 28 | Ç, Ë |
| Norwegian | 26 alphabet letters + 3 characters | 29 | Æ, Ø, Å |
| Danish | 26 alphabet letters + 3 characters | 29 | Æ, Ø, Å |
| Swedish | 26 alphabet letters + 3 characters | 29 | Å, Ä, Ö |
| Finnish | 26 alphabet letters + 3 characters | 29 | Å, Ä, Ö |
| Vietnamese | 22 alphabet letters + 7 characters | 29 | Ă, Â, Đ, Ê, Ô, Ơ, Ư |
| Slovenian | 26 alphabet letters + 3 characters | 29 | Č, Š, Ž |
| German | 26 alphabet letters + 4 characters | 30 | Ä, Ö, Ü, ß |
| Romanian | 26 alphabet letters + 5 characters | 31 | Ă, Ă, Î, Ş, Ţ |
| Serbian | 26 alphabet letters + 5 characters | 31 | Č, Ć, Đ, Š, Ž |
| Estonian | 26 alphabet letters + 6 characters | 32 | Š, Ž, Õ, Ä, Ö, Ü |
| Catalan | 26 alphabet letters + 6 characters | 32 | Ç, É, È, Ò, Ó, Ü |
| Italian | 26 alphabet letters + 7 characters | 33 | À, É, È, Ì, Ó, Ò, Ù |
| Azerbaijani | 26 alphabet letters + 7 characters | 33 | Ç,Ə, Ğ, İ, Ö, Ş, Ü |
| Latvian | 22 alphabet letters + 11 characters | 33 | Ā, Č, Ē, Ģ, Ī, Ķ, Ļ, Ņ, Š, Ū, Ž |
| Turkish | 26 alphabet letters + 8 characters | 34 | Â,Ç, Ğ, İ, Ö, Ş, Ü, Û |
| Polish | 26 alphabet letters + 9 characters | 35 | Ą, Ć, Ę, Ł, Ń, Ó, Ś, Ź, Ż |
| Hungarian | 26 alphabet letters + 9 characters | 35 | Á, É, Í, Ó, Ö, Ő, Ú, Ü, Ű |
| Lithuanian | 26 alphabet letters + 9 characters | 35 | Ą, Č, Ę, Ė, Į, Š, Ų, Ū, Ž |
| Icelandic | 26 alphabet letters + 10 characters | 36 | Á, Đ, É, Í, Ó, Ú, Ý, Þ, Æ, Ö |
| Spanish | 26 alphabet letters + 11 characters | 37 | Ñ, Á, É, Í, Ó, Ú, Ü, ch, ll, rrÇ |
| Portuguese | 26 alphabet letters + 13 characters | 39 | Á, À, Â, Ã, É, Ê, Í, Ó, Ô, Õ, Ú, Ü, Ç |
| Brazilian | 26 alphabet letters + 13 characters | 39 | Á, À, Â, Ã, É, Ê, Í, Ó, Ô, Õ, Ú, Ü, Ç |
| Czech | 26 alphabet letters + 15 characters | 41 | Á, Č, Ď, É, Ě, Í, Ň, Ó, Ř, Š, Ť, Ú, Ů, Ý, Ž |
| French | 26 alphabet letters + 15 characters | 41 | Â, À, É, È, Ê, Ë, Ï, Î, Ô, Ù, Ü, Û, Ÿ,Ç, œ |
| Slovak | 26 alphabet letters + 20 characters | 46 | Á, Ä, Č, Ď, Dz, Dž, É, Í, Ĺ, Ľ, Ň, Ó, ch, Ô, Ŕ, Š, Ť, Ú, Ý, Ž |

The present invention provides a method of inputting characters by one-time pressing and a method of easily inputting characters using an integrated functional key as it is without performing repeatedly pressing, pressing and holding down, pushing, and pressing and pushing by disposing variant characters required for inputting the language of each country in the character input unit.

The present invention may be efficiently applied even when inputting non-romanized language characters such as Cyrillic letters such as Russian, Ukrainian, Uzbek, Kazakh, Bulgarian, and Kyrgyz, or Greek letters when inputting characters of languages not using alphabet letter such as Japanese, Arabic, Iranian, and Hindi, and when inputting Hanyu Pinyin of Chinese or Hangul. The present invention may be applied to efficiently input characters of all languages of the world.

FIG. 2A illustrates an embodiment in which nine character group regions are arranged in the form of a 3×3 matrix to constitute an English input unit. The present invention may be sequentially arranged in alphabetical order of English. More specifically, in a (character group region at a position of (1, 1), "A" in a left upper individual character region, "B" in a right upper individual character region, "G" in a left lower individual character region, and "H" in a right lower individual character region are disposed.

In a character group region at a position of (1, 2), "C" in a left upper individual character region, "D" in a right upper individual character region, "I" in a left lower individual character region, and "J" in a right lower individual character region are disposed.

In a character group region at a position of (1, 3), "E" in a left upper individual character region, "F" in a right upper individual character region, "K" in a left lower individual character region, and "L" in a right lower individual character region are disposed.

In a character group region at a position of (2, 1), "M" in a left upper individual character region, "N" in a right upper individual character region, "S" in a left lower individual character region, and "T" in a right lower individual character region are disposed.

In a character group region at a position of (2, 2), "O" in a left upper individual character region, "P" in a right upper individual character region, "U" in a left lower individual character region, and "V" in a right lower individual character region are disposed.

In a character group region at a position of (2, 3), "Q" in a left upper individual character region, "R" in a right upper individual character region, "W" in a left lower individual character region, and "X" in a right lower individual character region are disposed.

In a character group region at a position of (3, 1), a "language shift key" in a left upper individual character region, a "setting key" in a right upper individual character region, an "integrated parenthesis key" in a left lower individual character region, and an "upper/lower case shift key" in a right lower individual character region are disposed.

In a character group region at a position of (3, 2), "Y" in a left upper individual character region, "Z" in a right upper individual character region, a symbol corresponding to a left lower individual character region and a right lower individual character region is arranged with "spacing (space bar)".

In a character group region at a position of (3, 3), "period (.)" in a left upper individual character region, "correct (back space key)" in a right upper individual character region, "comma (,)" in a left lower individual character region, and "input (enter key)" in a right lower individual character region are disposed.

For example, when the user presses the left upper individual character region 211 of the character group region at a position of (1, 1), "a" corresponding to the left upper individual character region is input to the display unit 20. when the user desires to input "apple", the user inputs "a" by pressing the left upper individual character region at a position of (1, 1), inputs "p" two times by pressing the right upper individual character region at a position of (2, 2) twice, inputs "1" by pressing the right lower individual character region at a position of (1, 3), and inputs "e" by pressing the left upper individual character region at a position of (1, 3).

In addition, as illustrated in FIG. 2C(1), a number, a character, or a symbol may be further arranged in the central individual character region 215, or a new function may be performed by pressing the central individual character region. For example, the present invention may include a recommendation word function, and one or more words are listed on the display unit or the auxiliary input unit by sequentially pressing the central individual character regions of one or more character group regions to sequentially combine characters belonging to the character group region, and the user may select and input a desired word among the words. Alternatively, when a character in each individual character region is pressed, one or more words that may be combined with the characters are listed on the display unit or the auxiliary input unit, and the user may select and input a desired word among the words. Alternatively, the user may input the characters quickly by simultaneously using the above two methods.

For example, when the user inputs "apple", the user presses the central individual character region 215 of the (1, 1) character group region in which "a" is located, presses twice the central individual character region of the (2, 2) character group region in which "p" is located, presses twice the central individual character region of the (1, 3) character group region in which "1" and "e" are located, to sequentially press the central individual character regions of the character group regions to which respective alphabet letters constituting a word which are to be input belong. A database of words that may be combined with respective alphabet letters is stored in the storage unit, and words combined with alphabet letters belonging to the character group regions are displayed on the display unit or the auxiliary input unit and the user selects and inputs a word of "apple" among the alphabet letters. At this time, if there is a word "apple" among the recommended words displayed on the display unit or the auxiliary input unit even if the central individual character regions are not all pressed by the number of alphabet letters constituting "apple", the user may select the word and quickly input the word. This method may be applied to other languages as well.

As another input method, a method of directly pressing each alphabet letter and a method of pressing the central individual character region may be integrally used. When the user first presses the alphabet letters that constitute a word directly in each individual character region and later presses the central individual character region, the user may first correctly specify the word to be input, so that the word may be quickly combined and displayed, even if the user presses only the central individual character region later.

FIG. 2C(2) illustrates an example in which each individual character region is visually divided.

FIG. 2C(3) is another example in which nine character group regions are arranged in the form of a 3×3 matrix to constitute an English input unit. The characters are sequentially arranged in alphabetical order in English in character group regions. More specifically, in a character group region at a position of (1, 1), "A" in a left upper individual character region, "B" in a right upper individual character region, "C" in a left lower individual character region, and "D" in a right lower individual character region are disposed.

In a character group region at a position of (1, 2), "E" in a left upper individual character region, "F" in a right upper individual character region, "G" in a left lower individual character region, and "H" in a right lower individual character region are disposed.

In a character group region at a position of (1, 3), "I" in a left upper individual character region, "J" in a right upper individual character region, "K" in a left lower individual character region, and "L" in a right lower individual character region are disposed.

In a character group region at a position of (2, 1), "M" in a left upper individual character region, "N" in a right upper individual character region, "O" in a left lower individual character region, and "P" in a right lower individual character region are disposed.

In a character group region at a position of (2, 2), "Q" in a left upper individual character region, "R" in a right upper individual character region, "S" in a left lower individual character region, and "T" in a right lower individual character region are disposed.

In a character group region at a position of (2, 3), "U" in a left upper individual character region, "V" in a right upper individual character region, "W" in a left lower individual character region, and "X" in a right lower individual character region are disposed.

In a character group region at a position of (3, 1), a "language shift key" in a left upper individual character region, a "setting key" in a right upper individual character region, an "integrated parenthesis key" in a left lower individual character region, and an "upper/lower case shift key" in a right lower individual character region are disposed.

In a character group region at a position of (3, 2), "Y" in a left upper individual character region, "Z" in a right upper individual character region, a symbol corresponding to a left lower individual character region and a right lower individual character region is arranged with "spacing (space bar)".

In a character group region at a position of (3, 3), "period (.)" in a left upper individual character region, "correct (back space key)" in a right upper individual character region, "comma (,)" in a left lower individual character region, and "input (enter key)" in a right lower individual character region are disposed.

FIG. 2C(4) illustrates an example in which central individual character regions are added to the example of FIG. 2C(3) to arrange characters, numbers or symbols or perform separate functions.

FIG. 2D(1) is an example in which nine character group regions are arranged in the form of a 3×3 matrix to constitute an English input unit. More specifically, in a character group region at a position of (1, 1), "A" in an upper individual character region, "B" in left individual character region, "C" in a right individual character region, and "D" in a lower individual character region are disposed. In a character group region at a position of (1, 2), "E" in an upper individual character region, "F" in left individual character region, "G" in a right individual character region, and "H" in a lower individual character region are disposed.

In a character group region at a position of (1, 3), "I" in an upper individual character region, "J" in left individual character region, "K" in a right individual character region, and "L" in a lower individual character region are disposed.

In a character group region at a position of (2, 1), "M" in an upper individual character region, "N" in left individual character region, "O" in a right individual character region, and "P" in a lower individual character region are disposed.

In a character group region at a position of (2, 2), "Q" in an upper individual character region, "R" in left individual character region, "S" in a right individual character region, and "T" in a lower individual character region are disposed.

In a character group region at a position of (2, 3), "U" in an upper individual character region, "V" in left individual character region, "W" in a right individual character region, and "X" in a lower individual character region are disposed.

In a character group region at a position of (3, 1), a "setting key" in an upper individual character region, an "integrated parenthesis key" in left individual character region, a "language shift key" in a right individual character region, and an "upper/lower case shift key" in a lower individual character region are disposed.

In a character group region at a position of (3, 2), "Y" in a left individual character region, "Z" in a right individual character region, "spacing (space bar)" in a lower individual character region are disposed.

In a character group region at a position of (3, 3), "correct (back space key)" in an upper individual character region, "period (.)" in left individual character region, "comma (,)" in a right individual character region, and "input (enter key)" in a lower individual character region are disposed.

FIG. 2D(2) illustrates an example in which central individual character regions are added to FIG. 2D(1) to further arrange characters, numbers, symbols or functions.

FIGS. 2D(3) and 2D(4) illustrate an example in which in the (3, 2) character group region, "?" corresponds to the upper individual character region, "Y" corresponds to the left individual character region, "Z" corresponds to the right individual character region, and "spacing (space bar)" corresponds to the lower individual character region. Also, FIGS. 2D (5) and (6) illustrate another example in which the arrangement of the alphabet letters is modified.

FIG. 5 illustrates an example in which the locations of "period (.)" and "comma (,)" are changed and arranged in the English input unit. As illustrated in FIG. 5A, the "period (.)" may be disposed in the central individual character region of the character group region at a position of (1, 2) and the "comma (,)" may be disposed in the central individual character region of the character group region at a position of (2, 2), or as illustrated in FIG. 5B, the "comma (,)" may be disposed in the central individual character region of the character group region at a position of (1, 2) and the "period (.)" may be disposed in the central individual character region of the character group region at a position of (2, 2). This may also be applied even when a different language is arranged in the character input unit.

in an embodiment of the present invention, when an arbitrary point in a (3, 1) character group region or a (3, 3) character group region is pressed and then slid in any direction of upper, lower, left and right sides, the character group region may be converted into another character group region.

Referring to an example of FIG. 6, the character group region at a position of (3, 3) of the character input unit is pressed and slid to upper, lower, left and right sides to be converted into a character group region in which symbols, signs, edit keys, emoticons, and the like are arranged. Similarly, an arbitrary point in the character group region at a position of (3, 1) is pressed and then slid in any direction of upper, lower, left and right sides to be converted into a character group region in which other characters are arranged. Further, when the character group regions are consecutively pressed and slid, the character group regions may be consecutively converted into a character group region in which other characters are arranged, and if the character group regions are consecutively converted, the character group region may return to the first character group region. Similarly, an arbitrary point in the character group region at a position of (3, 1) or (3, 3), or character group regions at other positions may be pressed and then slid in any direction of upper, lower, left and right sides to be converted into another character group region.

In the present invention, when the characters are arranged in the language input unit, characters constituting a language may be sequentially arranged to constitute a character input unit, and then characters may be input or characters may be input by constituting a character input unit in an arbitrary arrangement. For example, when English is input, consonants and vowels of the alphabet may be arranged sequentially in the language input unit, or arranged in a QWERTY type keyboard, or arranged by modifying the order of the alphabet.

In the present invention, the character input unit includes a language shift key 230, and when the user presses the language shift key, the language displayed on the character input unit may be converted. In FIG. 2B, "Language" is an example of the language shift key. The language shift key may be represented as various names or symbols.

In the present invention, the user may change the configuration and arrangement of language characters, numbers, symbols, special characters, emoticons, function keys, edit keys, etc. corresponding to individual character regions as desired by the user. In addition, the data created by the user may be registered in the individual character regions.

FIG. 7 is a flowchart illustrating a process of changing characters in the character input unit according to an embodiment of the present invention.

Referring to FIGS. 2B and 7, the character input unit includes a setting key 240, and the setting key is pressed in operation S400, and a character change is selected in operation S402. When the individual character regions in each character group region are converted into a character changeable state in operation S404, the user selects an individual character region to be changed in operation S406, inputs a new character to be input in operation S408, and terminates the character change in operation S410.

According to the present invention, a miscellaneous input unit 12 may be additionally arranged in a predetermined direction including the upper side, the lower side, the left side, and the right side of the language input unit. In the miscellaneous input unit, data required for character input and new data may be arranged, in addition to a numeral, a symbol, a special character, an emoticon, a function key, a setting key, and an edition key. The miscellaneous input unit is referred to as a numeral input unit 12*a*, a symbol input unit 12*b*, a special character input unit 12*c*, an emoticon input unit 12*d*, a function input unit 12*e*, a setting input unit 12*f*, and an edition input unit 12*g* according to types of the input units.

FIGS. 8A to 8E are diagrams illustrating an example in which a miscellaneous input unit is arranged in a character input unit according to an embodiment of the present invention. FIG. 8A illustrates an example in which the numeral input unit 12*a* in the miscellaneous input unit 12 are arranged on the upper side of the language input unit. FIG. 8B illustrates an example in which the symbol input unit 12*b* is arranged on the lower side of the language input unit, FIG. 8C illustrates an example in which the special character input unit 12*c* is arranged on the left side of the language input unit, and FIG. 8D illustrates an example in which the edition input unit 12*g* is arranged on the right side of the language input unit. FIG. 8E illustrates an example in which the numeral input unit 12*a* is arranged on the upper side of the language input unit, the edition input unit 12*g* is arranged on the right side, the emoticon input unit 12*d* is arranged on the left side, and the symbol input unit 12*b* is arranged on the lower side.

FIG. 9 is a diagram illustrating an example in which a language input unit and a miscellaneous input unit are arranged according to the embodiment of the present invention.

FIG. 9A illustrates an example in which the English input unit is arranged at the center of the character input unit, the symbol input unit 12*b* and the function input unit 12*e* are arranged on the left side, the numeral input unit 12*a* is arranged on the right side, and the emoticon input units 12*d* are arranged on both outsides. When the emoticon input unit is pressed and slid up, down, left, and right, different emoticons are displayed and various emoticons may be input. FIG. 9B illustrates an example in which the English input unit is arranged at the center of the character input unit, the edition input unit 12*g* is arranged on the left side, the special character input unit 12*c* is arranged on the right side, and the emoticon input units 12*d* are arranged on both outsides. In this way, when inputting English, symbols, functions, numerals, emoticons, or English, edition keys, special characters, and emoticons, the English, symbols, functions, numerals, emoticons, or English, edition keys, special characters, and emoticons may be directly input without converting the character input unit.

In the present invention, when an arbitrary point of the miscellaneous input unit is pressed and slid in a predetermined direction including up, down, left, and right, the miscellaneous input unit may be converted into another miscellaneous input unit.

FIG. 10 is a diagram illustrating an example in which the numeral input unit is converted into another miscellaneous input unit by pressing an arbitrary point and then, pushing the arbitrary point in a predetermined direction. FIG. 10 illustrates an example in which, when the numeral input unit 12*a* is pressed and slid to the upper side, the numeral input unit 12*a* is converted into the symbol input unit 12*b*, when the numeral input unit 12*a* is pressed and slid to the right side, the numeral input unit 12*a* is converted into the special character input unit 12*c*, when the numeral input unit 12*a* is pressed and slid to the left side, the numeral input unit 12*a* is converted into the edition input unit 12*g*, and when the numeral input unit 12*a* is pressed and slid to the lower side, the numeral input unit 12*a* is converted into the emoticon input unit 12*d*.

Further, the user may change and register the numerals, symbols, special characters, emoticons, function keys, setting keys, edition keys, or the like in the miscellaneous input unit, and configure and use the miscellaneous input unit, or register and use data produced by the user or new data in the miscellaneous input unit.

When the characters are arranged in the character input device, it is most preferable to sequentially arrange unique characters of each language. As compared with a QWERTY type character input unit, according to the present invention, consonant characters and vowel characters are arranged sequentially so that a user may intuitively and easily find a location of a character to be input, and since more characters are arranged in a limited space and an area occupied by one character is wider than that of the QWERTY type character input unit, there is less interference with adjacent characters, and as a result, a miswriting probability may be reduced and an input time may be shortened.

FIG. 11 is a diagram comparing a visual area occupied by one character in an English character input unit according to an embodiment of the present invention and an existing English QWERTY character input unit which are arranged in the same area. The English QWERTY character input unit a in the related art, which has a size of the character input unit of 7.2 cm in width×5.1 cm in length and an English character input unit b according to the present invention, which has a size of 7.2 cm in width×5.1 cm in length are compared. According to the present invention, a visual area occupied by one character becomes 78.77 mm$^2$ which is 11.67 mm in width and 6.75 mm in length. In the related art, an area of a button in which one character of the QWERTY character input unit is arranged becomes 35.75 mm$^2$ which is 5.5 mm in width and 6.5 mm in length.

Therefore, it is much easier for the user to recognize the character because the area occupied by one character of the present invention is 2.2 times wider visually than the area occupied by one character of the existing English QWERTY character input unit having the same condition.

As illustrated in FIG. 11, the size of the button having one character arranged in the existing English QWERTY input unit is 5.5 mm in width and 6.5 mm in length, and an interval between the buttons is 1.5 mm in the left and right directions and 3.5 mm in the upper and lower directions. Here, a range in which the character is actually input is an intermediate point with an adjacent character button in the left and right directions and a point just before the character button positioned on the lower side in the lower direction becomes an input area of the character in the upper and lower directions. Since an effective horizontal length in which one character is input in the QWERTY input unit becomes (0.75 mm which is ½ of 1.5 mm which is an interval from a left adjacent character button)+(5.5 mm which is a horizontal width of one character button)+(0.75 mm which is ½ of 1.5 mm which is an interval from a right adjacent character button)=70 mm (=0.75 mm+5.5 mm+0.75 mm), and an effective vertical length becomes (6.5 mm which is a vertical width of one character button)+(3.5 mm which is an interval from a lower adjacent character button)=10 mm (=6.5 mm+3.5 mm), an actual area in which one character is input in the existing QWERTY character input unit becomes 70 $mm^2$ (=70 mm in width×10 mm in length).

In the meantime, in the English character input unit according to an embodiment of the present invention, an area occupied by one character group region is 23.3 mm in width×13.5 mm in length and the size of the one individual character region, i.e., the size of an area in which one character is input is 11.67 mm in width×6.75 mm in length. In this case, an interval between the character group regions is 0.5 mm in both width and length and one individual character region has an interval of 0.5 mm from the individual character region adjacent to either one of the left or right side in width and 0.5 mm from the individual character region adjacent only to either one of the upper side or the lower side in length, and as a result, 0.25 mm corresponding to ½ of the interval in width and length is assigned to an input area of each individual character region. Therefore, one individual character region input area according to the present invention is (11.67 mm+0.25 mm) in width×(6.75 mm+0.25 mm) in length=11.92 mm×7 mm=83.44 $mm^2$.

As described above, the English character input unit according to an embodiment of the present invention may arrange more characters in the same space and secure a larger area occupied by one character than that of the QWERTY type character input unit, and thus, a space may be more efficiently used.

In addition, when the characters are arranged in the QWERTY character input unit, since the buttons arranged with characters are arranged in a state of being interlaced with each other, the one character area appears to be visually dispersed. In contrast, in the English character input unit according to an embodiment of the present invention, the character group regions are arranged in a matrix form and the individual character regions are regularly arranged as left upper, right upper, left lower, right lower or center individual character regions and the user may visually and regularly grasp the character areas, and recognize characters intuitively and easily, so that the miswriting probability is reduced.

Further, when comparing a method for arranging English alphabet letters in the character input unit, (q,w,e,r,t,y,u,i,o,p) is arranged in a first row, (a,s,d,f,g,h,j,k,l) is arranged in a second row, and (z,x,c,v,b,n,m) is arranged in a third row of the QWERTY type character input unit and the English alphabet letters are thus out of order, the user may not easily learn the position of the characters and needs to depend on a memory for the position of the characters or individually find and input the characters, and as a result, input efficiency deteriorates.

On the contrary, in an embodiment of the present invention, since the English alphabet letters are sequentially arranged by considering the order of the English alphabet letters, the user may easily find and input the characters, and as a result, efficiency of character input may be improved.

FIG. 12 illustrates a detailed embodiment for each language according to the present invention.

FIG. 12A(1) illustrates an example in which as a German version 1 character input unit, 26 alphabetic characters letters are sequentially arranged in the language input unit and "Ä, Ö, Ü, ß", which is a variant character required for German input is additionally arranged. As described above, when "Ä, Ö, Ü, ß" is additionally arranged, all German characters may be input by pressing the characters displayed in the character input unit in order once without pressing the function key or repeatedly pressing or pressing and holding down, pushing, pressing and pushing, etc. As in the character input method in the related art, in order to input a variant character, a character is pressed for a long time so that the variant character is displayed and then, an operation of moving while maintaining touches up to a point with the variant character to be input need not be performed and the character may be directly input. Therefore, German may be input efficiently.

FIG. 12A(2) illustrates an example in which in a German version 2 character input unit, a method for inputting words by directly pressing respective German alphabet letters and a method for selecting and inputting a desired word among recommended words, when the recommended words are shown by the combination of alphabet letters included in the corresponding character group region at the time of sequentially pressing the central individual character regions.

FIGS. 12A(3) and 12A(4) are diagrams illustrating an Italian version character input unit according to the present invention. FIG. 12A(3) illustrates an example in which only 26 alphabetic characters letters are arranged and FIG. 12A (4) illustrates an example in which "À, É, È, Ì, Ò, Ó, and Ù" which are a variant character required for inputting Italian is arranged in the central individual character region. In this way, all of the Italian characters may be rapidly input by directly pressing the variant character without performing a separate operation of pressing the function key or pressing and holding down the alphabet letter in order to input the variant character.

Further, FIG. 12A(5) is a diagram illustrating a Spanish version 1 character input unit and illustrates an example in which "Ñ" and "¡ and ¿" are additionally arranged, which are required for inputting Spanish while sequentially arranging 26 alphabet letters. FIG. 12A(6) illustrates an example in which all Spanish characters may be rapidly input without a separate operation by arranging "Á, É, Í, Ñ, Ó, Ú, Ü, and Ç" which are the variant characters of Spanish in the central individual character region through a Spanish version 2 character input unit.

Further, 12B illustrates an example illustrating a French character input unit. FIG. 12B(1) illustrates an example in which 26 alphabet letters are sequentially arranged in a keyboard in a French version 1 character input unit. In this case, in order to input the variant character, the variant character may be directly input in a variant character display 260 displayed by pressing an integrated function key 250 as illustrated in FIG. 12B(2).

Further, FIG. 12B(3) illustrates a horizontal mode of the French version 1 character input unit. FIG. 12B(3) illustrates an example in which 26 French alphabet letters are arranged in the language input unit and the variant characters are arranged in the miscellaneous input unit. In this way, the user may input all the French characters without converting the character input unit at the time of inputting basic characters and the variant characters, numerals, emoticons, etc. constituting the French language. When the symbol, the special character, the edition key, or the like are used, the French input unit is left untransformed, and an arbitrary point of the variant character input unit or the numeral input unit is pressed and slid in a predetermined direction including up, down, left, and right, and as a result, the variant character input unit or the numeral input unit may be converted into another miscellaneous input unit and used accordingly.

In a French version 2 character input unit of FIG. 12B(4), 26 alphabet letters and "Â, À, É, È, Ê, Ë, Ï, Î, Ô, Ù, Ü, Û, Ç, and ÿ" which are the variant characters required for inputting French are all displayed and arranged in the respective individual character regions. The user may directly input the variant characters through a single key operation in the language input unit without a need to search the variant characters one by one.

In a French version 3 character input unit of FIG. 12B(5), the central individual character region is further arranged in the French version 1 character input unit of FIG. 12B(1) above. FIG. 12B(5) illustrates an example in which a method for inputting a word by directly pressing the French alphabet letters in order to input the word and a method in which, when the central individual character regions of the respective character group regions are sequentially pressed, one or more recommended words are shown in the display unit or the auxiliary input unit by a combination of the alphabet letters arranged in the corresponding character group region and the user selects and inputs a desired word among the recommended words may be simultaneously performed.

Further, FIG. 12C is a diagram illustrating Japanese version 1 and 2 character input units and Russian and Greek version character input units according to the present invention.

FIG. 12C(1) illustrates an example in which the Japanese version 1 character input unit is arranged so as to input Japanese by using the Roman letters and in the Japanese version 1 character input unit, the Roman letters are sequentially arranged to easily find the location of the Roman letter at the time of inputting the character.

FIG. 12C(2) illustrates an example in which the Japanese version 2 character input unit is arranged so as to directly input Japanese by using hiragana or katakana and illustrates an example in which Hiragana or Katakana is sequentially arranged to allow the user to easily the location of each character. Here, by a hiragana/katakana shift key (カ/ひ), the language input unit may be converted into hiragana or katakana.

The Russian version character input unit of FIG. 12C(3) and the Greek version character input unit of FIG. 12C(4) are examples in which consonant characters and vowel characters of Russian letters or Greek letters are sequentially arranged in the language input unit so that the user may easily recognize the position of each character and efficiently input each character.

FIG. 12D illustrates an embodiment of Arabic, Iranian, and Hindi character input units. In an Arabic version 1 character input unit of FIG. 12D(1), basic 28 Arabic characters and "ى, ة, ء, and ؤ" are arranged by considering the sequence of the characters. An Arabic version 2 character input unit of FIG. 12D(2) is an example in which when Arabic is input by further arranging "أ, آ, إ, and ئ" in the Arabic version 1 character input unit, Arabic may be directly input without a separate operation in the language input unit.

The Iranian version character input unit of FIG. 12D(3) is also an example in which characters constituting Iranian are arranged by considering the sequence of characters.

FIG. 12D(4) illustrates an example of the Hindi version character input unit. Since the numbers of consonants and vowels in Hindi are large, it is not possible to arrange consonants and vowels of Hindi on one display in an input keyboard of a cell phone or the like in the related art and the consonants and vowels of Hindi are separately arranged in two to three displays and Hindi needs to be input while consecutively converting the display. However, in the present invention, all of the consonants and vowels of Hindi may be arranged on one display in the horizontal mode as illustrated in FIG. 12D(4). When 33 Hindi consonants are arranged in the central language input unit and Hindi vowels are arranged in the left and right miscellaneous input units, Hindi characters may be directly input without display conversion in order to input Hindi. The numerals or symbols may be variously input by converting the miscellaneous input units as necessary.

FIG. 12E is a diagram illustrating a Korean character input unit according to an embodiment of the present invention. Each of a total of 33 characters including 14 single consonants "ㄱ, ㄴ, ㄷ, ㄹ, ㅁ, ㅂ, ㅅ, ㅇ, ㅈ, ㅊ, ㅋ, ㅌ, ㅍ, and ㅎ" and five double consonants "ㄲ, ㄸ, ㅃ, ㅆ, and ㅉ" and six single vowels "ㅏ, ㅓ, ㅗ, ㅜ, ㅡ, and ㅣ" and eight double vowels "ㅑ, ㅕ, ㅛ, ㅠ, ㅐ, ㅔ, ㅒ, and ㅖ" of Korean is separately arranged in the Korean input unit to input all Korean characters by pressing the characters in the character input unit once as they are, without repeatedly pressing or pressing and holding down, pushing, pressing and then, pushing the characters, etc. or without pressing a shift key or a function key such as a shift key.

The Korean version input unit according to an embodiment of the present invention arranges Korean consonants and vowels in the language input unit in consideration of sequential arrangement, resemblance, and frequency of use and it is possible for the user to rapidly and efficiently input the Korean consonants and vowels by easily knowing the locations of the Korean consonants and vowels.

The Korean version character input units of FIGS. 12E(1) to 12E(4) are examples in which Korean characters are arranged left upper, right upper, left lower, and right lower individual character regions when the Korean characters are arranged in each character group region, and the Korean version character input units of FIGS. 12E(5) and 12E(6) are examples in which the Korean characters are arranged in upper, lower, left and right individual character regions.

Further, FIGS. 12E(3), 12E(4), and 12E(6) are examples of a diagram in which each individual character region may be visually distinguished with a boundary line or a separation area. Besides, when Korean is input, Korean characters may be arranged by variously transforming the locations of Korean consonants and vowels or various function keys.

As described above, according to the embodiment of the present invention, all languages around the world may be arranged by reflecting the features of each language and characters may be effectively input.

Another feature of the present invention is a function to set the shift key or function key in advance. As illustrated in FIG. 13A, one or more integrated function keys 250 may be arranged in the character group region in the character input unit. In an embodiment according to the present invention, four integrated function keys are arranged.

When any one of the integrated function keys is pressed, a data display 251 is displayed so that the user may select and input desired data. The data display is scrolled vertically or horizontally for the user to find data, or a predetermined point of the data display may be pressed and slid in a predetermined direction including up, down, left, and right to convert the data display into another data display. The numerals, the symbols, the special characters, the emoticons, the function keys, the setting keys, the edition keys, and the like may be registered in the integrated function key in advance.

The user may register data desired by the user, such as the characters, symbols, figures, pictures, photos, moving pictures, emoticons, voice files, audio files, contacts, notes, common phrases, or data produced by the user, in the integrated function key. For example, in FIG. 13A, in a first integrated function key of the four integrated function keys, all photographs frequently used by the user may be collected, in a second integrated function key, the common phrases may be registered, in a third integrated function key, frequently used emoticons may be stored, and a fourth integrated function key, recent notes may be registered. In this way, data to be frequently used or data which needs to be rapidly retrieved may be found and used immediately at the time of inputting the characters.

FIG. 13B is a diagram illustrating an example in which the data is registered in the integrated function key.

FIG. 14 is a flowchart illustrating a process in which the user registers new data in the integrated function key. The integrate function key for registering new data is pressed in operation S500 and a new registration location is selected in the integrated function key in operation S502. In this case, data may be loaded and the storage unit 40 storing the data may be accessed in operation S504, the user may select data to be newly registered in the storage unit in operation S506, and the selected data may be registered in the integrated function key in operation S508. Further, the user may directly input and register the data in operation S505. For example, when the user presses a "direct input" key when inputting the common phrase, character input keys may be listed and the user can register it directly as illustrated in FIG. 13C.

When selecting data from the data display, each of an integrated parenthesis key, a space bar, an enter key, and a backspace key may be used. When the user presses a point other than the data display, the data display may be closed.

Further, in the present invention, when the input character is a Roman letter based language and there is a variant character in addition to 26 basic letters, if the user presses any one of the integrated function keys, a variant character display 260 is displayed to input the variant character as illustrated in FIG. 12B(2) or 13(*d*).

In the character input unit in the related art, when the alphabet letter is pressed and held down at the time of inputting the variant character, a variant character set appears and, in this case, when a finger pressing the alphabet letter is released, the variant character set disappears. Therefore, in order to input the variant character, while the user presses the alphabet letter and does not release the finger, the user moves the finger over the desired variant character among a plurality of variant characters displayed in the variant character set, and the variant character corresponding to the point at which the finger is removed is input. When the user does not reach the character desired by the user and releases the finger, the user inputs a character completely different from the intention of the user. Therefore, it is inconvenient for a user to correct the character and input the corrected character again.

In addition, in the case of the character input unit in the related art, if one variant character is input, the variant character set is closed. Therefore, if a user desires to input a plurality of variant characters at a time, it is inconvenient for a user to repeat the process of moving the finger up to a desired variant character while holding a pressing operation after pressing and holding down the alphabet letter again.

In the present invention, if the user presses the integrated function key once to display the variant character display, then the variant character display remains open, even if the user releases his or her hand. When the user does not move while holding the alphabet letter with the finger, it is possible to increase the convenience of the user, because the input may be performed by pressing the variant character as desired immediately in the opened variant character display. Further, since the variant character display is opened as it is, even after the variant character is input, additional variant characters may be consecutively input as desired. When the user desires to finish inputting the variant character, pressing the point other than the variant character display closes the variant character display and terminates a variant character input process.

The variant character display is scrolled vertically or horizontally for a user to find the variant character or an arbitrary point of the variant character display is pressed and then, slid in a predetermined direction including up, down, left, and right to convert the variant character display into another variant character display.

In addition, according to an embodiment of the present invention, when Korean characters are input via the Korean character input unit, if the integrated function key is pressed, as seen by FIG. 13(*b*), the variant character display 261 in which archaic word of Hangul including four characters "ㆁ ㆆ ㆍ ㅿ" of Hunminjeonggeum is listed is displayed to variously input the archaic word of Hangul including four characters "ㆁ ㆆ ㆍ ㅿ" of Hunminjeonggeum.

Further, in the present invention, if the integrated function key is pressed and held down for 0.2 seconds or more, the integrated function key may be used as another function key and a pressing and holding time may be changed by the user.

Further, in the present invention, an upper/lower case shift key 270 may be further arranged at the time of inputting a language having upper and lower case letters in terms of a system of the language in the character input unit. In the case of the characters displayed on the character input unit, the characters input via the character input unit are input as lower case letters basically, and only characters to be converted into the upper case letters may be converted by pressing the upper/lower case shift key.

When the upper/lower case shift key is pressed once while a cursor is present in the rear of a character or word which is input as the lower case letter, the character or word is converted into the upper case letter. In this case, an object to be converted corresponds to a character or a word after a blank is input and the character or word before the blank is input remains unchanged, as the lower case letter as it is without giving an influence. Further, when the upper/lower case shift key is pressed once while the cursor is present in the rear of the character or word input as or converted into the upper case letter, the character or word is converted into the lower case letter, which similarly influences only the character or word after the blank is input.

In addition, when a conversion range with respect to contents input as the lower case letter is selected such as the character, the word, a paragraph, a page, etc., the contents may be all converted into the upper case letter regardless of the blank by pressing the upper/lower case shift key. In addition, when a conversion range with respect to contents input or converted as the upper case letter is selected such as the character, the word, the paragraph, the page, etc., the contents may be all converted into the lower case letter regardless of the blank by pressing the upper/lower case shift key.

Further, when the upper/lower case shift key is repeatedly pressed (e.g., a double click, etc.), the upper case letters for the entire characters or words input in front of the cursor are converted into the lower case letters and the lower case letters are converted into the upper case letters in a row where the cursor is present.

In addition, when the characters displayed on the character input unit are to be all converted into the upper case letters, if the upper/lower case shift key is pressed and held down for 0.2 seconds or more, all of the characters displayed on the character input unit may be converted into the upper case letters. When the upper/lower case shift key is pressed once again for 0.2 seconds or more, all of the characters are displayed on the character input unit as the lower case letters.

Referring to FIG. 15A, when an upper/lower case shift key 270 is pressed once while the cursor is present in the rear of the word after the word "korea" is input, the word is converted into an upper case letter "KOREA". When the upper/lower case shift key 270 is pressed once while the cursor is present in the rear of the word after a word "APPLE" is input, the word is converted into a lower case letter "apple".

Referring to FIG. 15B, when a sentence "have a nice day" is input, if upper/lower case shift key 270 is repeatedly pressed while the cursor is present in this row, the entire character or word input in front of the row where the cursor is present is converted into the upper case letter like "HAVE A NICE DAY".

In order to input the upper case letter by the method in the related art, the character needs to be input after converting all character input units into the upper case letters by pressing a "shift" key or a "Caps Lock" key. In addition, in order to input the lower case letters again, the character needs to be input after converting all character input units into the lower case letters by pressing the "shift" key or "Caps Lock" key. Therefore, when the upper case letter is input and the lower case letter is input again, a user may feel inconvenient in that the "shift" key or "Caps Lock" key needs to be pressed once in order to convert the character input unit into the upper case letter, and pressed once in order to convert the character input unit into the lower case letter, i.e., twice in total.

When the upper/lower case shift key of the present invention is used, the characters may be consecutively input without braking the flow of character input while converting only a desired character into the upper case letter in the process of inputting the character. Further, the characters or words may be immediately converted into the upper case letters or the lower case letters at once regardless of the number of characters.

A method using the function key such as the "Shift" key or "Caps Lock" key in the related art is compared with a method using the upper/lower case shift key of the present invention to convert the upper and lower case letters.

In the method using the function key (hereinafter, referred to as a "function key") such as the "Caps Lock" key or "Shift" key, the function key needs to be pressed every time the upper case letter and the lower case letter are converted. For example, when a paragraph "The New Science of Exercise" is input, after switching to an upper case letter input state by pressing the function key once and then, "T" is input and after switching to a lower case letter input state by pressing the function key once again and "he" is input. After switching to the upper case letter input state by pressing the function key once again, "N" is input and after switching to the lower case letter input state by pressing the function key once and then, "ew" is input. In this way, the function key needs to be pressed again each before and after "S" and "E" are pressed. Therefore, in order to input the above example paragraph, the function key needs to be pressed eight times in total.

The method using the upper/lower case shift key according to the present invention is described as follows. In the present invention, preferably, since the lower case letter is basically input, first, "t" is input and then, the upper/lower case shift key is pressed once to convert the lower case letter into "T". Next, the language input unit is not changed to the upper case letter input state, but the lower case input state is maintained as it is, so "he" and "n" are input without a separate operation. Next, when the upper/lower case shift key is pressed once, "n" is converted into "N". In this case, the upper/lower case shift key operates on the character or word after the blank is input and the character or word before the blank is input remains unchanged as the lower case letter as it is without giving the influence. Next, when "ew" and "s" are pressed and the upper/lower case shift key is pressed once, "s" is converted into "S". Next, when "cience of" and "e" are pressed and the upper/lower case shift key is pressed once, "e" is converted into "E". Next, "xercise" may be even input. Accordingly, when the upper/lower case shift key is used, the present invention completes the above example sentence with four presses in total.

The above method is an efficient character input method because the number of times of pressing the key may be reduced to half to convert the upper and lower case letters by using the upper/lower case shift key of the present invention as compared with a case of pressing the function key such as the Caps Lock key, etc. in the related art in order to convert the upper and lower case letters.

According to the present invention, when arranging the numerals in the miscellaneous input unit, the numerals may be arranged as "1, 2, 3, 4, 5, 6, 7, 8, 9, and 0" according to the method in the related art and arranged in the order of "0, 1, 2, 3, 4, 5, 6, 7, 8, and 9" by locating "0" in front of "1". By placing "0" and "1" adjacent to each other in this manner, an input speed may be increased by shortening a fingering distance of the finger when a telephone number starting with "010" or "001" is pressed. Further, as illustrated in FIG. 9A, "0" and "1" may be applied while being arranged adjacent to each other. Alternatively, the numerals are arranged in the order of "1, 2, 3, 4, 5, 0, 6, 7, 8, 9" or "0, 1, 2, 3, 4, 5, 6, 7, 8, 9, 0" to be conveniently input.

Further, according to an embodiment of the present invention, when the numerals are arranged in the miscellaneous input unit, if each numeral is pressed for 0.2 seconds or more, a numeral data display 280 in which multiple data is registered may be displayed and the user may select and input desired data among the multiple data. The numeral data display is scrolled vertically or horizontally to show more data.

FIG. 16A(1) illustrates an example in which number 7 is pressed for 0.2 seconds or more in the numeral input unit and FIG. 16A(2) illustrates an example in which the numeral data display registered in number 7 is displayed. For example, the user may register data such as symbols, photos, moving pictures, emoticons, edition keys, notes, audio files, and the like frequently used by the user in advance on the numeral data display of the number 7 in accordance with the user's needs and rapidly find and input the data in the numeral data display. At this time, the integrated parenthesis key, space key, backspace key, enter key, etc. may be used together.

FIGS. 16B(1) to 16B(6) illustrate an example in which the data is registered in each number. For example, FIGS. 16B(1) to 16B(6) illustrate examples in which (1) symbol, (2) emoticon, (3) edition key, (4) photo or moving picture, (5) bank account number or card, securities account number, and (6) audio file are registered.

The data registered in the numeral data display may be previously registered in advance, even if the user does not register the data one by one.

Further, when the user generates each data, the data may be immediately displayed on the numeral data display in link with the numeral data display. For example, when the user takes a picture and stores the picture to generate a photo file, the photo file is arranged in link with the numeral data display of number 3 of FIG. 16B(4) and when the user generates the audio file, the audio file is arranged in link with the numeral data display of number 5 of FIG. 16B(6).

Further, the user may newly register the data in the numeral data display and change or delete the data. When the numeral data display 280 is displayed by pressing each number for 0.2 seconds or more, a location at which the data is to be newly registered is selected. When the location at which the data is to be newly generated is pressed for 0.2 seconds or more or repeatedly pressed, a mode for registering new data is active. Thereafter, the data to be registered may be loaded from the storage unit 40 and registered or directly input and registered. Further, the user may delete desired data.

In addition, FIG. 16C is a diagram illustrating an example in which the numeral data display is displayed when number 9 is pressed and held down for 0.2 seconds or more in the horizontal mode according to an embodiment of the present invention.

FIGS. 16D(1) and 16D(2) are diagrams illustrating an example in which when the user selects a location at which the data is to be newly registered in each numeral data display and selects "direct input", the numeral key is listed and data to be input is prepared and registered.

Further, the user may know which data is arranged in a series of numbers through a display guide unit 283 on each numeral data display. In the display guide unit, each number and first data in the numeral data display are displayed in pairs. The pair of each number and the first data of the numeral data display is converted at a predetermined time interval in the order in which the numbers are arranged. In this case, the predetermined time interval may be preferably one second.

Referring to FIG. 16B as an example, each number and the first data of the corresponding number are displayed in the display guide unit in pairs in the order of (0,*)->(1, )->(2,←)->(3, 사진 1)->(4, 국민은행)->(5, 오디오 1), etc. and converted at an interval of 1 second. The user sees the display guide unit to know what is arranged in each number. When the display guide unit is pressed, the display guide unit is immediately converted into the numeral data display corresponding to the number. For example, if the user wants to input the photo at the time of currently inputting the symbol on the numeral data display of the current number 0, when (3, photo 1) is displayed in the display guide unit, (3, photo 1) is pressed to immediately convert the display guide unit into the numeral data display of number 3 and the photos are listed, and as a result, the user may immediately input the photo.

As illustrated in FIG. 16E, when an arbitrary point of the numeral data display is pressed and slid in a predetermined direction including up, down, left, and right, the numeral data display may be converted into another numeral data display.

The present invention provides a method for efficiently inputting various parenthesis symbols. The parenthesis symbols include numerous parenthesis symbols including "[ ], < >, { }, 《》, 「」, 【】, 『』, 〖〗", or the like, in addition to a parenthesis symbol "( )" and is composed of an open parenthesis symbol and a closed parenthesis symbol.

In the present invention, the character input unit includes an integrated parenthesis key 290 and when the integrated parenthesis key is touched or pressed for 0.2 seconds or more, a parenthesis symbol display 291 in which various parentheses are listed is displayed as illustrated in FIG. 17A.

If the user inputs the parenthesis symbol on the parenthesis symbol display, the parenthesis symbol display may be immediately closed or the parenthesis symbol display may remain open even after the parenthesis symbol is input, so that additional parenthesis symbols may be consecutively input as desired. Thereafter, when a point other than the parenthesis symbol display is pressed, the parenthesis symbol display may be closed.

When an arbitrary point is pressed and slid in a predetermined direction including up, down, left, and right as illustrated in FIG. 17B, the parenthesis symbol display 291 is converted into another symbol display to conveniently input various symbols, special characters, unit symbols, currency symbols, emoticons, and the like.

Two methods that input the parenthesis symbol "( )" by using the integrated parenthesis key according to an embodiment of the present invention will be described.

In the first case, when the integrated parenthesis key is pressed once, "(" which is the open parenthesis symbol is input and when the integrated parenthesis key is pressed once again, ")" which is the closed parenthesis symbol is input to complete the parenthesis symbol. When the parenthesis symbol is to be consecutively input, when the integrated parenthesis key is repeatedly pressed after inputting "(" which is the open parenthesis symbol by pressing the integrated parenthesis key once, the open parenthesis symbol "(" is consecutively input and in order to input the closed parenthesis symbol ")", and each time the integrated parenthesis key is pressed once, the closed parenthesis symbol ")" is input to complete the parenthesis symbol.

FIG. 17C is a diagram illustrating a method of inputting a parenthesis symbol by pressing an integrated parenthesis key according to an embodiment of the present invention. In this case, in order to display the parenthesis symbol display, the integrated parenthesis key is pressed for 0.2 seconds or more.

A second case is a method in which the parenthesis symbol display is immediately displayed by touching the integrated parenthesis key and the parenthesis symbol "( )" is input in the parenthesis symbol display. When a parenthesis symbol pair "( )" is pressed once in the parenthesis symbol display, "(" which is the open parenthesis symbol is input and when the integrated parenthesis key is pressed once again, ")" which is the closed parenthesis symbol is input to complete the parenthesis symbol. When the parenthesis symbol is to be consecutively input, in the parenthesis symbol display, when the parenthesis symbol pair "( )" is repeatedly pressed after inputting "(" which is the open parenthesis symbol by pressing the parenthesis symbol pair "( )" once, the open parenthesis symbol "(" is consecutively input and in order to input the closed parenthesis symbol ")", and each time the integrated parenthesis key is pressed once, the closed parenthesis symbol ")" is input to complete the parenthesis symbol.

FIG. 17D is a diagram illustrating a method of inputting a parenthesis symbol "( )" on the parenthesis symbol display according to an embodiment of the present invention.

FIGS. 18A and 18B are diagrams illustrating a method for inputting various parenthesis symbols using the integrated parenthesis key according to an embodiment of the present invention.

When the user touches the integrated parenthesis key or presses the key for 0.2 seconds or more, a parenthesis symbol display is displayed, and when the user presses a specific parenthesis symbol pair to be input, an opened parenthesis symbol of the specific parenthesis symbol is input. After the user inputs the content to be input in the parenthesis symbol, the user presses the integrated parenthesis key to complete the closed parenthesis symbol. FIG. 18A illustrates a method of inputting a parenthesis symbol pair "《》".

Further, according to an embodiment of the present invention, in the case where the user additionally inputs a parenthesis symbol inside the parenthesis symbol, when a parenthesis symbol pair to be first input is pressed once on a parenthesis symbol display in which the plurality of parenthesis symbols are listed, an opened parenthesis symbol of the first parenthesis symbol pair is input, and when a parenthesis symbol pair to be second input is pressed once, an opened parenthesis symbol of the second parenthesis symbol pair is input, and in the same manner, the user may press any parenthesis symbol pair once to input an opened parenthesis symbol thereof. If the same parenthesis symbol is consecutively input, the parenthesis symbol pair is repeatedly pressed. When the user inputs the closed parenthesis symbols corresponding to the input opened parenthesis symbols, if the integrated parenthesis key is pressed once, the closed parenthesis symbol is inputted in reverse order from the pair of the parenthesis symbol pair inputted later to complete the parenthesis symbol. An example thereof is illustrated in FIG. 18B.

FIGS. 19A and 19B are diagrams illustrating a method for consecutively inputting various parenthesis symbols using the integrated parenthesis key according to an embodiment of the present invention.

In this way, when a large number of parenthesis symbols are input, it is possible to reduce the inconvenience of finding the opened parenthesis symbol and the closed parenthesis symbol one by one for each parenthesis symbol.

In the present invention, the character input unit 10 further includes an auxiliary input unit 13, and when a character is input in the language input unit 11 or the miscellaneous input unit 12, data such as an emoticon, an icon, and a symbol related to the character are retrieved and extracted from the storage unit to be listed in the auxiliary input unit, and the user may select and input the character. When the user presses any point and pushes the point in any direction including up, down, left, and right, more data may be listed in the auxiliary input unit.

Referring to FIG. 20, when describing an embodiment, in the case where the user inputs "Happy birthday to you" in the character input unit, the user retrieves and extracts related data such as icons, emoticons, and symbols associated with the character from the storage unit 40 to display the data on the auxiliary input unit 13 and the user may select and input a desired thing among the data.

When a number is input in the character input unit, an operation symbol such as "+, −, ×, ÷, ±, =" may be displayed on the auxiliary input unit. FIG. 21 is a diagram illustrating an example in which an operation symbol is displayed on the auxiliary input unit according to an embodiment of the present invention. In this way, when a symbol related to a number is to be input, the symbol may be directly input without changing the character input unit without in order to separately search for the symbol.

FIG. 22 is a diagram illustrating a Chinese version 3×4 keyboard in the related art and Chinese version 1 (Chinese+English), Chinese version 2, and Chinese version 3 character input units according to an embodiment of the present invention.

When Chinese is input, a method of inputting Hanyu Pinyin (Chinese characters) in Roman symbols and selecting a Chinese character displayed by the input is used.

In a Chinese version 3×4 keyboard using Pinyin in the related art in FIG. 22*a,* 3 to 4 Chinese Pinyins, such as ('), (abc), and (def) in the first row and (ghi), (jkl), and (mno) in the second row, and (pqrs), (tuv), and (wxyz) in the third row, are collected and arranged. When a user presses sequentially a key including Pinyins constituting a word to be input, the Pinyins included in each key are sequentially combined to represent one or more Pinyin words, and one or more Chinese characters corresponding thereto are displayed, and the user may select and input a Chinese character to be input among the Chinese characters.

The present invention provides a method for simultaneously inputting Chinese and English in one input unit without converting the language input unit by considering that the Roman characters used for inputting Hanyu Pinyin of Chinese are the same as English letters.

According to an embodiment of the present invention, the Chinese version 1 (Chinese+English) character input unit illustrated in FIG. 22B may simultaneously input Chinese and English. In each character group region of the Chinese version 1 (Chinese+English) character input unit, Roman characters are arranged in the left upper, right upper, left lower, and right lower individual character regions, and the central individual character region is arranged together. The arrangement of the individual character regions may be modified in various ways, such as upper, lower, left, and right individual character regions.

When the user presses the central individual character region of each character group region, the Roman characters arranged in the corresponding character group region are recognized as Hanyu Pinyin and the Chinese is input. When the user inputs Chinese, the user presses sequentially the central individual character regions of the character group regions including the Pinyins to be input. Accordingly, the Pinyins are combined in the order of the Pinyin letters belonging to each character group region, the combined Pinyins and at least one Chinese character corresponding thereto are arranged in the auxiliary input unit, and the user selects and inputs a desired Chinese character among the Chinese characters. At this time, when one or more of the Pinyins are combined by pressing the central individual character regions sequentially, the user may select the correct Pinyin among the Pinyins. Further, a word which is frequently used or recently used is automatically recommended among the words that may be combined into the Pinyins belonging to each character group region to be listed on an upper layer.

Further, when the roman characters of the left upper, right upper, left lower, and right lower individual character regions, or upper, lower, left, and right individual character regions are pressed, respectively, the pressed Roman characters are recognized as English letters, and English is input on the display unit.

As described above, when the Chinese version 1 (Chinese+English) character input unit according to an embodiment of the present invention is used, it is possible to simultaneously input two languages (Chinese and English) in one language input unit without converting the language input unit at all.

An example of inputting an example sentence of "我的英文名字是汤姆. My English name is Tom. 我的电子邮件是 tom11@qq.com" in the Chinese version 1 (Chinese+English) character input unit of FIG. 22*b* will be described. First, in order to input "我的英文名字足汤姆.", Pinyins corresponding to "Wo de yingwen mingzi shi tangmu." need to be input. To this end, when Pinyin "Wo" and Chinese characters "我, 沃, 喔, 握, 窝 . . . " corresponding thereto are displayed by pressing each character group region including "Wo", that is, a central individual character region of (uvwx)->(mnop), "我" is selected and input among the Chinese characters. Hereinafter, other words are input in the same method. FIG. 23A(1) illustrates a process of inputting Chinese by sequentially pressing the central individual character regions.

When "My English name is Tom." is input as illustrated in FIG. 23A(2), English is input by pressing alphabet letters as it is in the left upper, right upper, left lower, and right lower individual character regions in each character group region including the corresponding alphabet letters as they are. At this time, the upper/lower case shift key 270 may be pressed to convert the upper/lower case characters more quickly.

Even when the user presses "我的电了邮件足 tom11@qq.com", the user sequentially presses the central individual character region of each character group region without being separately converted to a Chinese character input unit to input "我的电子邮件是" in the Hanyu Pinyin, and when the user presses "tom11@qq.com.", the user presses the left upper, right upper, left lower, and right lower individual character regions or upper, lower, left, and right individual character regions in each character group region to directly input English.

In an example illustrated in FIG. 23A(3), it can be seen that the user may quickly find and immediately input a mail address registered in the number button 0.

In the present invention, when Chinese is input as the Hanyu Pinyin, all languages written in Roman characters as well as English may be input in parallel with Chinese via single language input unit. For example, all romanized languages, such as Chinese+Italian, Chinese+German, Chinese+French, Chinese+Spanish, Chinese+Indonesian, and the like, are available.

FIG. 23B is a diagram illustrating an example in which languages using Chinese and Roman are simultaneously input by a Chinese-version 1 character input unit according to an embodiment of the present invention. FIG. 23B(1) illustrates an example in which Chinese and Italian may be simultaneously input, and FIG. 23B(2) illustrates an example in which Chinese and German may be simultaneously input.

In the present invention, as illustrated in FIG. 23B(1), a Chinese translation key 301 is included to immediately translate the Roman language including Chinese and English and may be used for inputting. For example, in the Chinese version 1 (Chinese+Italian) character input unit, Chinese is input and translated and displayed to Italian when the Chinese translation key is pressed, and Italian is input and translated and displayed to Chinese when the Chinese translation key is pressed.

The Chinese version 2 and Chinese version 3 character input units will be described with reference to FIG. 22.

In the Chinese version 2 character input unit of FIG. 22C, when Pinyins of Chinese are input, the Pinyins in left upper, right upper, left lower, and right lower individual character regions or upper, lower, left, and right individual character regions in each character group region are individually directly pressed and input, respectively. By this method, it is possible to input the correct Pinyins and immediately select the Chinese character displayed by the input Pinyins.

In the Chinese version-3 character input unit illustrated in FIG. 22D, four or two Pinyin letters are collectively arranged in one character group region and separately arranged in each individual character region, and thus the user may simultaneously use a method of inputting Pinyins, respectively, and a method of combining four or two Pinyins by pressing a central individual character region to represent a word.

In addition, in the present invention, in the case of inputting Chinese, a traditional-simplified Chinese shift key 300 may be used to convert traditional Chinese and simplified Chinese. When the traditional-simplified Chinese shift key is pressed once with a cursor after a character input as a traditional character, the character is converted into a simplified character, and when the traditional-simplified Chinese shift key is pressed once with a cursor after a character input as a simplified character, the character may be converted into a traditional character. Alternatively, when the traditional-simplified Chinese shift key is pressed, in the entire input content, traditional characters may be converted into simplified characters, and the simplified characters may be converted into traditional characters.

FIG. 24 is a diagram illustrating an example in which the traditional-simplified Chinese shift key is disposed in the Chinese character input unit. Referring to FIG. 24A, when Pinyins corresponding to "wi pyeon sam jeol" and "mu gung mu jin" are input by the Chinese character input unit, simplified characters of "韦编三绝", "无穷无尽" may be input. At this time, when the traditional-simplified Chinese shift key is pressed, the simplified characters may be converted into traditional characters of "韋編三絕", "無窮無盡" as illustrated in FIG. 24B.

In addition, when the traditional-simplified Chinese shift key is set to the traditional Chinese in the Chinese version character input unit, the traditional Chinese is input on the display unit, and when the traditional-simplified Chinese shift key is set to the simplified Chinese, the simplified Chinese is input on the display unit.

In the present invention, the language input units of various countries are arranged in various ways according to the needs of the user, and the efficiency of inputting characters may be improved. A detailed example of a Chinese version input keyboard will be described as an example. First, FIG. 25A illustrates that a Chinese input unit is arranged with a number input unit, a symbol input unit, and an emoticon input unit when used in a transverse mode in an electronic device such as a mobile phone or a tablet PC, and is arranged so as to perform various inputs without converting the character input unit as much as possible.

FIG. 25A(1) illustrates an example of the Chinese Version 1 (Chinese+English) character input unit. The user may immediately input Chinese, English, numbers, symbols, and emoticons at the same time without converting the character input unit. FIG. 25A(2) illustrates an example of inputting Chinese and English respectively by arranging a Chinese version 2 character input unit and an English character input unit facing each other. When using the embodiment, when a Chinese user and an English user input characters in each character input unit and then press the translation key 310 with a character input device, the translated content is translated into the corresponding language on the display unit of the other language. In this way, even if the Chinese user and the English user do not know the language of the other party, the users may input the characters in their respective languages and transmit the translated content to the other party.

FIG. 25B(1) is a diagram in which a writing unit 320 is simultaneously arranged in the Chinese version 1 (Chinese+English) character input unit. In the present invention, the user may press or touch a character key without converting a display and simultaneously input characters by directly drawing or writing with a pen or the hand. It is preferable that not only a pen for an electronic device or the hand but also any writing instrument may be used for the writing unit and may be input even by a minute pressure. It is efficient for smooth communication such that the user directly draws pictures, drawings, diagrams, figures and the like or directly inputs physical formulas, chemical formulas, mathematical formulas, and the like.

In FIG. 25B(2), the Chinese version 2 character input unit and the English character input unit face each other and the writing units are arranged at the same time.

FIG. 25C illustrates an example in which two language input units are arranged at the same time to input two languages at the same time. FIG. 25C(1) illustrates an example in which the Chinese version 1 (Chinese+English) character input unit is arranged in a left language input unit, a Korean input unit is arranged in a right language input unit, and a number input unit is arranged in the center. In this example, Chinese, English and Korean, and three languages and numbers may be input at the same time without converting the character input unit. At this time, when romanized languages are disposed, instead of English, three languages of Chinese, a romanized language, and Korean may be input at the same time without converting the character input unit.

FIG. 25C(2) illustrates an example in which the Chinese version 2 character input unit is arranged in the left language input unit, an English version character input unit is arranged in the right language input unit, and a number input unit is arranged in the center. In this example, Chinese, English, and numbers may be input at the same time without converting the character input unit. At this time, the display unit is divided for each language input unit, and the contents input by each language input unit are input to the display unit which belongs to each language. Thereafter, when the user presses the translation key 310, the translated content is displayed on the display unit of the other language. At this time, the sound of the translated content may be heard by pressing a speaker key 311.

Various languages may be arranged in each language input unit of FIG. 25C. For example, various combinations such as Chinese+German, Russian+French, and English+Korean are arranged and two languages or three languages may be input at the same time. Miscellaneous input units at the center may be arranged in various ways.

In addition, as illustrated in FIG. 25C(3), when a number key is pressed for 0.2 seconds or more in the number input unit at the center, a numeral data display is displayed so that various user-centered data may be inputted quickly and efficiently.

FIG. 25D is a diagram illustrating an example in which character input units of respective countries are arranged vertically at the same time. FIG. 25D(1) is an example in which the English input unit is arranged on the upper side and the Chinese version 2 character input unit is arranged on the lower side to input Chinese and English simultaneously. FIG. 25D(2) illustrates an example in which the Chinese language version 1 (Chinese+English) character input unit is arranged on the lower side and the Korean input unit is arranged on the upper side to input three languages of Chinese, English, and Korean simultaneously.

FIGS. 25E to 25G are diagrams illustrating examples in which four languages may be input simultaneously in an electronic device which is somewhat larger than a mobile phone, such as a tablet PC. FIG. 25E illustrates an example in which Korean, Chinese, Russian, and Japanese may be simultaneously input by simultaneously arranging Korean version, Chinese version 2, Russian version, and Japanese version character input units. At this time, when the Chinese version 1 (Chinese+English) character input unit is arranged, five languages may be input at the same time.

FIG. 25F illustrates respective language input units for inputting Chinese, English, Russian and Japanese, and respective display units corresponding thereto. The user may input a character in any one of the four language input units and press the translation key 310 so that the translated content is displayed on the display units of the remaining three languages.

FIG. 25G illustrates an example in which Chinese, Korean, Russian, and Japanese may be separately input at the same time in one electronic device. In the example of FIG. 25G, people using Korean, Chinese, Russian, and Japanese input their own languages, translate the language into the languages of the remaining three countries by pressing the translation key, and display each language on a display unit corresponding to each language. In this way, even if people do not know the languages of other countries, the people may communicate with each other by utilizing the character input device.

FIG. 26 illustrates yet another embodiment in which four languages may be simultaneously input. Language input units and display units of four countries are arranged in one electronic device and a miscellaneous input unit and a writing unit 320 are separately arranged in each language input unit.

Referring to FIG. 26A, a Chinese character input unit 1, a Korean character input unit 2, a Russian character input unit 3, and a Japanese character input unit 4 are arranged, and a number input unit, an emoticon input unit, and the writing unit 320 are arranged for each language input unit, respectively. In this case, respective languages of the four countries are input and the translated content may be displayed on the display unit of another language by pressing the translation key 310. The writing unit may be disposed on the right side as illustrated in FIG. 26A or on the left side of each language input unit. Specifically, for people using the left hands, it is more convenient to dispose and use the writing unit on the left side.

FIG. 26B illustrates contents input on each display unit by inputting a mathematical formula by writing in a writing unit which belongs to a Chinese input unit according to an embodiment of the present invention.

FIG. 26C is a diagram illustrating a method of inputting four languages in a mobile phone. In a mobile phone, it is impossible to arrange language input units, miscellaneous input units, writing units, and display units of four languages as illustrated in FIG. 26A due to spatial limitations. A method is used in which a language-specific display is reduced by an icon, the number, and the like to be disposed in a periphery portion, and a language is selected and input and then converted into the remaining languages. When a language input unit, a miscellaneous input unit, a writing unit, and a display unit of four languages are arranged as shown in FIG. 26C(1), respectively, if an arbitrary portion of a character input unit of a language to be input first is selected, only a character input unit and a display unit of the selected language are arranged as shown in FIG. 26C(2). FIG. 26C(1) illustrates an example in which Chinese corresponding to No. 1 is selected. Then, only the Chinese input unit, the miscellaneous input unit, the writing unit, and the display unit belonging to Chinese are arranged as shown in FIG. 26C(2), and the remaining languages are represented as a language input unit number 321. The language input unit number is represented by numbers 2, 3, and 4, 2 represents a Korean character input unit, 3 represents a Russian character input unit, and 4 represents a Japanese character input unit. At this time, if one of the language input unit numbers is pressed, the character input unit is converted into the character input unit of the corresponding language.

For example, as shown in FIG. 26C(2), characters may be input by pressing or touching a character key in the Chinese character input unit, and "请问公交车站 在哪里" is input by directly drawing or writing with a pen or a hand in the writing unit and the translation key is pressed. Thereafter, when the language input unit No. 2 is pressed, the language input unit is converted into a Korean input unit, and a miscellaneous input unit, a writing unit, and a display unit belonging thereto as shown in FIG. 26C(3). At this time, the content input by the Chinese character input unit is translated into Korean to be displayed as "이 근처에 버스정류장이 어디입니까". At this time, the language input unit number is converted into 1, 3, and 4. Here, when the language input unit No. 3 is pressed, the language input unit is converted into a Russian input unit and a miscellaneous input unit, a writing unit, and a display unit belonging thereto, and the content translated into Russian is displayed.

In FIG. 26A, when the Chinese version 1 (Chinese+English) character input unit, the Korean input unit, the Russian input unit, and the Japanese input unit are arranged at the same time, Chinese and English may be input in the Chinese version 1 (Chinese+English) character input unit at the same time, and in this case, a total of five languages may be input at the same time. At this time, since romanized languages other than English may be arranged instead of English, five languages may be input at the same time.

In addition, it can be noticed that, by utilizing various embodiments of the present invention, language input units of various countries, various miscellaneous input units, and writing units may be combined and arranged in character input units required for inputting characters of many countries of the world in various ways according to languages of the respective countries, and these embodiments may be variously modified to meet the needs of users.

The embodiments of the present invention may be implemented by various types of character input devices including a touch type or a hologram type.

In addition, when the embodiments of the present invention are implemented by various character input devices, the embodiments may be recorded and used in a computer readable storage medium storing one or more programs including instructions to perform the character input method of the present invention by the devices.

INDUSTRIAL APPLICABILITY

The present invention may be used as a multi-national character input device for intuitively and efficiently inputting languages of the world by dividing individual character regions forming a character group region in squares or triangles to sequentially arrange characters of each country.

Further, the present invention may be used as a user-customized keyboard in which a user changes desired characters or symbols for each key and register or delete the desired characters or symbols.

While specific embodiments have been described in the detailed description of the disclosure, various changes can be made without departing from the scope of the disclosure. Therefore, the scope of the disclosure should not be limited to the embodiments described above, and should be defined by the appended claims and equivalents to the scope of the claims.

What is claimed is:

1. A character input device comprising:

a character input unit configured to input a character or a symbol;

a display unit configured to display the character or symbol input via the character input unit on a display;

a storage unit configured to store data input via the character input unit and information or data related to a character input; and a control unit configured to control the character input unit, the display unit, and the storage unit, wherein the character input unit includes a language input unit and an auxiliary input unit, wherein the language input unit is visually compartmentalized into a plurality of character group regions, wherein the character group regions are divided into a plurality of individual character regions, wherein at least one character group region has a central individual character region key disposed at the central region of the at least one character group region, and wherein when at least one central individual character region key of one character group region and/or at least one individual character region of another character group region is sequentially pressed, the control unit displays, in the display unit or the auxiliary input unit, words combinable by the characters corresponding to the individual character regions of the one character group region pertaining to the pressed at least one central individual character region key and/or the character corresponding to the pressed at least one individual character region;

wherein the character input unit comprises an upper and lower case shift key, and wherein if the character or word is input and the upper and lower case shift key is then pressed, the character or word input after a blank is input is converted into an upper or lower case, wherein if a conversion range is selected and the upper and lower case shift key is then pressed to convert the character or word corresponding to the selected conversion range, and wherein if the upper and lower case shift key is repeatedly pressed after the character is input, all characters or words before a cursor are converted.

2. The character input device of claim 1, wherein in the language input unit, the characters are sequentially arranged in an alphabetic order or a consonant and vowel order to intuitively input the characters.

3. The character input device of claim 1, wherein at least one of the character group regions include an integrated function key, and wherein if the integrated function key is pressed, a data display of data produced by a user, characters, symbols, figures, pictures, photos, moving pictures, emoticons, voice files, audio files, contacts, notes, or common phrases is displayed to be selected and input, and user defined data is enabled to be registered or deleted.

4. The character input device of claim 1, wherein the character input unit includes a miscellaneous input unit, wherein the miscellaneous input unit is arranged in a predetermined direction of the language input unit, and wherein, in the miscellaneous input unit, data required for character input and user data in addition to a number, a symbol, a special character, an emoticon, a function key, a setting key, and an editing key are registered and wherein if the miscellaneous input unit is pressed and slid in a predetermined direction, the miscellaneous input unit is converted into another miscellaneous input unit.

5. The character input device of claim 1, wherein the character input unit includes a miscellaneous input unit, wherein if one or more characters or numbers are input via the language input unit or the miscellaneous input unit, the auxiliary input unit displays an emoticon, an icon, a symbol, and an operation symbol related to the one or more characters or numbers so that the displayed emoticon, icon, symbol, and operation symbol may be selected and input and wherein if the auxiliary input unit is pressed and slid in a predetermined direction, another data is displayed.

6. The character input device of claim 1, wherein a plurality of language input units are arranged to input a plurality of languages so that the plurality of languages are simultaneously input.

7. The character input device of claim 6, wherein two language input units and one or more miscellaneous input units are arranged to input two languages at the same time, or four language input units and two or more miscellaneous input units are arranged to input four languages at the same time.

8. The character input device of claim 6, further comprising:

a translating key for translating the characters input via the character input unit into other languages and allowing the display units of the other language input units to display the characters.

9. The character input device of claim 6, wherein a plurality of language input units are converted into reduced size of icons, respectively, and arranged in a peripheral area, and wherein if one of the reduced size of icons is selected, the one of the reduced size of icons is enlarged and the language input previously is translated and displayed.

10. A character input device comprising:

a character input unit configured to input a character or a symbol;

a display unit configured to display the character or symbol input via the character input unit on a display;

a storage unit configured to store data input via the character input unit and information or data related to a character input; and a control unit configured to control the character input unit, the display unit, and the storage unit, wherein the character input unit includes a language input unit and an auxiliary input unit, wherein the language input unit is visually compartmentalized into a plurality of character group regions, wherein the character group regions are divided into a plurality of individual character regions, wherein at least one character group region has a central individual character region key disposed at the central region of the at least one character group region, and wherein when at least one central individual character region key of one character group region and/or at least one individual character region of another character group region is sequentially pressed, the control unit displays, in the display unit or the auxiliary input unit, words combinable by the characters corresponding to the individual character regions of the one character group region pertaining to the pressed at least one central individual character region key and/or the character corresponding to the pressed at least one individual character region;

wherein the character input unit comprises an integrated parenthesis key for performing an open parenthesis function and a closed parenthesis function, and wherein if the integrated parenthesis key is pressed once, an open parenthesis symbol is input, and then if the integrated parenthesis key is pressed once again, a closed parenthesis symbol corresponding to the open parenthesis symbol is input;

wherein if the integrated parenthesis key is pressed once or pressed and held down, a parenthesis symbol display in which various parenthesis symbols are listed is displayed and wherein:

(a)(i) if the parenthesis symbol is selected in the parenthesis symbol display, one or more open parenthesis symbols are sequentially input or (ii) if the parenthesis symbol in the parenthesis symbol display is repeatedly pressed, a corresponding open parenthesis symbols are input, and then each time the integrated parenthesis key is pressed once, the closed parenthesis symbol is input in a reverse order to correspond to the corresponding open parenthesis symbols, and (b) if the parenthesis symbol display is pressed and slid in a predetermined direction, the parenthesis symbol display is converted into another symbol display.

11. The character input device of claim 10, wherein if the integrated parenthesis key is repeatedly pressed, a corresponding open parenthesis symbol is input and then each time the integrated parenthesis key is pressed once, the closed parenthesis symbol is input in a reverse order to correspond to the corresponding open parenthesis symbols.

* * * * *